United States Patent [19]

Crager et al.

[11] 4,058,838
[45] Nov. 15, 1977

[54] PACKET-SWITCHED FACSIMILE COMMUNICATIONS SYSTEM

[75] Inventors: William C. Crager, West Islip; Sudhindra R. Umarji, New York, both of N.Y.; Robert H. Griffin, Montclair, N.J.; Gerard J. Louit, New Haven, Conn.

[73] Assignee: International Telephone and Telegraph Corporation, Nutley, N.J.

[21] Appl. No.: 740,682

[22] Filed: Nov. 10, 1976

[51] Int. Cl.$^2$ .................... H04N 1/32; H04L 11/20
[52] U.S. Cl. .................................... 358/257; 178/3
[58] Field of Search ............... 358/256, 257; 178/2 R, 178/3, 4.1 R, 4.1 B; 179/3

[56] References Cited

U.S. PATENT DOCUMENTS

| | | | |
|---|---|---|---|
| 3,751,582 | 8/1973 | Wernikoff et al. | 358/257 |
| 3,920,895 | 11/1975 | Vieri et al. | 179/3 |
| 3,958,088 | 5/1976 | Vieri | 358/257 |
| 3,982,061 | 9/1976 | Dorey et al. | 178/2 R |
| 4,000,371 | 12/1976 | Ogawa | 178/3 |

Primary Examiner—Howard W. Britton
Attorney, Agent, or Firm—John T. O'Halloran; Jeffrey P. Morris

[57] ABSTRACT

A packet-switched facsimile communication system operable in a store-and-forward mode is provided for enabling substantially simultaneous full-duplex communication between a plurality of telecommunications terminals, such as facsimile transceivers, over a communications network with a plurality of other facsimile transceivers having access to the communications network and with which such communication is desired. The disclosed packetizing of data and transmission thereof in a store-and-forward mode with dynamic routing provides a highly efficient utilization of the transmission facilities, substantially error-free data transmission and a handshake capability between a wide variety of dissimilar and otherwise incompatible facsimile machines having differing protocols, modulation techniques and other speed and code characteristics. Large blocks of data and other message information from facsimile data terminals are subdivided into data packets prior to transmission, converted into a system-wide compatible protocol, compressed, transmitted independently and time multiplexed with other packetized data from other terminals on the communications network, stored and forwarded on a priority basis and in accordance with network availability at one or more switching nodes in the network, reassembled from the received packets at a destination processor into the original data messages for coupling to the message destination terminals such that the received message is decompressed and reconverted into a format compatible with the destination terminal characteristics to enable information interchange therebetween.

37 Claims, 25 Drawing Figures

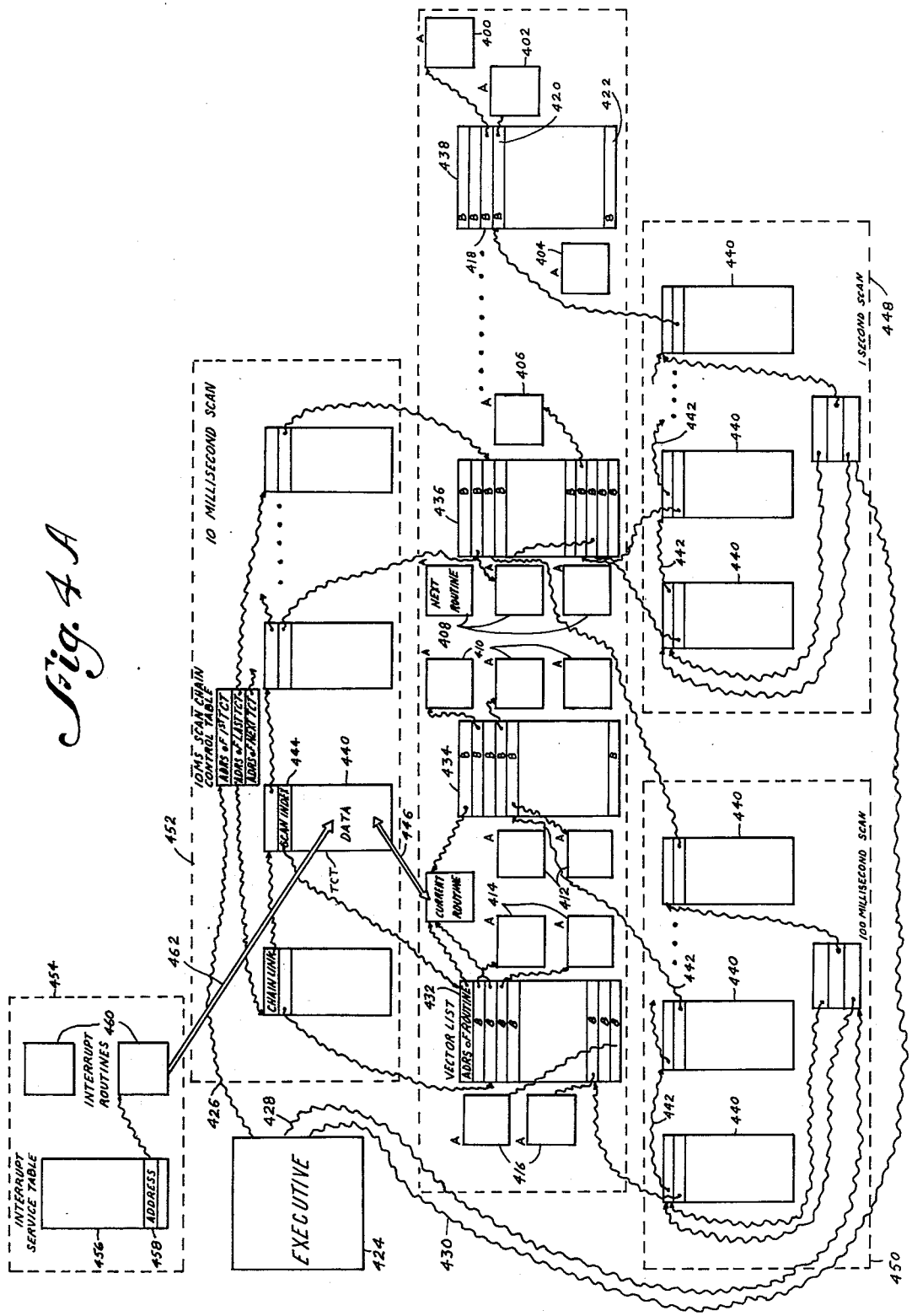

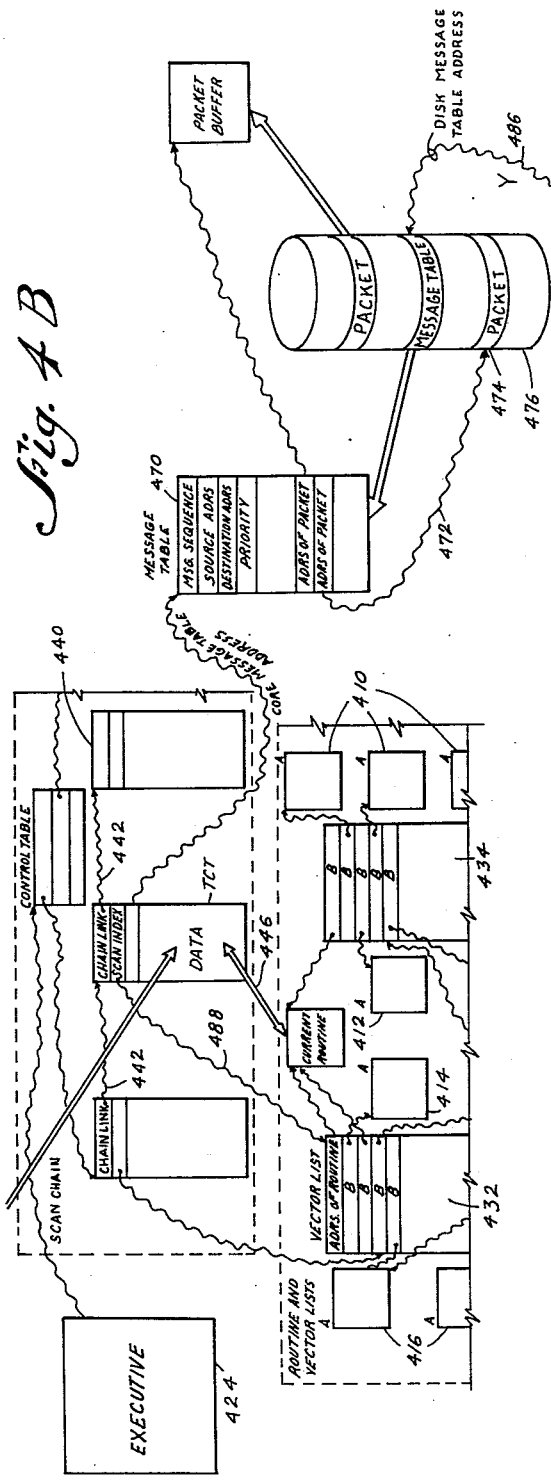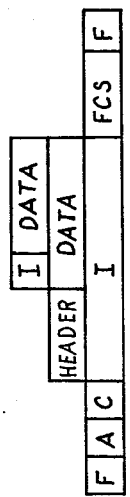

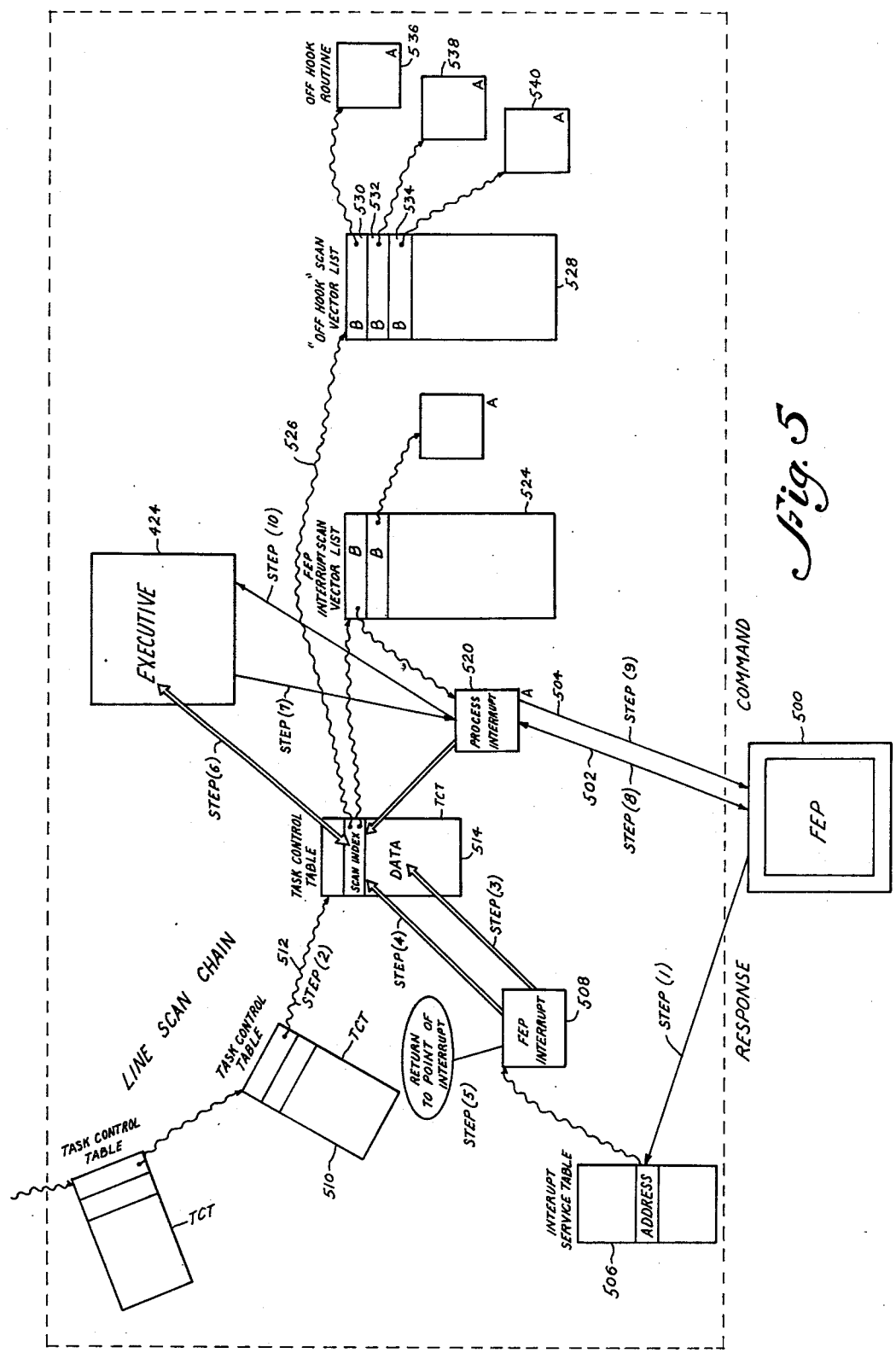

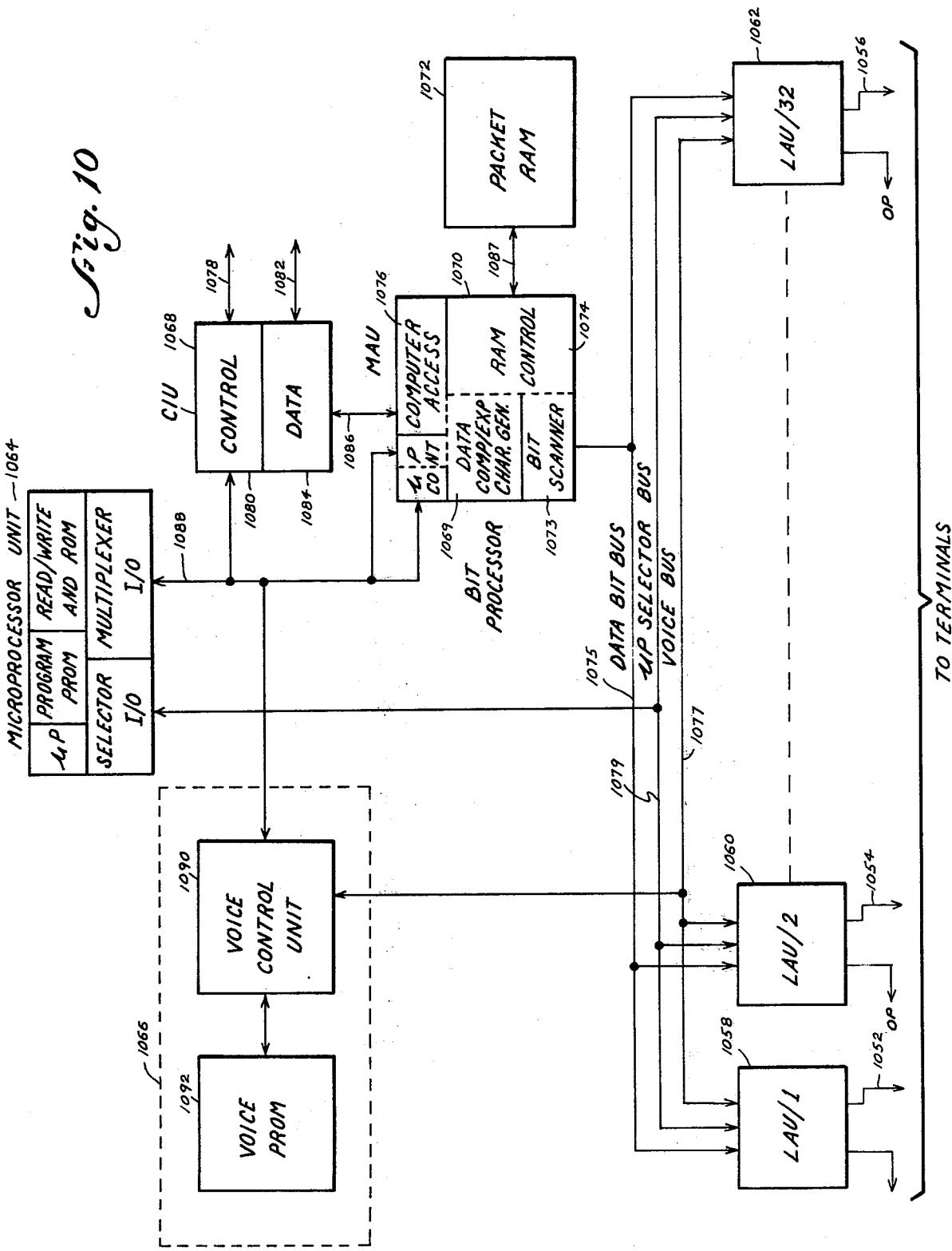

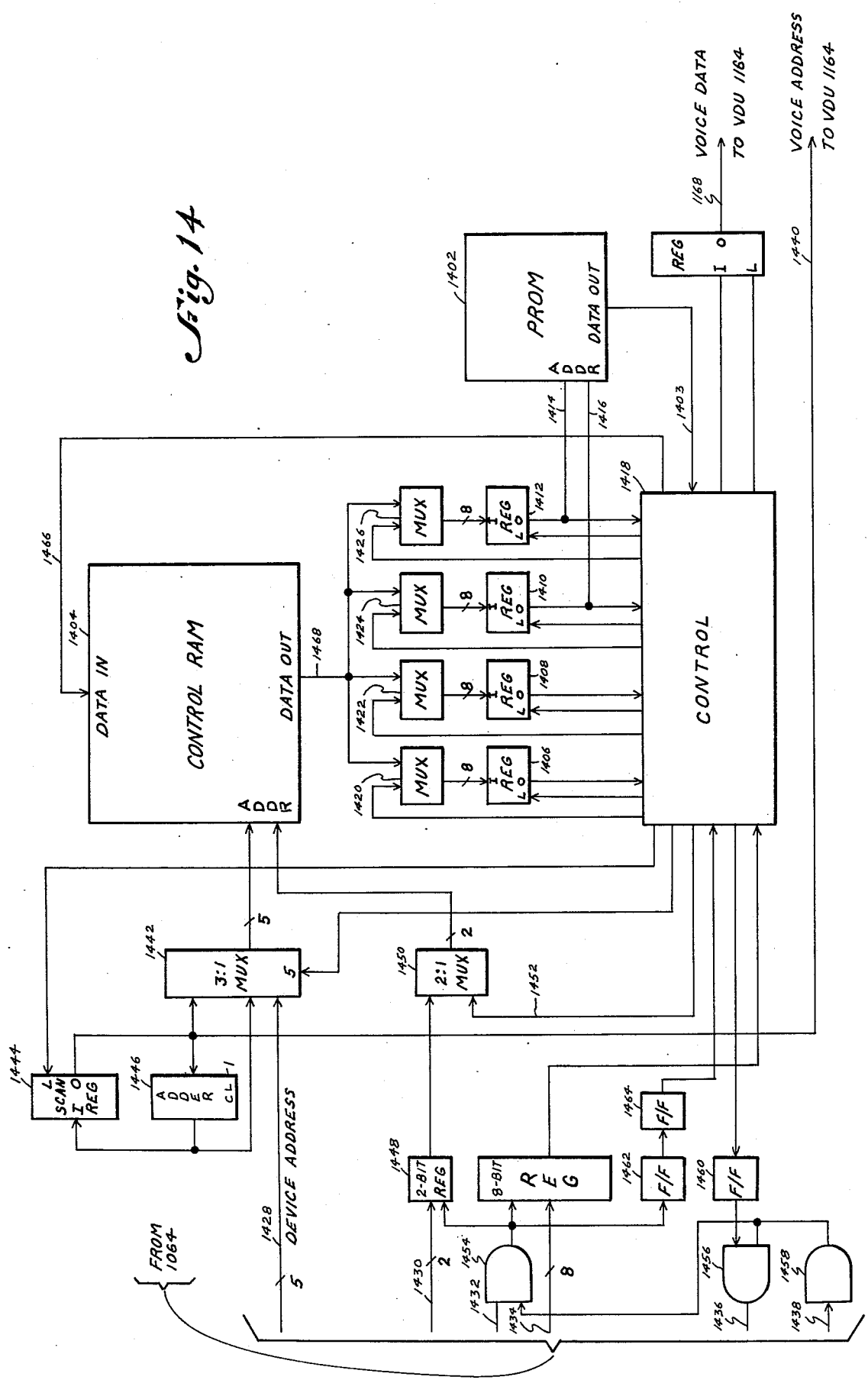

Fig. 15 b

CONTROL RAM SEQUENCE

EACH SLOT = 500 NS.

| SLOT # | TIME IN OPERATION | TIME OUT OPERATION |
|---|---|---|
| 0 | REG → PAL (SCAN) | PAL (SCAN) → REG |
| 1 | REG → PAM (SCAN) | PAM (SCAN+1) → REG |
| 2 | REG → CNT (SCAN) | CNT (SCAN+1) → REG |
| 3 | REG → STATE/CONT (SCAN) | STATE/CONT (SCAN+1) → REG SCAN+1 → SCAN |
| 4 | PROCESS | PROCESS |
| 5 | PROCESS | PROCESS |
| 6 | PROCESS | LD LAU DATA & SET DRDY IF OUTPUT REQUIRED |
| 7 | WR 4P DATA TO RAM @ DEVAD AND DEST. AD IF DAV | SET/CLR CHAV BASED ON STATE @ DEVAD |

1510 / 1512

CONTROL RAM

Fig. 15a

```
             ←—— 8 BITS ——→
DEVICE   ACCESS
 NO.      NO.
          ┌ 0 0  │ PROM ADDR. LEAST    │ ~1502 ┐
x x x x ──┤ 0 1  │ PROM ADDR. MOST     │ ~1504 │ 4 LOCATIONS
          │ 1 0  │ COUNT (ACCUMULATOR) │ ~1506 │ PER CHANNEL
          └ 1 1  │ STATE / CONTROL     │ ~1508 ┘
```

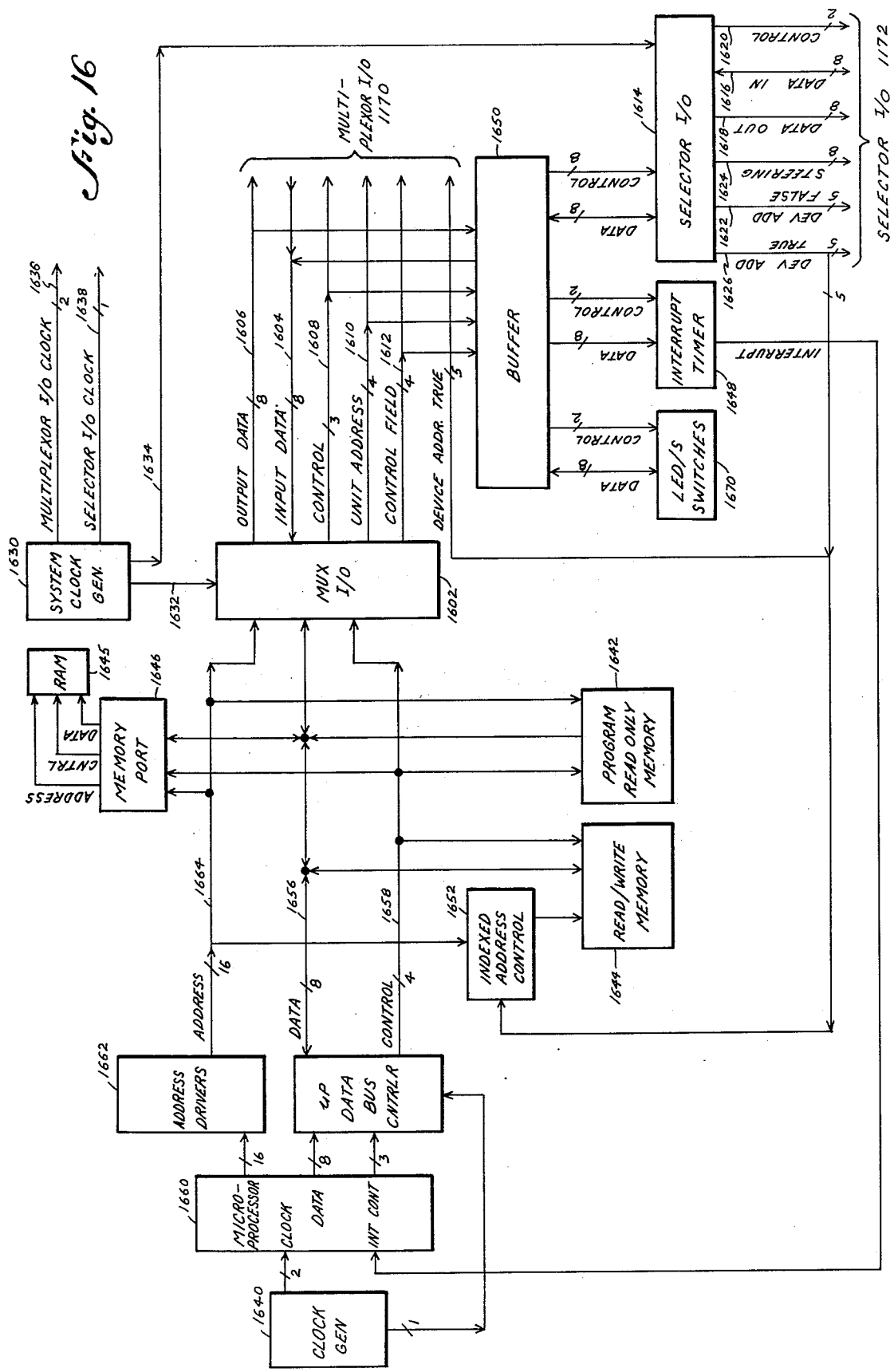

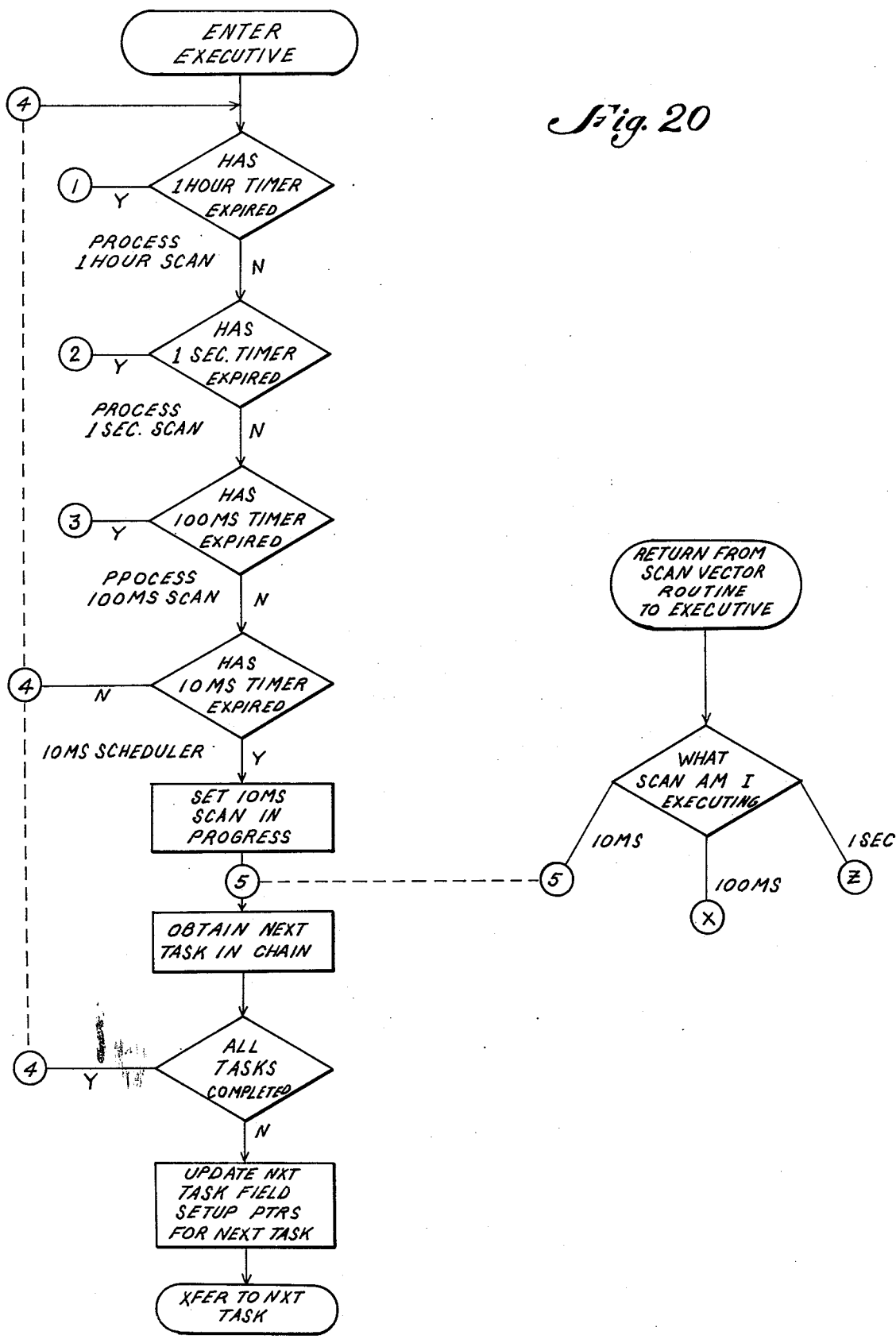

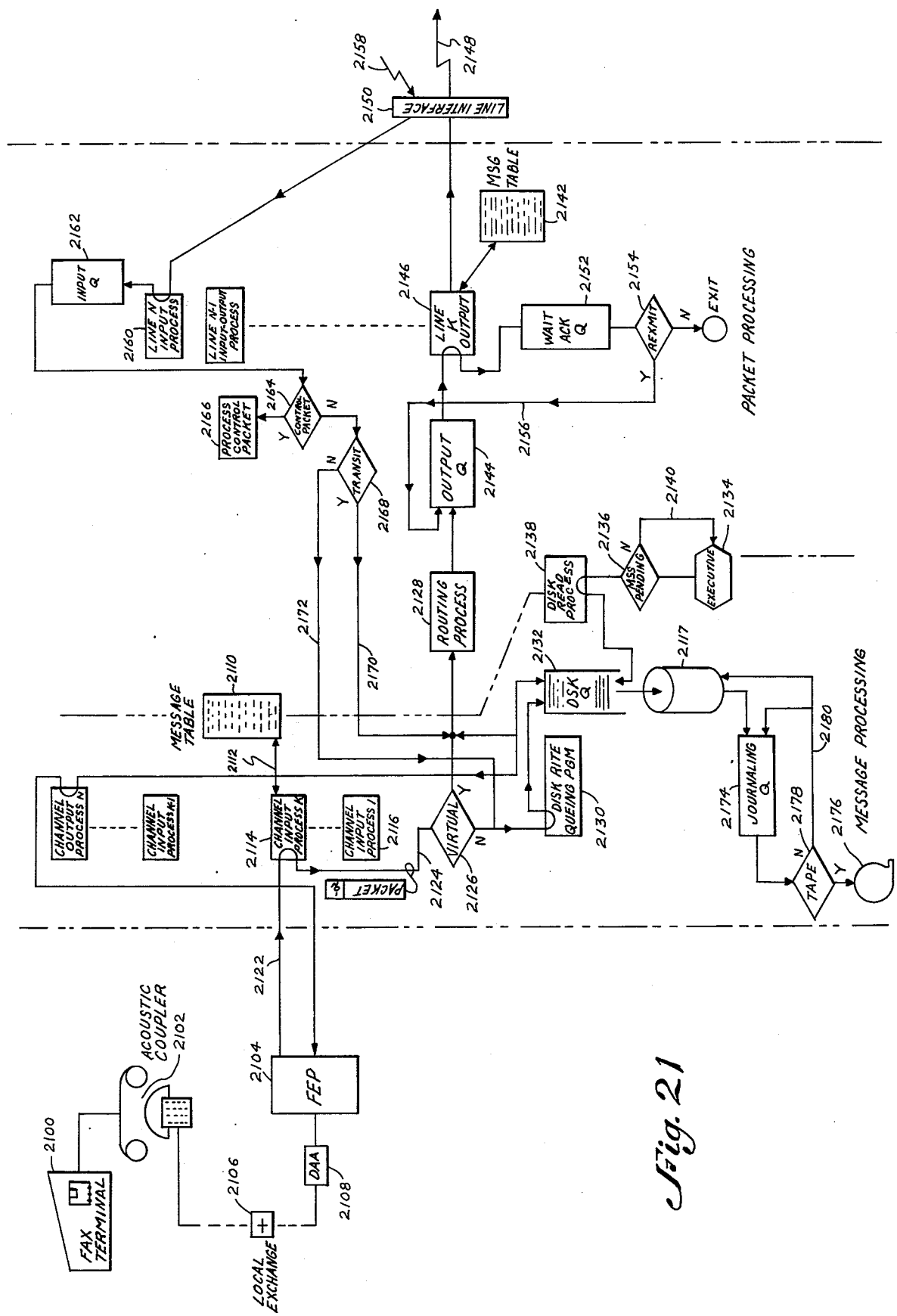

PACKET-SWITCHED FACSIMILE COMMUNICATIONS SYSTEM

BACKGROUND OF THE INVENTION

1. Field of the Invention

The invention relates generally to the field of digital data communications and to a communications system having integrated therein both packet-switching and message switching (store-and-forward) communication techniques for enabling communication between a plurality of dissimilar data input terminals, such as various facsimile terminals, visual display units, teletype terminals, printer terminals, TWX or Telex, word processing equipment, and computer terminals. More particularly, the invention relates to a communications system and method embodying a novel data conversion technique for enabling a system user to communicate via any digital input thereto with any other user or combination of users at any other digital access points to the system, regardless of difference in modulation techniques, character codes, data protocol or "handshake," synchronization and, in the case of facsimile, any of the above plus variation in speed and drum diameter, thereby enabling otherwise incompatible terminals to communicate with each other with a system-wide compatible protocol to enable effective information exchange. The invention further, and more particularly in a preferred embodiment thereof, relates to an improved facsimile transmission and communication system incorporating novel data conversion, compression and network control techniques for communication between dissimilar facsimile units.

2. Description of the Prior Art

New data transceiving devices are increasingly being developed and implemented into an increasing number of teleprocessing terminals, putting ever increasing demands upon existing digital data switching communications networks. It is essential that such terminals have the ability to communicate with each other; however, due to the variety of codes, modulation techniques, data protocols and other technological differences between the various terminals produced by an ever increasing number of manufacturers, many of these terminals are inhibited from communication with each other due to these incompatibilities. Costly communication processors and special software programs have been used in the past to achieve the code and other data conversions necessary to permit inter-terminal communications. The present invention overcomes these problems and allows a wide variety of data terminals of various protocols, codes, and modulation techniques to communicate with each other directly, without the need for individual complex interface equipment at each terminal location.

While the present invention is applicable to communication between a wide variety of teleprocessing equipment as described herein, it is particularly suitable for providing a compatible means of communication between a wide variety of dissimilar and otherwise incompatible facsimile equipment. The problem of facsimile communication is particularly affected by incompatibilities in resolution, modulation, handshaking procedures and drum sizes existing in the various equipment produced by competitive manufacturers.

A stored program facsimile control system of the prior art is described by U.S. Pat. No. 3,751,582, in which system a plurality of different types of facsimile devices may be interfaced. This is accomplished by varying the processor control operation with various stored programs, thereby enabling compatible operation between facsimile transceivers having different operating characteristics. While the described prior art system provides compatible communication between two facsimile units, the present invention provides compatible communication between a great number of facsimile terminals simultaneously, for example, between one hundred twenty terminals, without delay, data loss or complex protocols. Both multi-terminal communication capability and terminal compatibility is provided by the present invention. Additionally, the described prior art system requires an operator to select the requisite program from storage, whereas, in accordance with the present invention, the programs utilized in the course of providing compatible operation between dissimilar facsimile units are stored in the system memory and automatically selected based upon a table reference or look-up once the originating and final destination codes indicative of machine type are received, thereby obviating operator error.

Another prior art facsimile transmission system is described in U.S. Pat. No. 3,739,338, wherein apparatus is provided for enabling a data device to be coupled to a communication channel to permit the communication of data over the channel such as a conventional telephone system. U.S. Pat. No. 3,920,896 describes a switched communication system including store-and-forward means for enabling transmission between various facsimile devices. U.S. Pat. No. 3,646,256 describes a facsimile transmission system wherein the rate of transmission is determined by the content of the transmitted information. U.S. Pat. No. 3,558,811 describes an interface adapter unit for converting facsimile graphic information signals to a copy. U.S. Pat. No. 3,714,377 describes a store-and-forward speed changer for off-line transmission of binary data. U.S. Pat. No. 3,876,825 describes a facsimile conversion unit which digitizes the facsimile signal for subsequent synthesis into a four level compressed bandwidth baseband signal. U.S. Pat. No. 3,830,962, a graphic data processor interface, adapter unit for interconnecting a facsimile graphic communications system with a central processing unit. U.S. Pat. No. 3,849,595 describes a facsimile signal transmission system using both AM and phase modulation, wherein the phase modulations are based on the binary values of the input facsimile signal. U.S. Pat. No. 3,868,477 describes a circuit for providing scanner baseband compensation by converting the scanner signal to black or white, based on threshold detection and rate of change detection. U.S. Pat. No. 3,392,232, a facsimile transmission system, describes the use of an acoustic coupler for the transmission of facsimile signals. U.S. Pat. No. 3,292,148 describes a method and apparatus for sensing and identifying information-bearing indicia. U.S. Pat. No. 3,831,091 describes a facsimile transceiver utilizing a time-shared circuit for performing a variety of functions. U.S. Pat. No. 3,614,319 describes a facsimile transmission system via telephone wherein initiation of the data handshake exchange after initialization results in synchronization of the transmitting and receiving stations.

Various data compression techniques have been developed in the prior art. Compression of bit patterns of adjacent scan lines in a two bit pattern sometimes referred to as the "delta coding method," is described in U.S. Pat. No. 3,804,975. "Run-length encoding" utilizes a compression algorithm which eliminates redundancy in transmitted black and white data by encoding an entire line, a portion thereof or a number of succeeding lines of all black or all white as a variable length code, rather than repetitiously encoding each line segment. Such encoding is described by Huffman, D.A., "A Method for the Construction of Minimum Redundancy Codes Proc. Inst. Radio Engineers," 40 (1952) page 1098 Bandwidth compression, the reducing of the frequency of the signal components comprising the representation of the facsimile data serves to reduce transmission time, particularly when the transmission medium is a limited bandwidth telephone line. Such a bandwidth compression technique is described by U.S. Pat. No. 3,761,610. A dual-line compression algorithm is described by U.S. Pat. No. 3,916,095 wherein two lines of scanned data are treated simultaneously for purposes of encoding and decoding. The data compression techniques of the present invention may utilize a compression algorithm such as a dual-line encoding algorithm similar to that of the referenced patent, however, with the key distinction of incorporating the compression technique within the present packetized system. In other words, compression is achieved throughout the entire facsimile page, but the compressed data is transmitted as packets for ultimate expansion and reassembly.

A description of various switched communication systems having store-and-forward capabilities are described with references thereto in the aforementioned U.S. Pat. No. 3,920,896 and references made thereto for further detail with regard to such prior art systems.

Store-and-forward data transmission, sometimes referred to as message switching may be defined as a mode of transmission wherein data message or portions thereof are accumulated, stored and retransmitted on a scheduled or priority basis as desired and in accordance with channel and/or equipment availability to the next desired location, thereby maximizing the efficiency of transmission in accordance with a predetermined priority structure for message flow. Such storing may be for a time duration of several hours or more when required.

Packet switching is a priority mode of data transmission, particularly useful in computer-to-computer communication in that retransmission occurs almost instantaneously, providing a virtual channel for a computer terminal with a dedicated input port without time consuming circuit switching and connection procedures. In packet switching systems, data is subdivided into "electronic envelopes" called packets, each packet consisting of a predetermined number of data bytes, together with synchronization and other identifying data as a header, and an error checking code. The composition of the individual packets is described in greater detail hereinafter. The data packets are integrated into the overall data stream of the communication network in accordance with the present invention together with other data transmissions in the store-and-forward mode in a time division multiplexed scheme. The packets are transmitted from their source terminal through the various network switching sites or nodes to their intended destination, at which point they are reassembled as required into the original data messages. The data content of the individual packets is variable and dynamic and capable of independent routing through the communication network before the multiple packets are reassembled into the final message. For descriptive purposes, a typical message may consist of a data sequence of approximately one hundred fifty packets of information.

Packet switching systems of the prior art are described by L. Pouzin (Reseau Cyclades), A Proposal for Interconnecting Packet Switching Networks; Eurocomp Brunnel University, London, May 1974; "The Interface Message Processor for the ARPA Computer Network," Spring Joint Computer Conference, May 7, 1970 by Heart, F. E., et al; Presentation and Major Design Aspects of Cyclades Computer Network, Pouzin, L., 3rd Data Communications Symposium, April 1973; Datapac Standard Network Access Protocol, The Computer Communications Group, Trans-Canada Telephone System, Mar. 31 1976; CTNE's Packet Switching Network, Alarcia G. Herrera, Second International Conference on Computer Communication, Stockholm, August 1974; "Packet Switching Services and the Data Communications User," OVUM, December 1974; and "Adaptive Routing Algorithms for Distributed Computer Networks," J. McQuillan Thesis, Harvard 1974.

The following definitions of certain terms used herein are included for a more complete understanding of the description to follow. Additional definitions are included throughout the following specification at various points therein for a more complete understanding of the description associated therewith.

A facsimile device is a transceiver including a scanner and printer used for transmitting and receiving documents using analog modulation/demodulation (amplitude and frequency modulation) or digital techniques for converting the graphic and/or alphanumeric information on the document into a data stream, and reconverting such received data from other facsimile devices back into documents.

A teletypewriter is a device for generating coded signals corresponding to a typed alphanumeric character and for typing such alphanumeric characters upon receipt of such coded signals over a communications line.

Visual display unit, or CRT, refers to a data transceiving terminal having a keyboard and cathode ray tube or other visual display means for sending and receiving messages over a communication line and displaying such messages on the visual display means.

Word processing terminal is a typewriter having a data buffering, communications and memory capability utilized in an office environment.

A communications channel is defined as the transmission link between the various data sources and destination, and includes high speed digital data lines at 56 K-bps, 230K-bps, or other facilities at different data rates; intercity and intracity telephone and telecommunications lines, both analog and digital; microwave transmission with a plurality of voice channels modulated thereon. Such facilities are readily available and provided by a variety of common carriers, together with requisite modems and other interconnecting equipment, and enable each individual local teleprocessing terminal to communicate with any other local or remote teleprocessing terminal via full-duplex channels.

The terms data bytes and data words are used interchangeably herein and are defined as a fixed length binary bit pattern. A bit is defined herein as the smallest unit of binary information.

SUMMARY OF THE INVENTION

The present invention comprises a data communications system for providing compatible communication between a plurality of data terminal devices at a plurality of locations utilizing communications at a plurality of switching sites, both packet-switching and store-and-forward switching, to insure maximum utilization of the transmission network. The present invention further comprises apparatus and method for implementing packet and message switched communication between dissimilar terminals having differing modes of operation, and in a particular embodiment between dissimilar facsimile machines. Data and facsimile messages are transmitted and received, digitized, temporarily stored at switching nodes in a communications network on a scheduled or priority basis, formatted into a system-wide compatible protocol at local data processing sites and subdivided into packets of message data and transmitted in such packets dynamically and independently through at least one switching center or node. The packets are then retransmitted on the network either to another switching node or processor at which point the packets are reassembled into the original message or a portion thereof, converted into a mode compatible with the characteristics of the receiving terminal, and coupled to such terminal.

It is, therefore, a primary object of the present invention to provide a switched digital data communications system and method for enabling communications between a plurality of compatible and otherwise incompatible analog and/or digital terminal devices.

A further object of the present invention is to provide a packet-switched digital data communications system and method having a store-and-forward capability on a priority basis.

A further object of the present invention is to provide for conversion of data received from a plurality of data generation sources into a format having a system-wide protocol for enabling compatible information exchange therebetween.

Yet another object of the invention is to provide a packet-switched facsimile communications system having a store-and-forward capability and a system-wide protocol for enabling communication, including the exchange of facsimile messages, between a plurality of facsimile machines having a variety of data generation characteristics.

The foregoing and other features and advantages of the invention will become apparent with reference to the following detailed description thereof taken in conjunction with the accompanying drawings, in certain of which, double lines are indicative of data flow, single lines are indicative of electrical control and other electrical signals and waved single lines are indicative of address pointers.

BRIEF DESCRIPTION OF THE DRAWINGS

FIG. 4(a) is an operational system control flow diagram illustrative of the major executive look-up tables and routines of the present invention;

FIG. 4(b) is a system operational control flow diagram of the major executive look-up tables and data buffers, particularly illustrative of facsimile message deliverance queues of the present invention;

FIG. 5 is an operational control flow diagram illustrative of the connection control process of the present invention;

FIG. 9(a) is a simplified representation of the link, packet and message protocol of data in transit in accordance with the present invention;

FIG. 10 is a simplified block diagram of a Front End Processor communications interface of the present invention;

FIG. 14 is a functional block diagram of the Voice Generator Unit portion of the Front End Processor of FIG. 10;

FIGS. 15(a) and 15(b) are control random access memory diagrams of the Voice Generator Unit of FIG. 14;

FIG. 16 is a functional block diagram of the microprocessor portion of the Front End Processor of FIG. 10;

FIG. 20 is a simplified flow chart illustrative of an exemplary Executive routine for controlling scheduling of various subroutines utilized by the present invention; and FIG. 21 is a simplified flow chart illustrative of the various interactions of packet and message processing in the present invention.

DESCRIPTION OF THE PREFERRED EMBODIMENT

Figure 1:
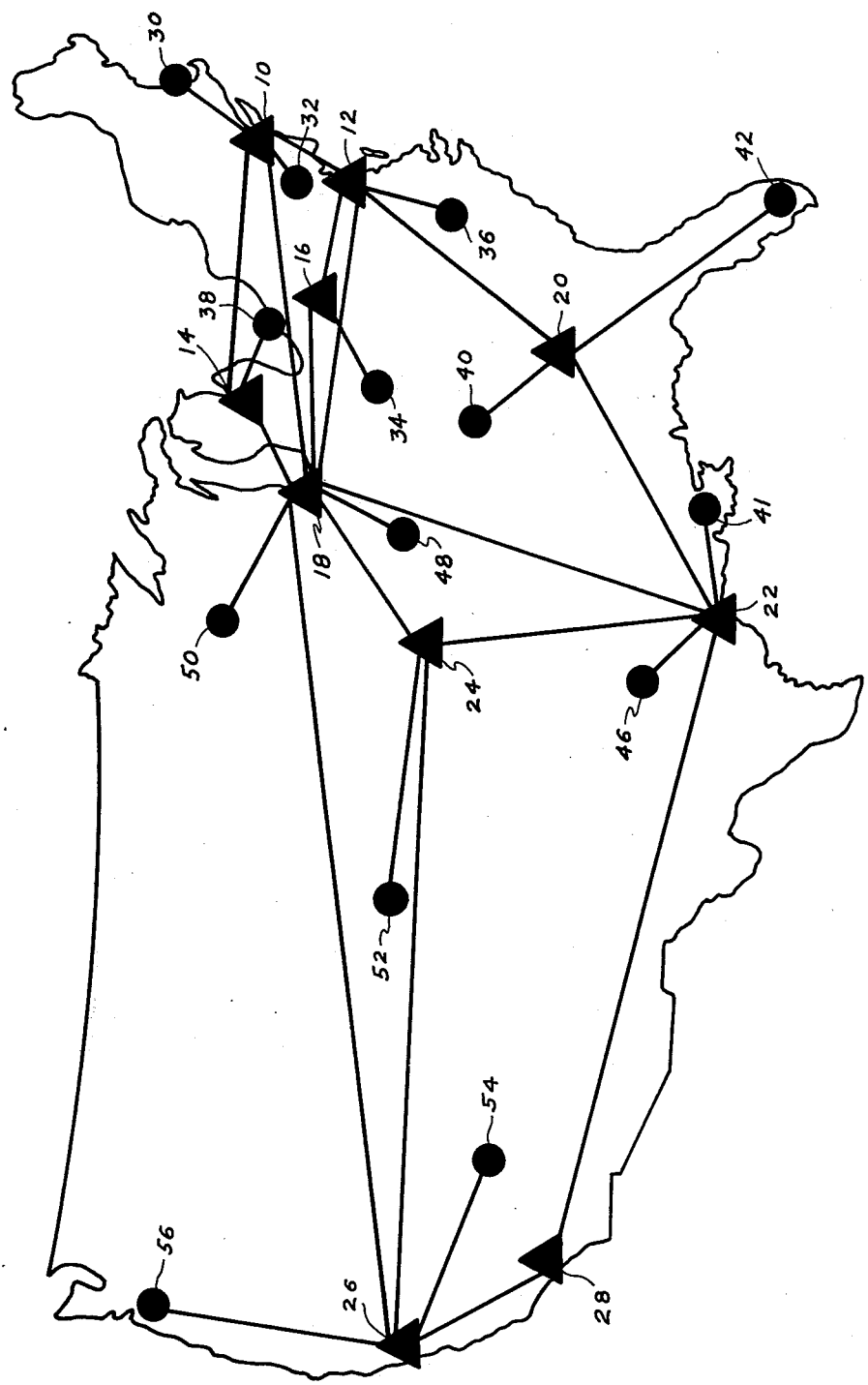
FIG. 1 is an exemplary communications network embodying the present invention superimposed over a map of the United States.

Referring now to FIG. 1, a communications network of a scope suitable of incorporating the present invention is illustrated superimposed upon an outline of the United States. Generally, the network includes computer switching nodes, 10, 12, 14, 16, 18, 20, 22, 24, 26 and 28 and data concentrator sites 30, 32, 34, 36, 38, 40, 42, 44, 46, 48, 50, 52, 54 and 56 interconnected point-to-point by standard land-lines and/ or microwave links as are readily available. For example, digital transmission channels are provided at 96 K-bps and at 56 K-bps by AT&T, while 4 kHz analog transmission channels are provided by Western Union. Such microwave links include a plurality of rf channels, for example, eight channels, with each such rf channel having the capability for providing as many as ten thousand voice channels modulated thereon, thereby providing voice communication capability between the various terminal locations and switching node locations. The various digital and/or analog input terminals contemplated by the present invention are preferably located proximate to and are interconnected by the aforedescribed network.

Figure 2:
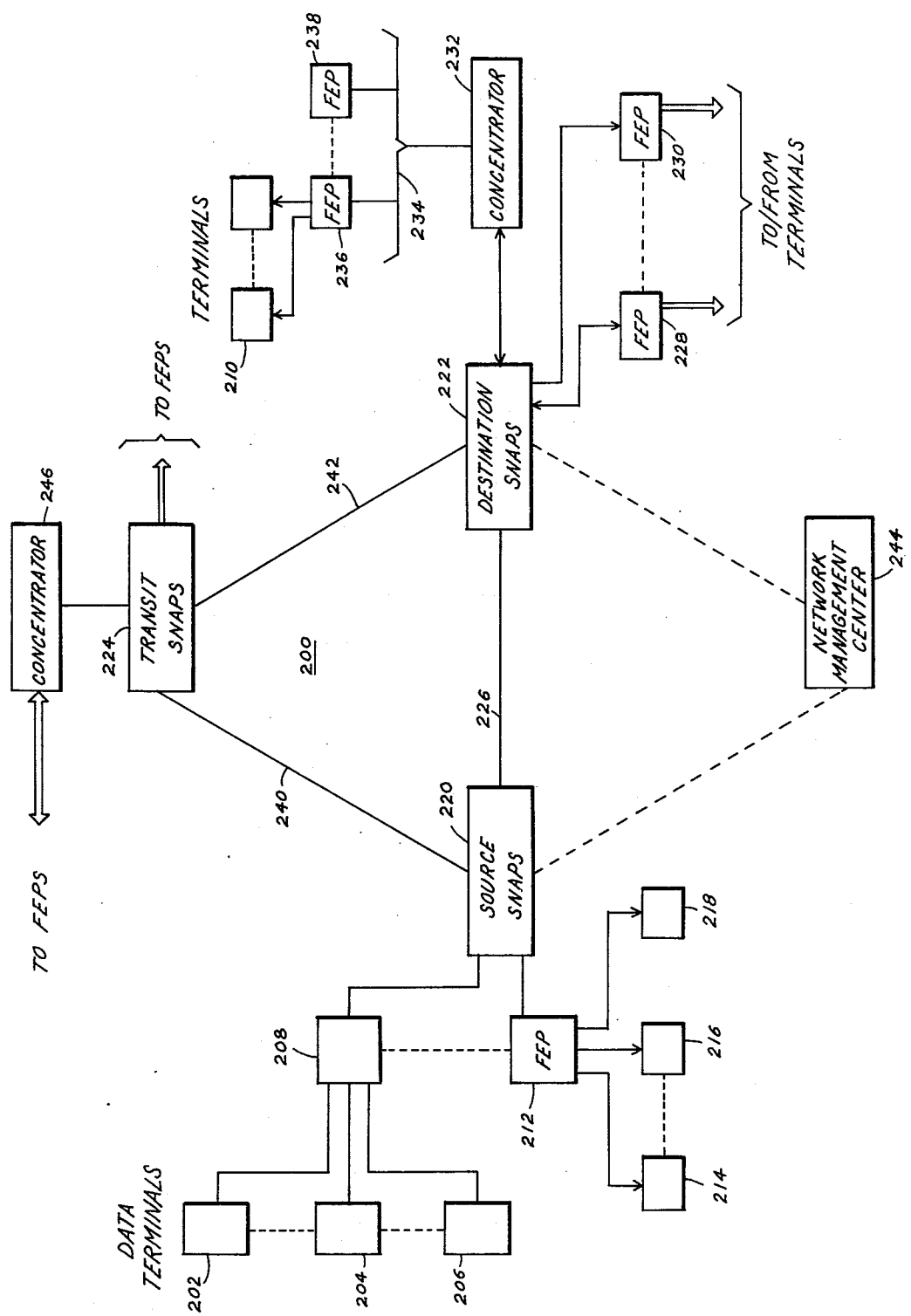
FIG. 2 is a simplified block diagram of certain of the major system elements constituting a switched communications system in accordance with the present invention.

Referring now to FIG. 2, a simplified block diagram of a packet-switched digital communications system having store-and-forward capability in accordance with the present invention is illustrated generally at 200. The data messages from a terminal location, such as terminal 202, are generated, broken down into segments described herein as packets, which packets are transmitted dynamically and independently of each other over the most expeditious route to a destination terminal, such as terminal 210. Prior to arrival at terminal 210, the data packets are reassembled into the originally transmitted message irrespective of the order of arrival of the packets. Thus, it is contemplated herein that the individual data packets constituting the transmitted message may take different routes for their ultimate destination terminal and may arrive out of order; however, upon reassembly, the original message as generated at terminal 202 will arrive at terminal 210 in its original form. A plurality of terminals up to, for example thirty-two such terminals, are illustrated at 202, 204 and 206 as coupled via telephone lines to a processing unit referred to hereinafter as a Front End Processor (FEP) 208. The aforementioned terminals may comprise facsimile terminals of varying modulation, speed, encoding and handshake techniques manufactured by a number of companies. The aforementioned terminals may include low speed analog facsimile, high speed digital facsimile, low speed teletype compatible terminals, touch-tone coupled data processing equipment, teletype, CRT's, patch terminals, keyboard terminals, computers and other word processing equipment. Communication among terminals as aforedescribed is achieved via FEP 208. A microprocessor based communications conversion device which automatically answers and/or originates calls to and from its respective terminals provides the handshaking protocol with such terminals for enabling the transmission of data, transmits and receives data in a full-duplex mode to and from its terminals 202 through 206, voice prompts a terminal operator as to data to be entered at the terminal in an acknowledge/not acknowledge mode upon receipt of a data message and provides timing, synchronization and disconnection of the terminals.

In like manner, FEP 212 provides an interface at another location for a plurality of data terminal service thereby at 214, 216 and 218. FEP 212 provides the necessary conversions of speed, code, format and protocol for enabling its respective terminals to communicate with terminals at other locations, such as terminal 202 and terminal 210 and are connected to FEP 212 by means of any suitable communications connection such as telephone lines including WATS lines, foreign exchange lines, direct distance dialing lines and/or private lease lines for speeds ranging from 50 bits per second to 9600 bits per second. A plurality of FEP's 208 through 212 are coupled to a switching node which is a Switching Network and Processing System 220 (hereinafter referred to as SNAPS) over high speed digital transmission lines which switching network referred to for simplicity of description as a source SNAPS, receives messages coupled thereto from its FEP's 208, 212 and other FEP's not illustrated for transmission to a destination switching node and processing system 222 via a transit switching node and processing system 224 or, as the case may be, directly via line 226. At the destination SNAPS 222, received data is routed either directly to a plurality of FEP's such as FEP's 228 and 230, for coupling to their respective data terminals, or to a concentrator location 232 for retransmission via digital transmission lines of from 50 bits per second to 9600 bits per second illustrated at 234 to a plurality of FEP's such as FEP's 236 and 238, for alternate transmission to the plurality of terminals serviced by each of such FEP's 236 and 238, i.e., terminal 210. The communications network between concentrator 232 and a SNAPS site 222 is, for example, a 9600 bps or a 56 K-bps line, such as Dataphone Digital Service provided by AT&T.

The concentrator 232 provides an entry point into which local terminals can communicate via their respective FEP's. In essence, the concentrator receives and delivers a plurality of messages from its terminals and stores such messages or disks for transmission in accordance with a predetermined priority.

The SNAPS 220, 222 and 224 while performing the above-described concentrator 232 functions, also control communications over internode trunk lines 226, 240 and 242 to a network management center location 244 when such location is present in the system. Thus, the SNAPS sites provide for data concentration upon receipt of messages, data deconcentration upon transmission of received messages from other SNAPS sites and for a switching function between high speed synchronous lines to another SNAPS sites. Concentrator 246 for servicing a plurality of terminals at transit SNAPS 224 location via its associated FEP's is shown for illustrative purposes to indicate that data terminals may be coupled to the overall system at any point along the network via a switching node, such as switching node 224.

Figure 3:
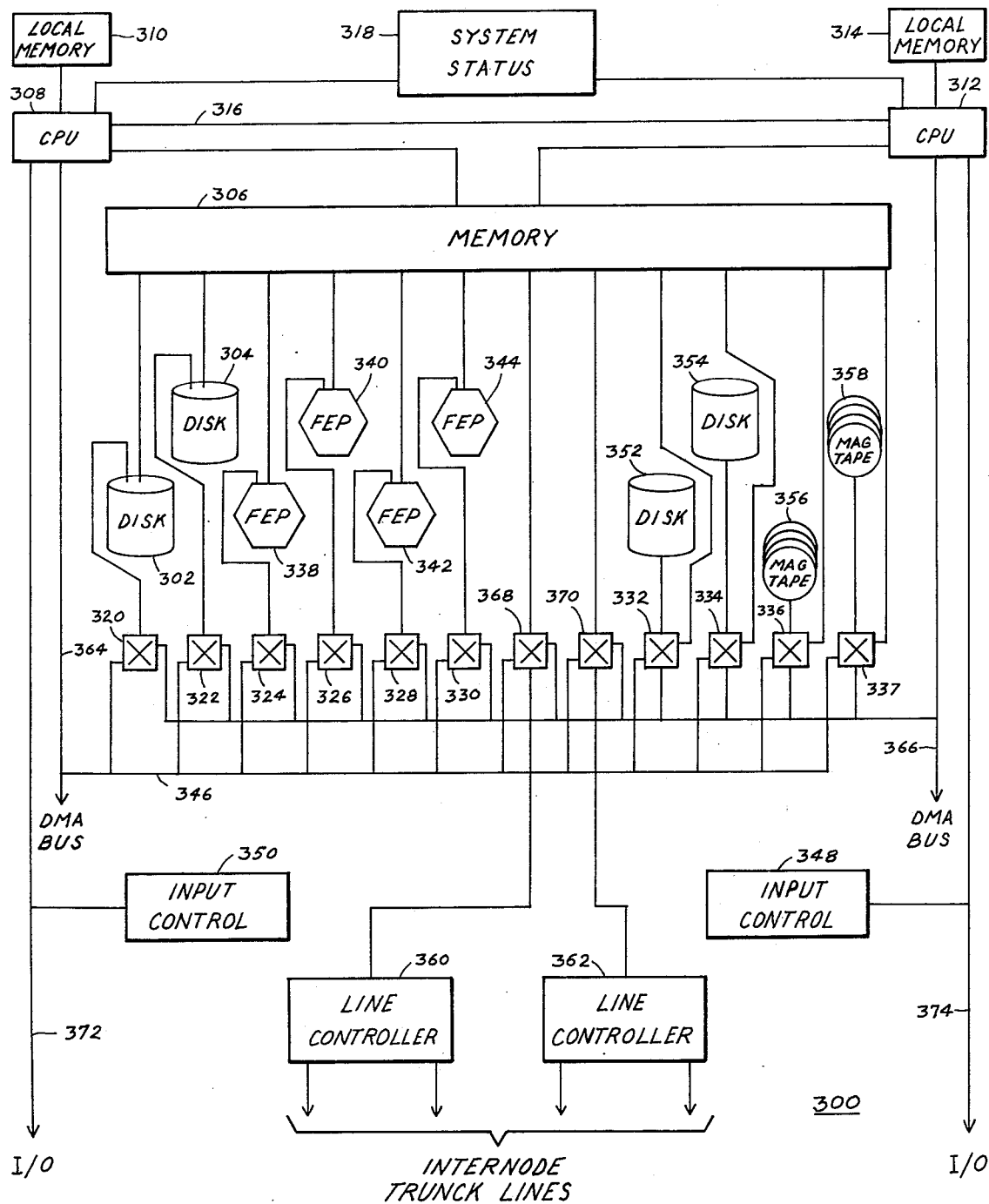
FIG. 3 is a block diagram of a typical switched node and processing site, a subsystem of the present invention.

Referring now to FIG. 3, a SNAPS site, such as SNAPS 220, is illustrated in simplified block diagrammatic form. The SNAPS 300 in essence stores messages received from terminals in core memory wherein a program of about one millisecond duration is executed on each data packet stored, whereafter such packets are transmitted to one or more transit SNAPS in intermediate hops wherein similar programs are executed prior to final transmission to the destination SNAPS for ultimate delivery to a destination terminal. This procedure may be defined as a virtual call. The above routing of data packets enables such data in packetized form to be transmitted through the system from a source to a destination in less than one second. For facsimile transmission, such transmission cannot occur since a facsimile machine normally takes over three minutes to input its entire message, i.e., one full page and all generated packets as they are transmitted into the network must be held (stored) until the entire message is inputted for forwarding to its ultimate destination. Since it is undesirable to tie-up core memory with a message for over three minutes, the packets are read out of core onto intermediate mass storage, such as moving head disks 302 and 304 from a shared multiple bank multiported memory 306, which provides memory capability for a communications processor 308 associated with SNAPS 300 and which includes a local memory 310. Communications Processor 308 is on-line; however, it is backed up by a backup Communications Processor 312 with its own local memory 314 with coupling being provided between CPU's 308 and 312 via a computer-to-computer high speed data link 316 and a system status alarm network 318 which may comprise a simple switch for enabling CPU 312 in the event of a disablement of CPU 308. The storage of packets on disks until an entire facsimile message is inputted into the system is referred to herein as store-and-forward message switching. However, when the message is actually switched through the network, its packet is switched to a point closest to its ultimate destination terminal wherein, in the case of facsimile transmission, the data packets are again stored on an intermediate mass storage medium, such as moving head disk, and transmitted for three or more minutes per page to the receiving facsimile terminal. SNAPS 300 when functioning as a switch does not store packets on disks 302 and 304, but rather switches such packets through its high speed core memory 306 from one high speed phone line to another. A plurality of switches 320, 322, 324, 326, 328, 330, 332, 334, 336 and 337 serve to transfer the peripherals and FEP's 338, 340, 342, and 344 from on-line to stand-by in the event of a failure. High speed bulk data transfer capability between core memory and peripherals and FEP's is provided by DMA bus 346. The SNAPS 300 perform dynamic adpative routing by which technique the data packets are routed to the transmission line containing a minimum of errors and traffic queued for transmission. Packets from different messages are time multiplexed together for retransmission over the communications lines to remote SNAPS and concentrator sites at the high speeds of CPU 308 rather than at the relatively slow disk speeds with a link protocol to be described performing the handshake between the various switching sites. For purposes of description, a handshake capability may be defined as the preparation of one processing unit to receive a transfer data from another processing unit. The on-line central processor 308 controls the line protocol requirements and also serves to update the identically configured off-line CPU 312 which is maintained in a stand-by status. On-line is defined as a mode in which a unit is actively used in performing a task such as a switching function. Off-line is defined as a redundant mode in which a unit is engaged in maintenance function or other supportive work but not available for backup. Stand-by is defined as a mode in which a system is immediately available for backup in the event of a hardware/software failure of an on-line unit. CPU 312 is periodically updated by computer-to-computer transfers to maintain its stand-by status. These transfers include initialization of memory, normal transfer of packet information, and the supervisory transfer of various optional data. A console teletype 348 serves as an input device for the stand-by CPU 312 unit by which console an operator can effect program modifications. A similar console 350 serves as an operator control input to communications processor 308. CPU 312 packet storage capability is provided by disk units 302, and 304. Disk units 352 and 354 are utilized for storage of object programs and tables normally residing in core and magnetic tape units 356 and 358 provide bulk storage capability. A 56 K-bps line controller 360 and a 9600 bps line controller 362 are coupled to the DMA buses 364 and 366, respectively, via switches 368 and 370, respectively. Controllers 360 and 362 serve to provide switching and control for input/output buses 372 and 374 of CPU's 308 and 312, respectively, and serve to switch data to communications lines. Tape transports 356 and 358 may comprise nine track 1600 cpi 75 ips transports, while moving head disks 302 and 304 are preferably of 100 to 300 megabit capacity. CPU 308 may comprise a minicomputer, such as Model No. SPC 16/440 manufactured by General Automation Co., while line controllers 284 and 286 may comprise standard SDLC (synchronous data link control) controllers also manufactured by General Automation Co. The above are by way of example only. The concentrators, such as concentrator 246, when utilized performs compatibility conversion between the various terminals coupled thereto via the FEP's associated with such terminals and is a minicomputer based subsystem for performing the various communications, network control telecommunication and data management and control functions. Fundamentally, concentrator 246 concentrates data received from hundreds of local terminals onto high speed digital lines to the SNAPS sites, such as SNAPS 224, and reconcentrates data received on the network for delivery to the local terminals via their respective FEP's. The concentrator configuration is substantially the same as the SNAPS configuration illustrated by FIG. 3. Thus, it can be seen that concentrator 246 and a SNAPS, such as SNAPS 300, perform the same functions of input data message collection, concentration, message transmission, message assembly and deconcentration to their respective terminals. However, the SNAPS has the additional function of transmission of accumulated data to and receipt of accumulated data from other SNAPS sites, i.e., the SNAPS handles communications over the trunk lines to other SNAPS, which internode trunk lines as previously described are preferably 9600 pbs or 56 K-pbs lines.

The network management center 244 while not essential to the operation of the described system, is utilized for system integrity purposes and may comprise a line minicomputer backed by a stand-by minicomputer, each with its own local memory and time shared memory and having a configuration similar to that of concentrator 246. The network management control 244 performs on-line functions such as network diagnostics, network monitoring and various off-line functions, such as maintaining statistics on network availability and reliability, collecting transaction information for the preparation of billings, etc. A console may be provided in the network management center 244 similar to console 350 for enabling an operator both to enter data and provide verbal assistance over standard telephone lines when so requested.

Referring now to FIGS. 4(a) and 4(b), a generalized and simplified system flow diagram illustrates the data flow of the system Executive software by which the control sequence and frequency of activation of the various system software routines are maintained. Certain of the Executive control software are table driven, i.e., enabled by means of look-up tables, and certain of the Executive software enables the storage and retrieval of the message data routed through the system.

Generally, FIGS. 4(a) and 4(b) in combination with FIGS. 5 through 9 describe in detail the flow of facsimile message data through the present system from the initial message acquisition at an individual facsimile terminal through the various source intermediate or transit and destination switching nodes and final delivery at a destination facsimile terminal location. The logic and control directing and interpreting the message and its constituent packets is described and is illustrative of the major software routines, look-up tables and buffers and their interaction in diagrammatic format. In the description to follow, the Executive program traces a linked chain of tables wherein each table is coupled to the next succeeding table by a pointer. The flow of data, while illustrated generally sequentially, may be interrupted asynchronously in response to various timing and external interruptions. The major system routines and tables described hereinafter are illustrated generally by FIGS. 4(a) and 4(b) wherein data flow is indicated by a double line, control lines by a single solid line and address pointers by a single waved line.

The basic running and maintenance of the communications system is accomplished by a set of software subroutines 400, 402, 404, 408, 410, 412, 414 and 416 which are periodically activated and illustrated generally at (A). Each of the plurality of periodic software subroutines has a unique execution starting binary address (B) contained within a look-up table associated therewith, which table serves as a Scan Vector List. Individual addresses 418, 420 and 422 point to software subroutines 400, 402 and 404, respectively, with other like addresses corresponding to subroutines 406 through 416. It is to be understood that there are many more subroutines and addresses involved; however, for simplicity of description, three groups are illustrated. The tables of execution starting addresses 418, 420 and 422, etc. are activated periodically by the Executive software 424 via its Executive address pointers 426, 428 and 430 coupled to the scan vector lists 432, 434, 436 and 438.

A Task Control Table is illustrated generally at 440 and is addressed by the Executive software 424 via Executive address pointers to enable the Executive software to monitor tasks such as the collection or delivery of specific messages. The Scan Vector List tables are linked in chain fashion by the Line Scan Chain 442, which are Executive Address Pointers. Each Task Control Table 440 is linked to a line scan in accordance with the frequency with which the described particular Task Table will be scanned, typically every 10 milliseconds, hundred milliseconds and one second. The individual Task Tables contain the Scan Index 444 into the Scan Vector List of the next software routine to be activated in the sequence required to effect the particular task. This address is updated in turn by each routine coupled back to the Task Table 440 via a data transfer 446 from the described software routine 414. Of course, data coupled back to table 440 via data line 446 may also pass data stored within the Task Table 440 along to subsequent routines. The second scan table, the 100 millisecond scan table and the 10 millisecond scan table are illustrated at 448, 450 and 452, respectively.

The Interrupt Service Table 454 contains the addresses of a plurality of interrupt routines at 456, one of which interrupt routine addresses being illustrated at 458 which responds to the various internal and external system interrupts. These interrupt routines 460 serve to couple control information via data control line 462 into the Task Table 440.

Referring now to FIG. 4(b) taken together with FIG. 4(a), a simplified system flow of the major Executive look-up tables and software routines which keep track of messages and the individual data packets which constitute such messages is illustrated.

The Message Table 470 is a look-up table which contains message information in binary form including destination and priority as well as the disk addresses of the packets constituting the message, one of which disk addresses being illustrated by pointer 472 for an individual packet 474 of a disk file 476.

The facsimile message delivery queue 478 consists of two sets of three address queues, one for each assigned priority, with queue set 480 being utilized for local delivery of messages and queue set 482 being utilized for remote transmission to other SNAPS sites. Each queue entry, such as entry 484, priority 1 of the local delivery set 480, is comprised of the address of its corresponding message table, such as table 470, on the message table address disk 474. All of the other facsimile message queues illustrated at 478 access the disk 476 in a like manner via their address pointers, such as pointer 486, which serves as a disk message table address.

The Task Control Tables 440, which are used by the Executive routine 424 to control the execution of Scan Vector routines and monitor interrupts, are each linked into a scan chain via pointers 442 and into the Scan Vector List 432 of scan vectors performing the next sub-task constituting a portion of the overall task to be performed, by pointers such as pointer 488. The Task Control Tables are classifiable by application as:

Line Task Control Tables, sometimes called packet tables, and which exist in core and represent the particular task being processed for a particular line, i.e., the high speed digital line in the SNAPS. Since each line task control table corresponds to a single line, line status information is contained therein.

Channel Task Control Tables are identical to line task control tables, contain channel status information and each such Channel Task Control Table is dedicated to one FEP channel or port.

Device Task Control Tables exist in core in a one-to-one correspondence for each device (facsimile terminal or other data terminal) and represent the particular task in performance for that particular device.

Process Task Control Tables are transient task control tables corresponding to infrequently executed tasks and are created only for the duration of the task such as supervisory overlay functions. Other tables contain broadcast information pointers, machine type information, etc., while still other tables contain destination telephone number, machine type information and other data indicative of the address and type of destination terminal.

The aforedescribed look-up tables may be implemented in accordance with well known programming techniques for data processing in core, on disk, magnetic tape, virtual memory and other data storage media. By the appendix annexed to this specification, typical aforedescribed Message Table and Task Control Table arrangements are illustrated. In particular, Appendix I illustrates a typical Task Control Table and Appendix II illustrates a typical Message Table.

Figure 8:
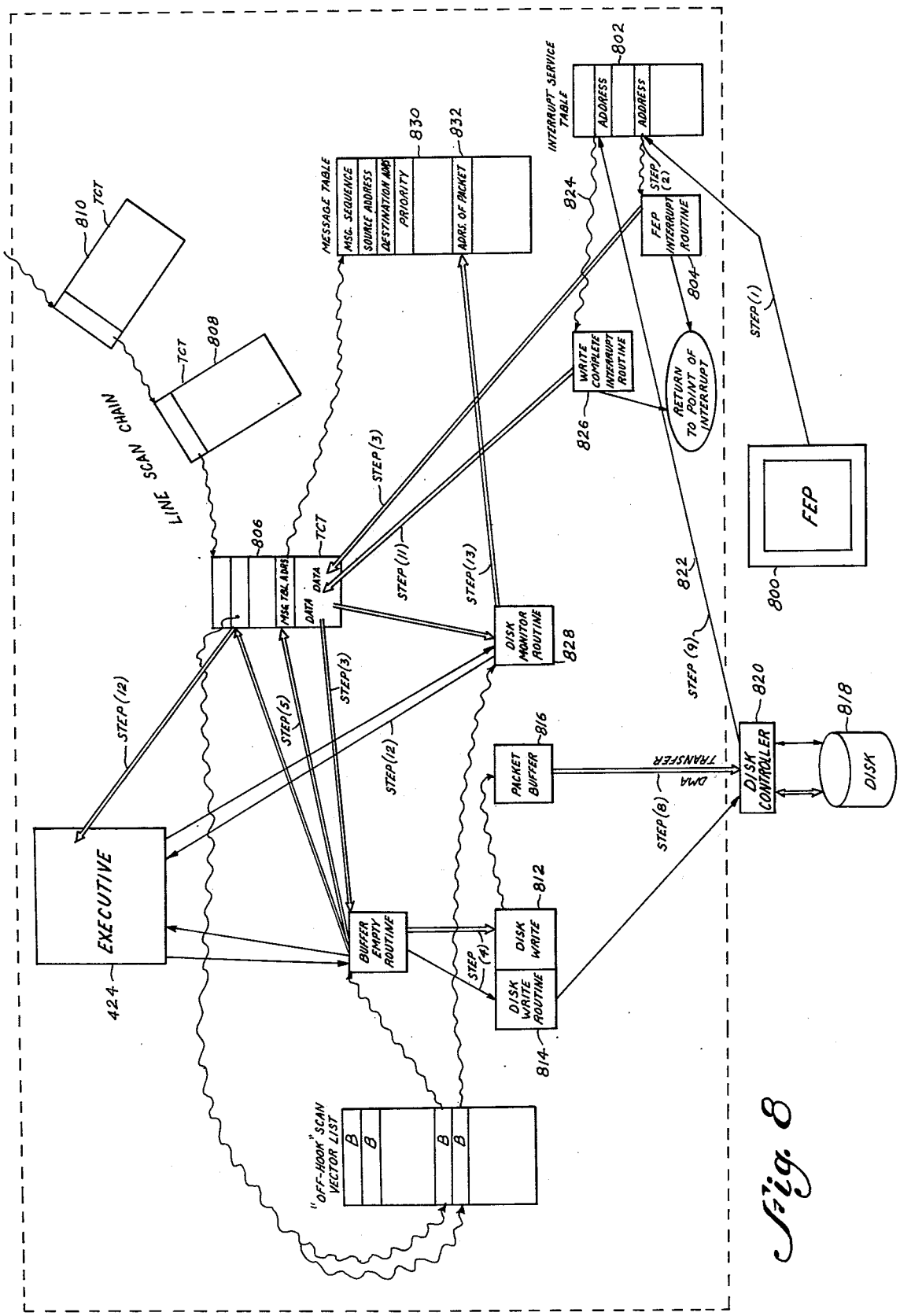
FIG. 8 is an operational flow diagram illustrative of a packet disk storage process in accordance with the present invention.
Figure 9B:
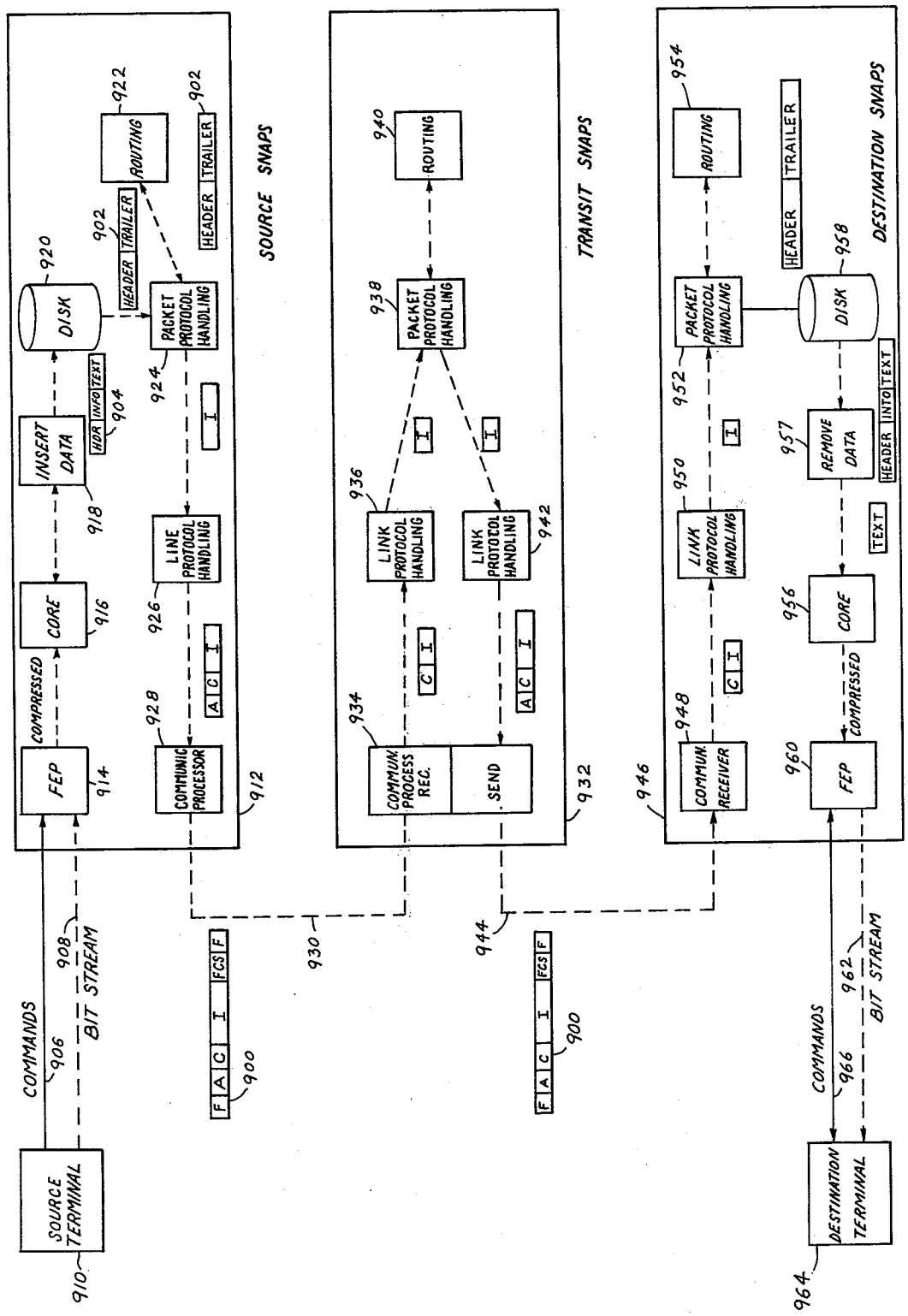
FIG. 9(b) is a simplified block diagram illustrative of hardware for implementing the protocol illustrated by FIG. 9(a)

Referring now to FIGS. 5, 6, 7 and 8, various simplified system procedures for the source SNAPS are illustrated, the source SNAPS being the SNAPS receiving digital messages generated at the front end processor associated with a plurality of local data terminals. This is distinguished from the identically configured transit and destination SNAPS which are operable to transmit messages routed from a source SNAPS thereto for delivery to a plurality of remote data terminals. The source SNAPS, in addition to collecting messages from and delivering messages to the plurality of local terminals, also serves to switch packets originating from other remote SNAPS in a manner designed to reduce message delay (a store-and-forward mode) and to expedite the timely arrival of incoming data packets at the destination SNAPS for which they are intended. FIG. 9(b) illustrates the message flow from the collection of messages at the source SNAPS from local terminals through the transit SNAPS which switches the packets through to a destination SNAPS and through the destination SNAPS which delivers the messages to designated local terminals via their associated FEP's. It is to be understood that all SNAPS actually perform all of the above-described functions simultaneously in a multi-task, full-duplex environment and the simplified description which follows of the message flow from a source SNAPS through a destination SNAPS is exemplary only.

The message access protocol of a source SNAPS for transmission of a message from a Front End Processor (FEP) to a Communications Processor contained within the source SNAPS for transmission of a facsimile message will now be described. The FEP and the Communications Processor are described in greater detail subsequently with respect to FIGS. 10 and 11. For purpose of the following description of the message access protocol, it is sufficient that the Communications Processor involved is the local SNAPS processor which directs the Front End Processor (FEP) which, in turn, communicates with a plurality of facsimile terminals in a command/response mode whereby a command is issued from the Communications Processor to the FEP to perform a specific operation at a specific FEP port at the conclusion of which the FEP provides a response and until such response from the FEP has been received by the Communications Processor, a subsequent command from the Communications Processor to the FEP will not be issued.

Communications between a FEP and a SNAPS Communications Processor in a command/response mode for each FEP channel are issued by the SNAPS Communications Processor as software collection routines, sometimes referred to as vector routines. These vector routines may be categorized as Connection Control Routines, described with reference to FIG. 5; Subscriber Control Routines, described with reference to FIG. 6; and Machine Control Routines, described with reference to FIG. 7.

The Connection Control Routine implements control of the subscriber telephone connection to the system, i.e., establishing and breaking connections by means of, for example, an external Touch-Tone (trademark of AT&T) pad and an acoustic coupler manufactured by Western Electric, or other known telecommunications connection equipment.

Before proceeding, the following channel status conditions and commands are defined, which collectively represent the connection control protocol.

Answer Enable — The FEP becomes non-busy to the switch, answers ring, responds acknowledgement (ACK) to the Communications Processor and maintains the connection. If no ring occurs, the FEP responds T/O (Time-Out) after a specified time and becomes busy to the switch.

Answer busy — The FEP becomes non-busy to the switch, answers rings, informs caller that system is not available, breaks the connection, goes busy to switch and responds ACK. Response to no ring same as Answer Enable. Unless commanded otherwise, all channels are busy.

Intercept — The FEP transfers subscriber to a human interfaced switchboard, and responds ACK. Occurrence of a subsequent command restores the connection to the FEP.

Recall — The FEP terminates the current process, requests the subscriber to call again, breaks the connection, responds ACK and becomes busy to the switch.

Abort — The FEP breaks the connection, responds ACK and becomes busy to the switch.

Good-by — The FEP issues good-by to subscriber, breaks the connection, responds ACK and becomes busy to the switch. Dial — The number provided by the Communications Processor is dialed by the FEP, FEP responds ACK when subscriber on line or Time-Out (T/O) if no subscriber after a specified amount of time.

Extension — The number provided by the Communications Processor is requested by the FEP. The FEP responds with ACK.

Wait — Request subscriber acknowledge, and FEP responds with ACK. FEP responds T/O after specified time with no acknowledgment.

The connection control process, utilizing the above protocol is described with reference to FIG. 5, wherein FEP channels are switched into and out of the Answer Enable mode.

The central processor periodically sequences each input port (channel) of the FEP 500 via line 504 into the Answer Enable mode. If a terminal operator does not dial in within a predetermined time via line 502 after the issuance of the Answer Enable command, the FEP 500 interrupts the SNAPS Communications Processor (step 1). An interrupt address in the Interrupt Service Table 506 causes an interrupt routine 508 to be executed. This action links the Task Control Table (TCT) 510 corresponding to the specific sequenced channel into the line scan chain (step 2) via an address pointer 512. A flag is set at TCT 514 indicating the FEP interrupt condition (step 3), and a scan vector is set via line 516 to process the aforementioned FEP interrupt (step 4), at which point the FEP interrupt routine 508 sequences back to the point of interrupt (step 5). On the next succeeding line scan by the Executive routine of the Task Control Table 514 (step 6), a "process FEP interrupt" scan vector is executed (step 7), which routine reads the FEP memory to obtain the interrupt code for this specific channel for determination that the appropriate response is a "not acknowledge" (NAK) response (step 8). In essence, the FEP channel status code is read by the process FEP interrupt vector shown at 520 via line 502. Another Answer Enable command is then issued to the specific FEP port (step 9) via line 504 in response to the NAK response which results in the final step in the sequence, the unlinking of the Task Control Table 514 from the line scan and the exiting and sequencing of the routine to the next FEP port (step 10) by the Executive 424.

As an alternative to the above sequence, when a terminal user via a specific FEP port establishes contact with the FEP at the user's specific port by bringing up (raising the voltage level of) the ring indicator line, then the FEP interrupts the Communications Processor with the process FEP interrupt routine which reads the FEP as aforedescribed by step 8 via line 502 to obtain the interrupt code on the specific channel by which the terminal user has established contact with the FEP; however, in this instance, an acknowledgment (ACK) response is appropriate. When this occurs, the scan vector index 524 is reset by a scan vector via address pointer 526 to access or "point to" the top of the process Off-Hook scan vector list 528, which operation is a substitute for step 9 previously described when the response is NAK rather than ACK, the final step (step 10) exiting and resumption of the Executive routine is as before. The Off-Hook scan vector list contains addresses such as addresses 530, 532 and 534 of Off-Hook routines, such as Off-Hook routines 536, 538 and 540. As is apparent, a variety of routines are available to a terminal user once access to the system via the aforedescribed connection control is gained, while an interrupt routine causes the FEP to sequence to the next channel when no indication at a channel that a user desires access to the system.

Once access to the system is gained by the Connection Control Process, a means for interchanging control information with a terminal subscriber (user) is necessary. This means is provided by the Subscriber Control Process described with reference to FIG. 6 and by which process a software routine in the Communications Processor causes the FEP 600 to respond with an appropriate voice message prompting the terminal subscriber to enter appropriate data via the subscriber's Touch-Tone connection pad accumulating the generated Touch-Tone information once requested, performing a check sum on the entered and accumulated Touch-Tone generated data and finally coupling the error check data to the Communications Processor. Before describing the Subscriber Control Process, the following terms are defined:

Fetch I.D. — FEP voice requests subscriber to enter ID. FEP responds ACK with ID if entered properly, NAK if entered improperly, T/O (time-out) if not entered within a specified amount of time.

Request Priority — Same as above except priority is requested.

Request Destination — Same as above except destination is requested.

Message Pending — FEP voice informs subscriber that a message is pending and waits for subscriber to enter Touch-Tone. FEP responds ACK if subscriber wants delivery, NAK if delivery not wanted, T/O if no subscriber response.

Retry — FEP voice request to subscriber to repeat last transfer. (The Communications Processor identified the previous command). Responses are those for previous command.

Continue — FEP voice requests subscriber and informs Communications Processor of the subsequent subscriber response (destination, priority, data transfer, cancel previous entry).

Copy Verify — FEP voice requests subscriber to verify received copy. FEP responds ACK if okay, NAK if not okay and T/O if no subscriber response.

Operator Instruction N — FEP voices sequence to subscribed as specified by CP. FEP respondes ACK. (Messages such as "set machine to 4 minutes").

Parameter Request N — FEP voice sequence to subscriber requesting that Touch-Tone digits be entered. FEP responds ACK with digits, NAK if error, T/O if no response.

Time-out (T/O) — The expiration of a predetermined period of time during which a response should occur.

The first step in the Subscriber Control Process is the scanning of the line scan chain of Task Control Tables 602, 604, 606, etc., by the Executive routine 424 which examines each of said Task Control Tables in turn and in response thereto activates one of a plurality of stored Off-Hook routines 608 (step 1). Of course, Off-Hook routine 608 which is accessed by an address pointer 610 from an Off-Hook scan vector list of addresses 612 of which address 614, the address corresponding to pointer 610, being only one, contains a number of other Off-Hook routines. However, for simplicity of description, only one will be described.

In essence, the Off-Hook routine 608 creates a core Message Table by acquiring a buffer from a common card pool, which message Table is linked to the Task Control Table 602 associated with the particular FEP port in use at the time. This link is established via line 616 to the Message Table address 618 in Task Control Table 602, which Task Control Table 602 has stored therein data indicative of the status of the particular operation being performed on the particular FEP port currently in use. This constitutes step 2 of the sequence. As can be seen, the Message Table 620 is accessed by pointer 622 from the Message Table address 618 stored in Task Control 602. At the conclusion of step 2, the next routine address in the Task Control Table 602 is reset to indicate to the Executive routine 424 the next routine to be executed in the sequence of vectors comprising the message collection operation. Thus, each routine is programmed to be informed of the next subsequent routine and also is programmed to be capable of locating such subsequent routine in Task Table 602 by virtue of a programmed knowledge of the position of such subsequent routine in the Task Table. Exemplary of the above and for the particular Off-Hook sequence described, the Off-Hook routine 608 activated by the Executive by previously described step 1 would then issue a Fetch ID command (step 3) via line 624 to the FEP 600, which command is received by the FEP (step 4) which, in turn, causes the Fetch ID routine to be the next routine activated via line 626 (step 5) and finally causing the Executive 424 to exit from the Fetch ID routine (step 6).

Figure 6:
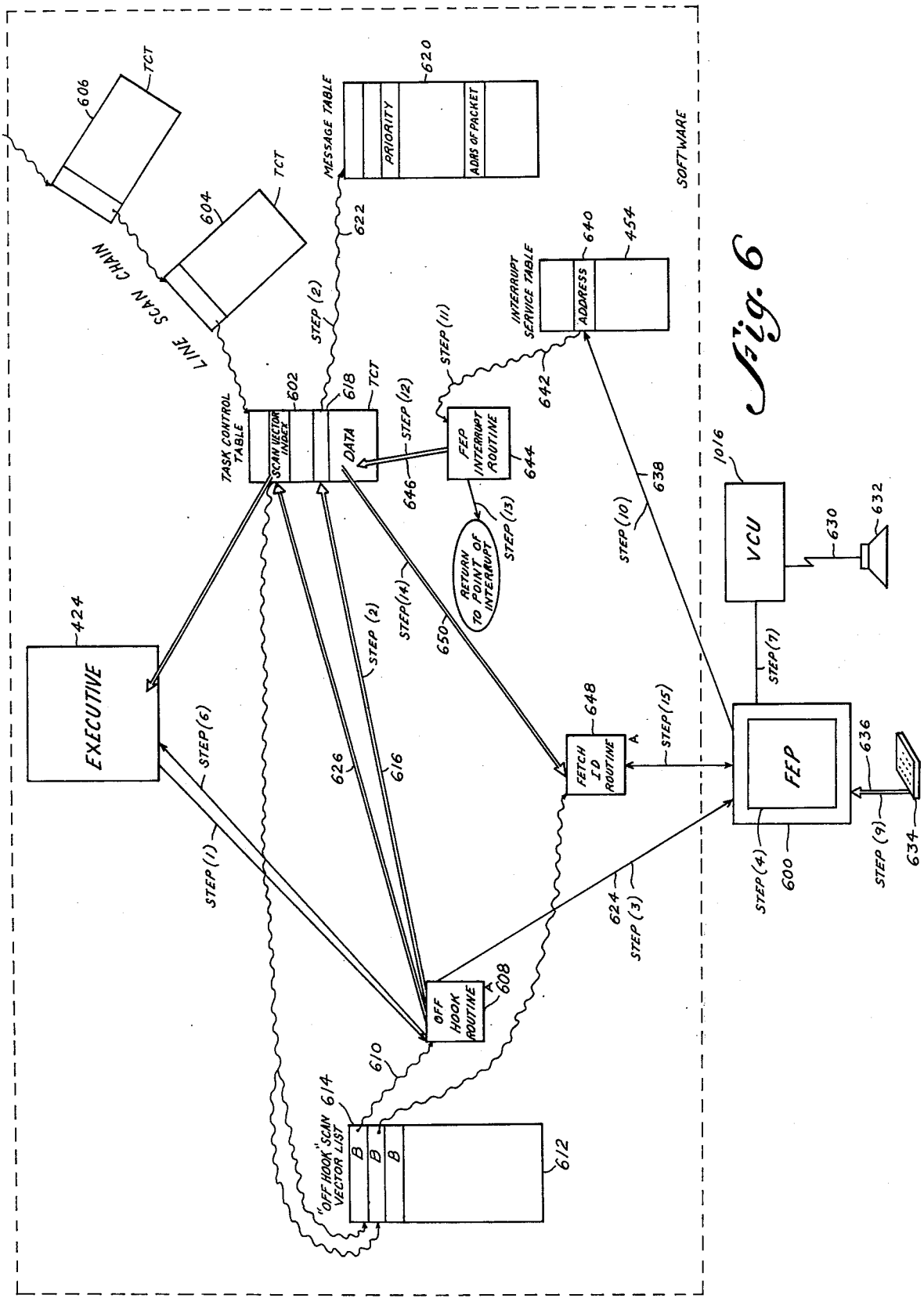
FIG. 6 is an operational control flow diagram illustrative of the subscriber control process of the present invention.
Figure 7:
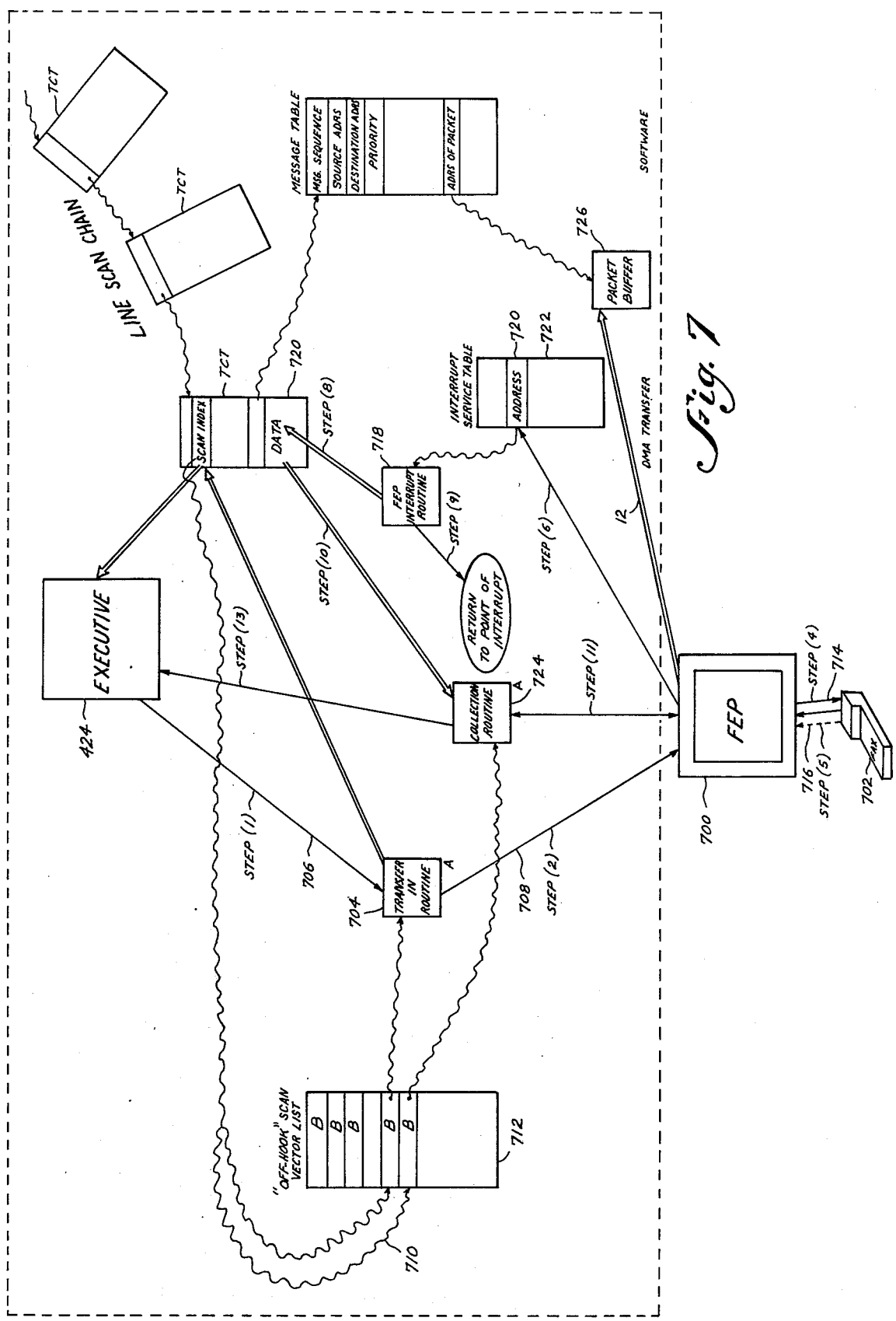
FIG. 7 is an operational control flow diagram illustrative of the machine control process of the present invention.
Figure 13:
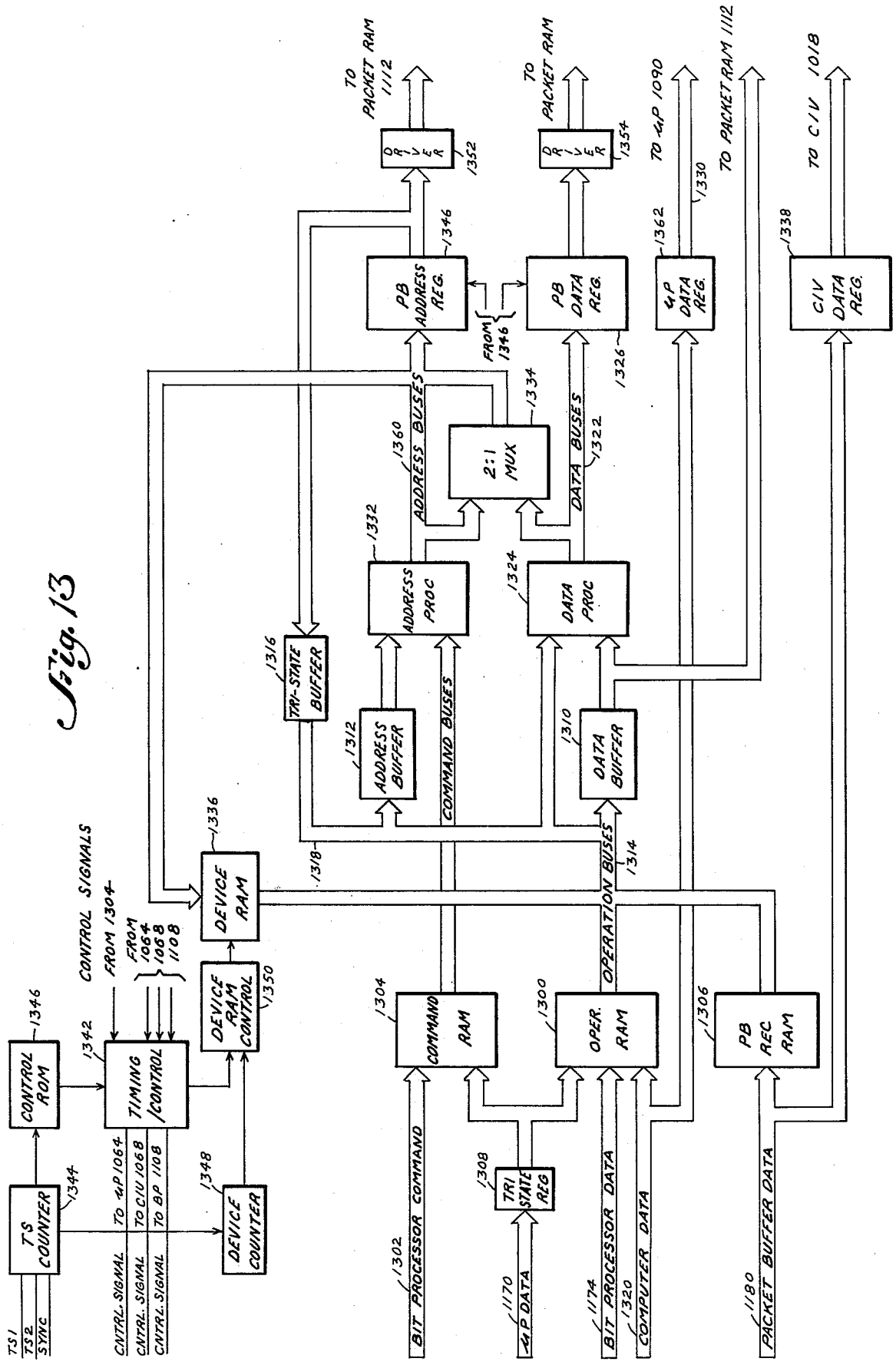
FIG. 13 is a functional block diagram of the Memory Access Unit portion of the Front End Processor of FIG. 10.

The above sequence of steps 1 through 6 causes the FEP to activate its voice control unit 1016 described in detail with reference to FIG. 13, which activation is operationally shown as step 7 in FIG. 6. The voice control unit 1016 in turn transmits an audio command via a telephone line 630 to the terminal subscriber (step 8). The subscriber, in response to the voice output from telephone transceiver 632 enters the requested information for coupling back to the FEP 600 via the operator's Touch-Tone pad 634 via line 636 and which operator data entry constitutes step 9 of the Subscriber Control Process. The Communications Processor is then interrupted via line 638 to indicate this newly acquired data (step 10). This indicia is created by the association of the operator generated data with a particular address 640 in the Interrupt Service Table 454 described with reference to FIG. 4(a), which particular Interrupt Service Table address 640 has an address pointer 642 associated therewith, which address pointer 642 is coupled to the FEP interrupt routine table 644 (step 11) for selection of a particular interrupt routine stored therein. The selected interrupt routine is coupled via line 646 to the Task Control Table 602 for setting a flag therein (step 12), which flag is indicative that a FEP interrupt has been received as a result of operator entered data. At this point, the Executive routine is returned by the FEP interrupt routine 644 to the point of interrupt (step 13).

The activation of the Fetch ID routine as aforedescribed causes Fetch ID routine shown illustratively at 648 to examine the Task Control Table 602, illustrated by line 650 as step 14 to determine whether, in fact, a response has been entered from the subscriber. In the event that such a subscriber response has not yet been received and no time-out (T/O) indicated, the Fetch ID routine 648 will exit, i.e., the Executive 424 will return to the status existing before the activation of the Fetch ID routine. On the other hand, if a time-out has occurred, the subscriber is again prompted by voice control unit 1016 via telephone line 630 by a repetition of the aforedescribed steps. In the event, however, that the response has been received and no time-out has occurred, the fetch ID routine 648 reads the ID (user identification) inputted to the FEP by the terminal operator for subsequent processing, which includes as step 15 the checking of the ID against a list of varied ID's issuing the next command if necessary, updating the next vector routine addresses to a routine capable of handling the expected response, and finally, the termination of the routine sequence.

Once the connection is established between an operator and a FEP as described with reference to FIG. 5 and all of the requisite subscriber information obtained, as described with reference to FIG. 6, the actual control of data terminal must be implemented. This machine control implementation is illustrated operationally by FIG. 7 for the control of a facsimile machine 702 by a FEP 700 after the aforedescribed connection and subscriber control has been established. Before describing the machine control process, the following conditions are defined:

Transfer In — FEP initiates the handshake sequence specified by the Communications Processor to cause the facsimile machine to transmit. FEP responds Buffer Full with buffer addresses upon assembly of a packet, T/O if no response in specified time, Error if signal fault, Cancel if subscriber initiated halt, EOM with buffer addresses when last block available, Fail if handshake fails.

Transfer Out — FEP initiates the handshake sequence specified by the Communications Processor to cause the facsimile machine to receive. FEP responds Buffer Empty with buffer addresses, T/O if no response in specified time, Cancel if subscriber initiated halt, Fail if handshake fails.

Partial Transfer Out — Same as above except that Communications Processor specifies block size and FEP responds with ACK when buffer empty.

Restart — FEP halts present transfer and requests subscriber to restart operation. FEP responds ACK or T/O if no subscriber response in specified time.

Facsimile machine 702 is instructed to begin serially transmitting its data while scanning to the FEP 700 as follows. The Executive routine 424 activates a data transfer in routine 704 via line 706 (step 1), which transfer in routine is coupled as a control sequence via line 708 to the FEP 700 (step 2) which causes an Off-Hook scan vector list pointer 710 to be generated for the Off-Hook scan vector table 712 (step 3). This, in turn, by means of the transfer in routine 704 causes the actual transfer of data to occur by virtue of the reception of the transfer in routine at FEP 700 (step 4) via line 714 and the actual tranfer via line 716 to the FEP (step 5). After transfer to the FEP, facsimile data is compressed and accumulated in compressed form therein in a packet RAM as described with reference to FIG. 11 until the FEP's two 8 K-bit buffers per channel are full (buffers 1112 of FIG. 11). The two 8 K-bit buffers do not fill simultaneously, but rather upon the filling of one of the 8 K-bit buffers, an alternate 8 K-bit buffer is switched into the channel for data accumulation at which point the Communications Processor is interrupted (step 6) by an interrupt routine 718 selected by an interrupt address 720 from Interrupt Service Table 722. The selection of the FEP interrupt routine 718 (step 7) serves to set a flag in the Task Control Table 720 (step 8) which indicates that a FEP interrupt has been received. The routine then exits (step 9) to enable the next routine, a data collection routine 724, which awaits the aforedescribed interrupt and which collection routine after waiting for the interrupt routine 718 (step 10) reads the interrupt code from the FEP (step 11), acquires a packet buffer for initiating the block transfer of packetized data from the facsimile terminal by coupling the requisite parameters, such as buffer address and byte count, to the required packet buffer to enable the aforedescribed transfer (step 12) to packet buffer 726. Finally, the collection routine exits (step 13) to the Executive to enable the cycle to be repeated.

The final process involed in the receipt of messages from the FEP is the packet disk storage process, described with reference to FIG. 8. This process occurs after an entire packet of data has been transferred from the FEP 800 by the Machine Control Process described with reference to FIG. 7, at which point a "packet buffer empty" condition causes the FEP 800 to interrupt the Communications Processor (step 1) via Interrupt Service Table 802 which, in turn, activates FEP interrupt routine 804 (step 2). The FEP interrupt routine 804 triggers an appropriate scan vector routine (step 3) in the line scan chain of Task Control Tables 806, 808 and 810. The scan vector routine selected from Table 806, for example, in addition to performing an error check on the packetized data transfer from the FEP, also enters the address of the particular packet buffer to which the incoming data has been transferred in a queue of requests to the Communications Processor disk at a disk write queue 812 under the control of a disk write sub-routine 814 (step 4). After an entry is made in the Task Table 806 indicative of a signal showing that the addresses have been queued for entry in the disk (step 5), the particular address of a control sub-routine in the Executive 424 is accessed to monitor the disk write queue 812. The disk write routine 814 then initiates a DMA transfer of the packet buffer data in packet buffer 816 to the Communications Processor disk 818 via a disk controller 820, which transfer may collectively be considered as step 8 of the packet disk storage process. At this point in the sequence, a write-complete interrupt routine from the disk controller 820 via line 822 indicates the data transferred to the disk via Interrupt Service Table 802 (step 9) which, by means of an address pointer 824, triggers the write-complete interrupt routine 826 (step 10) to alert the Task Control Table 806 of the data transfer (step 11). On the next scan of the Task Table 806 by the Executive routine 422, the aforedescribed routine which keeps track of the packet buffer collection on the disk 818 is activated (step 12) and which disk monitoring routine is indicated operationally at 828 and which disk monitoring route 828 enters the Message Table 830, the disk 818 sector address into which the particular packet was written (step 13) and which is illustrated in the Message Table 830 at 832. Packet buffer 816 is then erased or "deallocated" and the next packet buffer is awaited by so alerting the Executive routine via line 834 (step 14). While the aforedescribed process has been with reference to a single packet acquistion and writing into disk, it is to be understood that the process is repeated for each packet received until all data packets comprising the received facsimile message have been written into disk 818 and an entry made in the message delivery queue indicating the disk 818 sector address of the Message Table 830. For simplicity of description, priority queuing has not been described; however, it is also to be understood that in actuality the entries constituting the entire facsimile message delivery queue are linked into one of three chains in accordance with the priority with which the particular associated facsimile message must be delivered, i.e., within fifteen minutes, within four hours, or overnight. The message transmission from a source SNAPS to a remote or transit SNAPS will now be described. The Executive routine 424 monitors the traffic flow and the appropriate low traffic conditions, i.e., low workload conditions, causes a sub-routine to be initiated which reads messages from the disk 818 and transmits such messages via the communications network to remote switching sites which may or may not be the final destination for the transmitted message.

Upon arrival at a transit SNAPS, a packet is read into a packet buffer. After ascertaining that the packet is in transit, a routing table is accessed, which causes the packet to be queued to an optional line queue in similar manner as described hereinbefore with reference to the source SNAPS. Routing is accomplished by means of a routing algorithm which, in essence, is a matrix representation of switching nodes versus lines. By scanning this matrix and receiving data indicative of the queues associated with each line, an optimum line may be chosen.

The three protocols involved in message transmission are:

Link Protocol, which describes the data exchanged between linked SNAPS communication processors;

Packet Protocol, which describes the data exchanged between the source and destination SNAPS communication processors; and Message Protocol, which describes the exchange of messages between source and destination SNAPS communication processors and between terminals and FEP ports.

A simplified description of the implementation of the above protocols and the filtering out of the various fields during transmission is illustrated by FIGS. 9(a) and 9(b). With reference to FIG. 9(a), the Link Protocol 900 provides for, by way of example, hardware link address recognition with a software insertion of secondary addresses. An 8-bit flag (F) identifies the opening and closing sequence of a frame; an 8-bit address field (A) identifies any secondary link origin or destination information; an 8-bit control field (C) includes whatever control information is required to perform the link control functions; the variable bit length information field (I) contains the basic text to be conveyed; and a 16-bit frame check sequence (FCS) contains data error checking information. All of the above fields (except the information field) are inserted by the source SNAPS processor on transmission and are similarly removed, or "stripped off" by the destination SNAPS processor upon arrival thereby leaving only the information field which constitutes the actual data packet.

The packet 902 is controlled by the packet protocol and is included in the information field of the link frame 900 controlled by the link protocol. The packet is subdivided into header and data information portions, described in detail with reference to FIG. 19. The header contains packet control information while the data portion contains the message information.

The message segment 904 comprises the data portion of the packet and is controlled by the message protocol. The message segment is further subdivided into an information field (I) and a data field. The information field includes such data as message priority, facsimile machine type, facsimile scanning speed, drum speed, etc. The data field consists of the bit patterns of the packet, which are, as described hereinafter, compressed for facsimile data.

The transmission of packetized facsimile data from a source SNAPS to a destination SNAPS via a transit SNAPS utilizing the protocol described with reference to FIG. 9(a) will now be described operationally with reference to FIG. 9(b).

Link level error recovery is accomplished by maintaining buffers for storage of a plurality of frames, such as six, at all SNAPS processors, which frames are sequentially numbered and retained in the buffers until receipt is acknowledged. If the frame sequence is incorrect, received frames are discarded and retransmission requested from the buffer of the SNAPS from whence the transmission was received.

Packet level error recovery is incorporated into the routing algorithm. For example, in order that "ping-ponging" of a packet between SNAPS may be avoided, an algorithm (or mathematical rule) is provided to inhibit a packet from retransmission back to the SNAPS from which it was received, regardless of the fact that the routing algorithm might show this to be an optimum path. Similarly, packets present in the network for too long a time, "roaming packets", may be discarded since statistically a request for retransmission will have already been made.

Message level error recovery may be accomplished by providing data indicative of the total number of packets constituting a message in a predetermined number of packets, such as in the first three packets, thereby enabling a ready check on the number of packets expected. Errors in received packets are determinable by the appended packet check-sum. As previously mentioned, all packets are retained on disk at the source SNAPS until the entire message is successfully received at the destination SNAPS.

Data comprising commands and facsimile message information on lines 906 from a facsimile terminal 910 is coupled to the source SNAPS 912 at its Front End Processor (FEP) 914, wherein it is compressed into 8 K-bit blocks and stored in core 916. The protocol described with reference to FIG. 9(a) is inserted by the SNAPS processor at 918, written on disk 920, routed by routing matrix 922 for packet protocol processing at 924 wherein the header is stripped from the packet prior to the reassembly of a new header by the line protocol processing means 926. The Communications Processor 928 couples out the packet with full link protocol 900 attached thereto into the communications network 930. Protocol insertions 918, 924 and 926 and routing 922 are all accomplished internally by the source SNAPS Communications Processor 928.

The packet is routed to a transit SNAPS 932 and is received by the transit SNAPS Communications Processor 934 wherein it is stored in packet buffers therein prior to Communications Processor 934 processing for link protocol at 936, packet protocol at 938, and routing at routing matrix 940. The address and control fields are reinserted at transmission link protocol processing 942 and finally, the packet with full link protocol is retransmitted from transit SNAPS Communications Processor 934 onto the network on line 944 to the destination SNAPS 946.

Upon arrival of the first message packet 900 at the receiver portion 948 of destination SNAPS 946 Communications Processor, the message and packet tables previously described are acquired. After stripping of the control field from the packet by the SNAPS Communications Processor link protocol 950, the information field is processed for packet protocol at 952 under control of routing matrix 954. The packet is read into the core buffer 956 after stripping of the header at 957 and stored on disk 958 in similar manner as in the source SNAPS 912. After errorfree receipt of the complete message (as determined by the packet sequence numbers), the message table is updated for message delivery and priority purposes. At appropriate low system load condition times, the stored packetized messages are read from disk 958 to the FEP 960 for transmission via line 962 to the appropriate destination facsimile terminal 964. A request for the message is coupled from the terminal 964 to the FEP 960 via Touch-Tone signals on line 964. It is important to note that source facsimile terminal 910 and destination facsimile terminal 964 may be totally incompatible in scanning rate, modulation, protocol, etc.; however, the described protocol and the packetizing by the FEP, described in detail hereinafter, enables such otherwise incompatible terminals to communicate with each other. By use of the Message Table, packets constituting the facsimile message are read sequentially from disk to core for transfer to the facsimile terminals serviced by each FEP, a packet at a time.

Figure 9C:
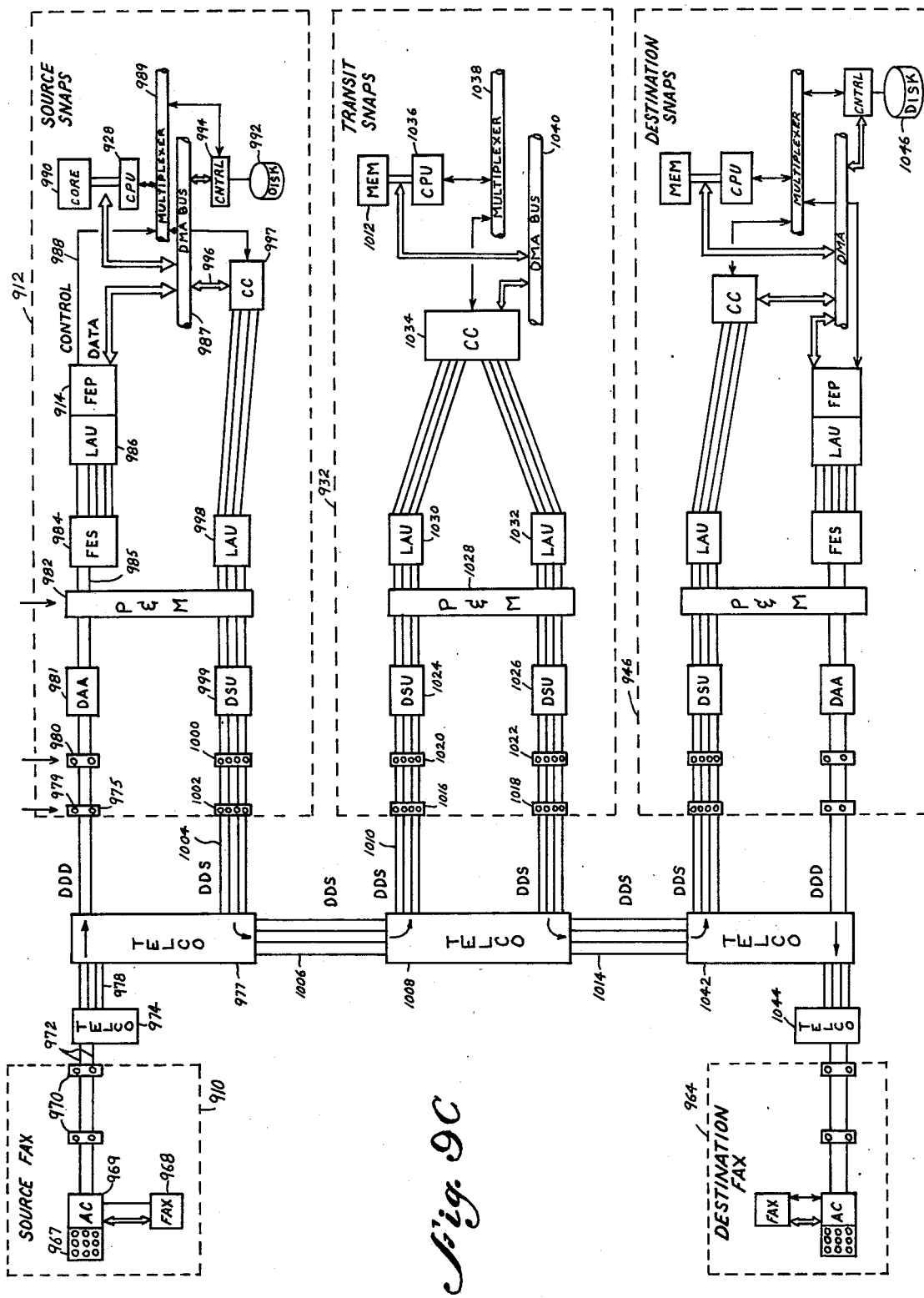
FIG. 9(c) is a block diagram of the telecommunications apparatus utilized in implementing the transmission of data in the configuration illustrated by FIG. 9(b)

Referring now to FIG. 9(c), a simplified block diagram of the major system elements utilized to implement the message transmission described operationally with reference to FIG. 9(b) is illustrated. The illustrated source facsimile terminal 910, one of up to 32 serviced by FEP 914, may generate a data output in either acoustic, analog or digital form. Acoustically generated data and analog data generated by use of a Touch-Tone pad 967 from the facsimile terminal 910 is coupled to a standard acoustic coupler 969 to a conventional telephone handset to initiate transmission. Facsimile outputs in digital or analog form from facsimile machine 968, after coupling to line 972 via readily available and standard modems, are coupled to a telephone company exchange 974. For simplicity of description, the acoustically coupled data technique is illustrated. These signals are coupled through standard demarc equipment 970, such as is provided by American Telephone and Telegraph Company via voice grade loop lines to local exchange 974. Exchange 974 is coupled to the source SNAPS 912 exchange 977 via high speed, full-duplex (FDX) trunk lines 978. As previously mentioned, lines 972 from local exchange 974 to the facsimile terminal may comprise a voice grade loop line. The above lines may be conventional dial-up (shared) lines or leased (dedicated) lines. From the source SNAPS exchange 977, analog signals are coupled through demarc 979 (which may comprise an AT&T demarc as aforedescribed) to another demarc 980, which may comprise a standard ITT demarc from which said signals are connected to a Data Access Arrangement (DAA) equipment 981. DAA 981 comprises readily available interconnection equipment required to be used by and leased from AT&T and which contain circuitry to limit frequency, voltage and current excursions of non-AT&T equipment connected to the common carrier lines. Conventional patch and monitor equipment 982 provides interconnection between the communication lines in accordance with standard telephone monitoring equipment. After coupling through the patching and monitoring equipment 982, a standard front-end-switch (FES) 984 functions as a concentration switch enabling the greater number of lines 985 to interface the smaller number of FEP ports. Such switches are well known and are described in detail by *ITT Reference Data For Radio Engineers,* Sixth Edition, 1975 at 36-1 through 36-7. The particular Line Adapter Unit (LAU) described in detail with reference to FIG. 12 and which is a part of FEP 914, among other functions, matches impedance, current and voltage between the common carrier lines and the FEP 914 input ports. When coupled to the FEP 914, the incoming data initiates the various control sequences between the FEP and the source SNAPS Communications Processor 928 described hereinafter. After the incoming data is demodulated, converted to a packetized digital format, compressed and buffered by FEP 914, it is coupled to a Direct Memory Access (DMA) bus 987. The sequential command/response control between Communications Processor 928 and FEP 914 is described elsewhere herein; however, such control signals via line 988 are interchanged via the Communications Processor multiplexer bus 989. After connection and subscriber control have been established as described with reference to FIGS. 5 and 6, respectively, the data transmission occurs, compressed data is stored in a FEP buffer, the FEP 914 interrupts the Communications Processor 928 to initiate a block data transfer via the Communications Processor DMA bus 987 as follows.

A control signal is generated by FEP 914 on line 988 which interrupts the Communications Processor 928 causing it to temporarily suspend its current operation and transmit an acknowledge signal back to the FEP 914. The FEP then responds with a synchronization signal and transmits its port identification number to the Communications Processor 928. The Communications Processor 928 then stores the current program status information in its core memory 990, readies a data register and jumps to an interrupt service routine via its interrupt table which interrupt service routine after checking the device status, sets up the buffer address and available byte count and instructs the FEP to initiate its data transfer. During the data transfer from the FEP to the CPU 928, the Communications Processor 928 becomes free to restore the status of the interrupted program stored in core and continues execution thereof. Upon completion of the data transfer, another interrupt is generated by the FEP to the Communications Processor 928 at which time the Communications Processor 928 determines whether the transfer was error free, in which case, it returns to its interrupt task or if not, the transfer is reinitiated. As previously described, the data packets are moved from core 990 to disk 992 via the DMA bus 987 and its associated control 994 until such time as transmission to the next SNAPS site, i.e., transit SNAPS 932, occurs. The data packets are read from disk 992 back into core via DMA channel 987 and then by DMA transfer again via line 996 to the source SNAPS communications controller (CC) 997. Disk 992 is preferably a 100 megabit-300 megabit moving head disk for temporary packet storage although taped transports may also be utilized for the storage of messages for as long as six months on appropriate magnetic tape reels.

Communications controller 997 includes sufficient software for the handling and interpretation of the bit oriented protocols described herein elsewhere in detail. The data packets from the communications controller 997 with the appropriate link protocol appended thereto are coupled through a Line Adapter Unit 998 of like design as Line Adapter Unit 986 to the patch and monitor equipment 982, wherein it is coupled for high speed digital transmission, for example at 56 K-baud, over the common carrier lines. If, for example, data from digital service (DDS) network is utilized, then the appropriate digital conversion device within the patch and monitor equipment 982 comprises a standard data service unit (DSU) 999. Alternatively, when conventional high speed lines are utilized, then the unit 999 would comprise an appropriate modem. It is sufficient for an understanding of the coupling of data onto the transmission line that the DSU provides an interface for signals from the data terminal equipment to pass bipolar line signals required by the digital network and also provide for such functions as loop equalization and network protection. After the aforedescribed conversion by DSU 999, the data is coupled through the previously described ITT demarc equipment 1000 and AT&T demarc equipment 1002 from whence it is coupled by digital transmission lines, such as data from digital service lines 1004 to the telephone exchange 977, back onto the digital transmission lines 1006 and onto the network to the next SNAPS exchange 1008 of identical configuration as exchange 977 from whence it is coupled via digital transmission lines 1010 to the transit SNAPS 932 and which includes equipment of substantially identical configuration as that described with reference to source SNAPS 912. Briefly, data packets entering transit SNAPS 932 are coupled through into core storage 1012 and then switched out again via digital transmission lines 1014 as rapidly as possible. AT&T demarcs 1016 and 1018, ITT demarcs 1020 and 1022, digital service unit 1024 and 1026, patch and monitor racks 1028, Line Adapter Unit portions 1030 and 1032 of their respective FEP, communications controller 1034, Communications Processor 1036, multiplexer bus 1038 and DMA bus 1040 all correspond to the equipment described with reference to the source SNAPS 912. From lines 1014, the data packets are coupled to the destination SNAPS 946 exchange 1042 to the destination SNAPS local exchange 1044 wherein the received data is stored on disk 1046 from which disk such data is coupled out for local delivery via the illustrated destination SNAPS equipment which is identical to that illustrated with respect to the source and transit SNAPS and hence, is not described in detail. However, it is sufficient to state that after processing at the destination SNAPS 946 and coupling through exchanges 1042 and 1044, the data is transferred in a half duplex local loop to destination facsimile terminal 964 including a facsimile unit, Touch-Tone pad, acoustic coupler and handset of like structure as is contained at facsimile terminal 910.

Referring now to FIG. 10, the Front End Processor (FEP) which serves to implement the full-duplex communications interface between the various facsimile terminals of various speeds, modulation and handshake protocols is illustrated. It is to be understood that each FEP is organized as four independent modules of 32 channels each; hence, for simplicity of description, FIG. 10 is illustrative of one such module. Such facsimile terminals are coupled to the FEP via lines 1052, 1054 and 1056 coupled to Line Adapter Units 1058, 1060 and 1062, respectively, of the FEP which Line Adapter Units are described in detail with respect to FIGS. 11 and 12 hereinafter. While thirty-two Line Adapter Units are illustrated by the FEP module of FIG. 10, additional communications ports are obtained by adding more FEP modules which provides for redundancy in the event of a system failure; however, for simplicity of description, three (Line Adapter Units 0, 1 and 31) are described with inputs thereto from their respective facsimile terminals. These facsimile terminals are coupled to lines 1052, 1054 and 1056 by well known coupling techniques, such as acoustic couplers or modems readily available for use with either dedicated or non-dedicated lines. Such coupling is described in greater detail hereinbefore with respect to FIG. 9(c). All control sequences of the FEP are implemented by a microprocessor and associated logic 1064 having firmware organized to permit the utilization of various dissimilar facsimile terminals by the system. The microprocessor interacts with the Line Adapter Units, a voice generating and control unit 1066, Computer Interface Unit 1068, the Memory Access Unit 1070 and the random access packet memory 1072 for starting, coordinating and monitoring all of the sub-functions of such units. Microprocessor 1660 portion of microprocessor and associated logic 1064 may comprise an Intel 8080 microprocessor for implementing the various digital data transfers within the FEP. All data transfers between the Line Adapter Units 1058 and the other 32 Line Adapter Units illustrated by Line Adapter Units 1050 through 1062 are bit-serial transfers as are the data transfers from the Voice Generating Unit 1066 to the Line Adapter Units. All other data transfers are parallel byte (8-bit word) data transfers. The microprocessor 1660 and associated logic is described in greater detail with reference to FIG. 16.

The FEP is comprised of six major subsystems, the first being the Line Adapter Units, such as Line Adapter Unit 1058 hereinafter referred to as LAU. The LAU is in essence the interface between the FEP and a two-wire telephone line via a Data Access Arrangement, hereinafter referred to as a DAA. The telephone line may comprise either a dial-up line or a private line with such line being a nominal 3 kc voice grade telephone line. The Line Adapter Unit's primary function is to perform the conversion between the serial analog tones originating at facsimile terminals on the telephone lines, such as line 1052, and the digital signals within the FEP.

Figure 11:
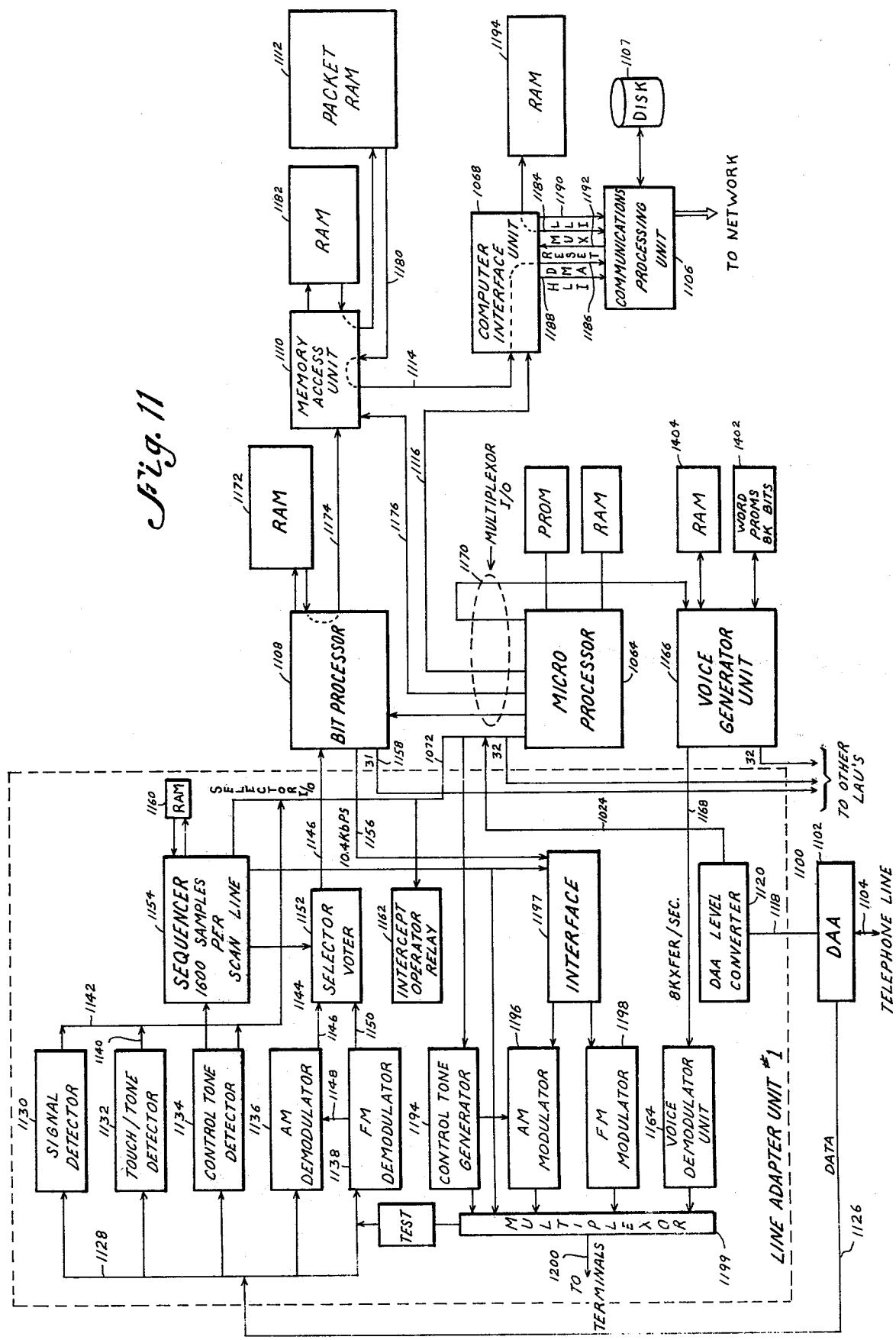
FIG. 11 is a simplified functional block diagram illustrative of the communications interface illustrated by the Front End Processor of FIG. 10.

The second subsystem comprised within the FEP is the Bit Processing Unit 1071 described in greater detail with respect to FIG. 11, which bit processor interfaces all of the LAU's supported by the FEP module (up to 32 LAU's) on a dedicated bus. After each LAU converts its respective black and white tones coupled thereto via its respective phone line to black or white bits, the bit processor scans such converted black and white bits and executes a compression algorithm on the incoming bit stream coupled thereto via the data bit bus 1075 and on an average, outputs about one-fifth the number of bits as are received. Thus, the facsimile compression is accomplished within the bit processor as will be described subsequently.

The compressed data output from the bit processor is coupled to the third major subsystem of the FEP, the Memory Access Unit hereinafter referred to as the MAU 1070 wherein the compressed data is stored in packet RAM 1072 which has a capacity of 64 packets of 8 K-bits per packet. The bit processor 1071, which includes a bit scanner 1073 and data compression/expansion and character generating circuitry 1069, upon transmitting bits to the LAU's when operating in the transmission mode, receives compressed data from the MAU 1070 and executes an expansion algorithm on such compressed bits prior to sending the recovered bit pattern to the LAU's wherein they serve to modulate carrier tones to the receiving facsimile terminal. The bit processor also performs vertical compensation on data bits from the MAU's for transmission to facsimile terminals which perform a different number of scans per vertical inch than performed by the originating facsimile terminal. By implementing the compression algorithm in the bit processor, less memory is taken up on the FEP for storage of the digitized facsimile image and the time required for transmission of the digitized facsimile image between the various switching nodes is substantially reduced, resulting in a lessened requirement for core memory and transmission line time, since more data may be transmitted per unit of time between switching nodes.

The third major subsystem of the FEP is the MAU 1070 which is coupled via the bit processor to the LAU's and controls the packet RAM 1072 wherein the compressed digitized facsimile images are stored. Essentially, the MAU after receiving the compressed data bits from the bit processor have all the LAU's store such compressed data in buffers in packet RAM 1072 and monitors the content of such buffers via a RAM control portion 1074 thereof. The Computer Interface Unit 1068 requests the buffers 1076 of the MAU 1070 for the compressed data contained therein.

The fourth major subsystem of FEP is the Computer Interface Unit 1068 hereinafter referred to as the CIU, which serves to transfer data from the Communications Processors contained in the switching nodes via a control line 1078 for providing an I/O function to the communications channel from the control portion 1080 of the CIU and via line 1082, a direct access data link to the communications channel from the data portion 1084 of the CIU. Thus, the CIU transfers data from the communications line to the MAU which, in turn, stores it in buffers in the packet RAM, keeps track of the buffers and finally transmits the compressed data onto the bit processor wherein such data is expanded and coupled to the LAU's for transmission via telephone lines to the respective destination facsimile terminals. The CIU interface to the Communications Processor via lines 1082, a Direct Memory Access Channel (DMA), provides bidirectional data transfer via line 1086 between the MAU and packet RAM via line 1087. A Communications Processor programmed I/O channel 1078, over which various control commands from the processing units at the switching sites are coupled to an internal RAM within the control portion 1080 of the CIU, also has coupled thereover responses from the CIU to the Communications Processor. The CIU 1068 via line 1088 interfaces the FEP microprocessor subsystem 1064 for coupling commands thereto and for receiving commands therefrom for the performance of such tasks as answering and/or originating a phone call, voice prompting an operator at a facsimile terminal to enter connection data, transferring facsimile data and disconnecting a call and any other communications with the Communications Processor.

The fifth FEP subsystem, the microprocessor 1064, including program storage in PROM, a multiplexer I/O portion, Selector I/O, a read-write memory for temporary storage and program parameters and a read-write memory for interfacing all of the other FEP subsystems of the thirty-two Line Adapter Units via a microprocessor LAU selector bus 1079 provides the overall FEP control and is described in greater detail with respect to FIG. 16.

The sixth subsystem of the FEP is the Voice Generating Unit 1066 hereinafter referred to as the VGU which consists of a voice control portion 1090 and a Random Access Memory 1092 coupled thereto for storing therein encoded digitized voice vocabulary words which may be strung together to form phrases. The VGU provides an interface capability for all 32 LAU's on a dedicated channel, the voice bus 1077 while simultaneously interfacing the microprocessor 1064 and coupling information as to which digitized word should be coupled to which LAU and when such coupling should occur. The VGU is described in greater detail hereinafter with respect to FIGS. 14, 15(a) and 15(b). A capability is provided within the VGU to couple the same or different words to anyone or to all of the LAU's. Additionally, the VGU executes a decoding algorithm on the encoded digitized vocabulary word bits during transmission of such digitized words to the voice demodulator portion of the LAU for providing within the LAU the capability of receiving such decoded bits from the VGU and generating a human recognizable voice word for coupling to its respective telephone line at the appropriate power level and frequencies.

The above generalized description of the FEP will now be described in greater detail with respect to FIGS. 11 through 16 by a description first of data flow received at the FEP from a terminal and then with respect to the transmission of data from the FEP to an individual terminal.

A functional block diagram of the FEP is illustrated by FIG. 11. The telephone line 1104 is interfaced to Line Adapter Unit 1100 via a Data Access Arrangement (DAA) 1102 utilizing control lines 1118 and analog data line 1126 so as to interface each individual facsimile terminal to permit information interchange between the facsimile terminal and the FEP. After the CPU 1106 has collected and stored the connection information from the subscriber terminals on disk 1107, a command is routed therefrom via the Computer Interface Unit 1068 into the FEP to accept the incoming facsimile message, i.e., to go into the data mode in which mode facsimile data flows through the Line Adapter Unit 1100 to bit processor 1108 through the Memory Access Unit 1110 and packet RAM 1112 and finally back into the Computer Interface Unit 1068 via line 1114 all under the control of microprocessor 1040 from whence such facsimile data control is coupled via line 1116 to CPU 1106 for transmission of said facsimile data to the communications network.

The LAU 1100 is coupled to the Data Access Arrangement 1102 via a control line 1118 which is coupled to the Data Access Arrangement level converter 1120. A digital amplifier which in addition to interfacing the Data Access Arrangement circuitry 1102, also interfaces the microprocessor 1040 selector I/O 1072 via line 1024, thereby serving as the interface between the microprocessor and Data Access Arrangement 1120, and coupling therebetween the Ring Indicator, Off-Hook, and Couple Cut through control signals therebetween. These control signals enable the microprocessor 1040 to detect ringing, go Off-Hook and answer an incoming call from a facsimile terminal, go On-Hook and disconnect, go Off-Hook and get a dial tone, output dial pulses via an Off-Hook relay, detect ringing or busy tones or disconnect. The level converter 1120 additionally contains voltage step-up and step-down circuitry to shift the unequal voltage levels of microprocessor 1064 and the data access circuitry 1102. The incoming data from the data access circuitry 1102 is coupled via line 1126 to a common bus 1128 wherein it is simultaneously coupled to a signal detector 1130, a Touch-Tone detector 1132, a control tone detector 1134, an AM demodulator 1136 and an FM demodulator 1138.

Touch-Tone detector 1132 comprises a network of eight bandpass filters and associated level detectors, four of which filters detect the four low Touch-Tones of 697 Hz, 770 Hz, 852 Hz and 941 Hz, while the other four filters detect the four high Touch-Tones of 1209 Hz, 1336 Hz, 1477 Hz and 1633 Hz. Since each bandpass filter is tuned to one tone when it detects that tone, either alone or included among other tones present on the phone line 1104, the output voltage level of such filter corresponding to the detection of the one tone to which it is tuned will be present for the duration of the detected tone, if a detected tone output of Touch-Tone detector 1132 for each LAU on line 1140 is coupled to the Selector I/O bus 1072 of microprocessor 1064. The entry of information by a facsimile operator may be accomplished by means of a Touch-Tone pad which normally consists of twelve pushbuttons, the depression of any one of which pushbuttons causes a discrete high tone and low tone to be transmitted over the phone line to Touch-Tone detector 1132 in conventional fashion. Microprocessor 1064 by scanning the output of Touch-Tone detector 1132 and the other Touch-Tone detectors associated with their respective LAU's determines the voltage level on the Touch-Tone detector at any instant thereby determining the particular button or digit depressed by the facsimile operator.

The signal detector 1130 comprises an operational amplifier having a reference threshold above a predetermined minimum threshold amplitude on the phone line 1104 enabling signal detector 1130 to detect the presence of any tone or tones above such minimum threshold amplitude, upon which detection a voltage level output is coupled therefrom via line 1142 for the duration of such detected tone. Microprocessor 1064 scans the output of signal detector 1130 via its Selector I/O bus 1072 enabling microprocessor 1064 to determine whether or not a caller on the telephone line is sending viable information or whether the line conditions are poor for an acceptable transmission quality or whether the caller has hung up, in which instance, microprocessor 1064 sends to the CPU 1106 a control sequence indicating the current line status.

The telephone line is also interfaced by the control tone detector 1134 which comprises two programmable phase locked loops for detecting Control Tones, Start Tones, Stop Tones at typically 1100 Hz and 1500 Hz, Synchronizing Tones, Handshake Tones at typically 2425 Hz and 1500 Hz, Dial Tones at 350 Hz and 440 Hz, and Carrier Tones, such as an AM carrier, at 2048 Hz. While any of a wide variety of detector arrangements may be comprehended within the control tone detector 1134, typically control tone detector 1134 includes two independent programmable tone detectors for detecting any two out of N tones as selected by the microprocessor 1064. When either these two tones are detected on the phone line, detector 1134 outputs a voltage level for each tone which level is scanned by the microprocessor which has selected a specific two of N tones via control tone detector 1134 to look for any other two tones, thus stepping through a predetermined control sequence.

The actual facsimile data demodulation is accomplished by AM demodulator 1136 or FM demodulator 1138 in accordance with the modulation characteristics of the connected facsimile unit. The modulator outputs 1136 or 1138, as the case may be, are coupled to a selector voter unit 1144 to be described hereinafter. AM demodulator 1136 demodulates any AM carrier frequency present on telephone line 1104 above a predetermined threshold, such AM carrier frequency is nominally 2048 Hz. AM demodulator 1136 demodulates based upon the average value of the AM carrier. The incoming AM carrier is periodically normalized using an AGC amplifier which is keyed by sequencer 1154. The demodulator output is a binary one or zero (two differing voltage levels) which specifies whether the AM carrier represents "black" or "white" facsimile data. For each revolution of the drum or equivalent of the facsimile unit (one scan line), the demodulator 1136 output on line 1146 is sampled typically 1600 times and strobed as "black" or "white" data bits and strobed serially as data bits through a flip-flop within selector voter circuit 1144, wherein said data bits are scanned out by the bit processor 1108 via line 1146 at up to 10.4 K-bits per second. For decoding purposes, an intermediate average value of the AM carrier is considered to be "black" if it is closer to the full amplitude or "white" if it is closer to the half amplitude. The AM demodulator 1136 circuitry comprises a tracking analog-to-digital converter operating at one mHz which obtains the average value of the AM carrier by summing approximately 128 digital samples for each half cycle of the carrier waveform. The carrier half cycle boundaries are identified by the AM demodulator 1136 by utilizing the output of a zero crossing detector of well known configuration within the FM demodulator 1138, which zero crossings are coupled to AM demodulator 1136 via line 1148.

Facsimile terminals utilizing a frequency modulation scheme are demodulated by the FM demodulator 1138 which interfaces from line 1104 via a non-keyed AGC amplifier within the FM demodulator 1138. The FM demodulator 1138 comprises a threshold detector which recognizes a 2425 Hz tone as "black" and a 1500 Hz tone as "white." Other frequencies representative of "black" and "white" facsimile data are also accommodated in that such other tones are decoded as "black" if closer in frequency to 2425 Hz or "white" if closer in frequency to 1500 Hz. Two output voltage levels are provided by demodulator 1138 by virtue of a zero crossing detector which outputs a first level representative of the decoding of a "black" tone and a second level representative of the decoding of a "white" tone, both of which first and second levels being coupled to the selector voter 1144 via line 1150 and which voltage level on line 1150 is present for the duration of the detected tone. The output level of FM demodulator 1138 is typically sampled 1600 times per scan line (drum revolution) and strobed into the selector voter 1144, wherein they are coupled to a flip-flop having an output representative of the digital facsimile data which bits are scanned out by bit processor 1108 on line 1150 in similar fashion as the AM data coupled to selector voter 1144 via line 1146 at the 10.4 K-bits per second rate. Compatibility with facsimile units operating at different scan rates, i.e., different drum revolution speeds, may be achieved by varying the amount of time allowed for the 1600 samples per scan line to whatever frequency corresponds to the facsimile drum revolution rate of the particular facsimile unit coupled to Line Adapter Unit 1100.

Compensation for non-linear distortion introduced by the microphone in the telephone handset by which data is coupled through the data access circuitry 1102 to the demodulator may be achieved by utilizing within FM demodulator 1138 a pair of zero crossing detectors of well known design, one for detecting rising slopes and one for falling slopes. A number of well known zero crossing detection circuits are illustrated by the *Electronic Circuits Manual*, published by McGraw-Hill Book Company, 1971, pages 947 through 951. For AM, microphone distortion is accommodated by detecting the average value rather than the peak amplitude.

The selector voter operation 1152 will now be described. The selector voter is comprised of a black counter, a white counter and a pair of flip-flops having coupled thereto the output levels of AM demodulator and FM demodulator 1138 for sampling by sequencer 1154 and strobing into the bit processor 1108 via line 1146 depending upon whether the particular facsimile terminal inputting data into the LAU utilizes an AM or FM modulation scheme. The selector voter 1144 additionally indicates whether a voltage level which has changed polarity during a sample interval is to be considered "black" or white." The data bits sampled by sequencer 1154 by virtue of its sampling of its voltage output level of the particular selected demodulator 1136 or 1138 at the typical 1600 times per scan line frequency (one drum revolution) of the facsimile machine after strobing into the selector voter flip-flop are scanned by the bit processor 1108 as described hereinafter.

The sequencer 1154 serves to interface the control tone detector 1134, the selector voter 1144 and the bit processor 1108 to the multiplexer input/output bus 1022 of microprocessor 1040. "Sync Tones" and end-of-line tones from the control tone detector 1134 are detected by sequencer 1154 and utilized to synchronize its 1600 sample pulses to each facsimile drum revolution of the facsimile machine. A particular facsimile terminal may have a drum rotation of 2½, 3, 5 or more revolutions per second and at 1600 samples per revolution, the sampling rate of sequencer 1154 would be 4 K-bits per second, 4.8 K-bits per second or 8 K-bits per second. The sampling rate may be increased up to 10.4 K-bits per second, the maximum rate at which the bit processor can scan in or write out the bits to or from the LAU 1100 via lines 1156 and 1146, respectively. Line 1158 from bit processor 1108 is symbolic of the connection to the other 31 LAU's coupled to bit processor 1108. The output voltage levels of the AM and FM demodulators 1136 and 1138, respectively, are sampled by sequencer 1154 and chopped into 1600 bits per scan line, which bits are strobed into the selector voter 1144 and scanned into the bit processor 1108.

The sequencer 1154 includes a RAM 1160 and a hard wire logic portion. The RAM 1160 is preferably organized into 256 memory locations of four bits each for storing the sample count, the sample period and the synchronization count and the control sequence utilized by the particular facsimile machine being operated. Of course, additional data may be stored witin the RAM; however, for purpose of description of the sequencer operation, the aforementioned data will suffice. The primary function of the sequencer is to exercise control of incoming data and control signals which are received too fast for the microprocessor 1064, typically an Intel 8080, and to permit control of different and ordinarily incompatible machine types having different scan rates, control sequences and modulation techniques, i.e., AM or FM as aforedescribed. The instructions and various control parameters stored within RAM 1160 which cause sequencer 1154 to select the appropriate scan rate based upon the particular type facsimile machine currently inputting data to the system is accomplished by microprocessor 1064 upon input thereto of the facsimile machine type employed. Such control is implemented by the sequencer by the performance of various test and load instructions previously loaded into the RAM 1160 by microprocessor 1064 via Selector I/O bus 1072.

The Intercept Operator Relay 1162 comprises a relay having contacts for switching the tip and ring of the two wire pair telephone line to an intercept operator console to enable human intervention when desired by the operator at a facsimile terminal. The operator, by depressing an "operator" button on the Touch-Tone pad 1606 establishes voice communication with the intercept operator, as the Touch-Tone detector 1132, as previously described, recognizes the high and low tones indicative of the depressed button. CPU 1106 is notified of the depression of the operator button by microprocessor 1064 which, as previously described, scans the output levels of the Touch-Tone detectors. Thus, the intercept relay 1162 is responsive to operator initiated Connect and Disconnect Commands from the CPU 1106.

The Voice Demodulating Unit 1164, hereinafter referred to as the VDU, serves as a parallel interface to the VGU 1166 which, as previously described, stores encoded digitized vocabulary words. The VGU is described with respect to FIGS. 14 and 15. Data from the VGU 1166 is coupled to VDU 1164 over parallel data bus 1168 at typically 8 K words/second. The VDU is a digital-to-analog converter while upon receiving the data via line 1168, decodes such received data for each transfer to derive an analog voltage representative of human speech for output to the telephone line 1104 via a multiplexer 1199. The VDU includes impedance matching filters to couple the described analog voice tones into the telephone line 1104, typically 600 ohms or 900 ohms. Since the coupled tones are the decoded versions of the speech encoded bits in the VGU 1166, the operator at the facsimile terminal hears human speech. The VDU 1164 is coupled to the tip and ring two wire pair telephone line 1104 by an analog switch (illustrated in FIG. 16 as switch 1604).

A multiplexed channel interface to microprocessor 1064 is provided by Selector I/O bus 1072, a parallel bidirectional data bus including provision for address, control and data which enables the microprocessor to selectively address, for each LAU, its respective level converter 1120, intercept operator relay 1162, sequencer 1154, control tone detector 1134, Touch-Tone detector 1132 and signal detector 1130. Microprocessor 1064 addresses to the LAU's are time multiplexed to enable the LAU's to perform a variety of simultaneous functions. By way of example, each of the thirty-two LAU's may be accessed by the microprocessor typically sixty times per second, with the microprocessor addressing each LAU typically for 500 microsecond intervals.

The operation of the bit processor 1108, particularly with respect to its data compression function, will now be described. Various data compression algorithms, systems and circuitry for the implementation are known in the prior art with U.S. Pat. Nos. 3,916,095; 3,830,966; and 3,804,975 being typical of such compression techniques. Run length encoding is particularly advantageous in facsimile transmission in reducing the redundancy of transmitted data. Early run length encoding is described by Fano, R.M., "Transmission of Information," John Wiley and Sons, Inc., New York, N. Y., 1961; by Huffman, D.A., "A Method for the Construction of Minimum Redundancy Codes," Proc. Inst. Radio Eng., 40 (1952) pp. 1098; and by A. E. Laemmel, "Coding Processes for Bandwidth Reduction in Picture Transmission," Report R246-51, Microwave Res. Inst., Polytechnic Inst. of Brooklyn, N. Y., Aug., 1951. The bit processor of the present invention may utilize the described algorithm or other known compression algorithms.

After conversion of the black and white tones from the incoming telephone lines into black and white bits by the LAU's, these bits are scanned by the bit processor 1108 which not only executes the data compression algorithm on the incoming bit stream but also upon transmitting data to the LAU's, executes an expansion algorithm on compressed data received from the Memory Access Unit 1110. Upon receiving data via line 1146, a time division multiplex (TDM) multiplexer bus from the selector voter 1144 for LAU 1100 and up to 31 additional LAU's, a scanner and a bit processor scan each LAU sequentially, creating a three microsecond time slot on the bit processor's TDM bus to enable either the transmission or receiving between the bit processor 1108 and the LAU 1100 of data at up to 10.4 K-bits per second. Bit processor 1108 includes associated hard wire logic and a RAM 1172 which contains control information pertinent to the compression/expansion algorithm. Bit processor 1108 scans the data bits from each LAU typically at 1600 bits per scan line from each channel into an 8 bit wide buffer, since the incoming data rate may differ on each channel due to differences in facsimile drum speed, i.e., of 2½, 3 or 5 revolutions per second, the bit rate on each channel may, for example, be 4 K-bits per second, 4.8 K-bits per second or 8 K-bits per second. After processing by the compression algorithm of bit processor 1108, the bits from each incoming channel are stored in a location in RAM 1172 corresponding to the associated channel.

The compression algorithm utilized converts the number of similar bits in a row, for example, black bits, into a binary count, i.e., if 256 black bits are received in a row, the received 256 black bits are converted to an 8 bit count since $2^8 = 256$ and thus, 256 bits are compressed into 8 bits. The algorithm also keeps track as to whether the count refers to black bits or white bits of facsimile data. Whenever a change in sense between white and black incoming data occurs, the accumulated count up to such change is transmitted to the MAU 1110 and an internal counter within the bit processor 1108 is reset to zero thereby enabling the bit processor to keep track of the sense of the count from what LAU channel it is derived and from what scan line it is associated with, all of which data is coupled to MAU 1110 in parallel over a dedicated bus 1174. Microprocessor 1064 coupled to bit processor 1108 via its multiplexer input/output lines among other functions monitors and controls the bit processor. The bit processor makes the aforedescribed transfer whenever such change of sense occurs or whenever the internal bit processor counter becomes full. Since only as many bits as are required to represent the count of like bits in sequence are transmitted, between two and eight bits are coupled in parallel over line 1174 which results in, for no compression (constantly alternating black and white bits) $1600 \times 2 = 3200$ bits transmitted per scan line and for complete compression $(1600 \times 8)/256 = 50$ bits per scan line. Thus, a facsimile machine having a drum speed of five revolutions per second and no compression will result in $5 \times 3200 = 16,000$ bits per second to be coupled from bit processor 1108 to Memory Access Unit 1110, while a facsimile machine with a drum speed of 2½ revolutions per second and full compression will result in $2½ \times 50 = 125$ bits per second to be coupled via line 1174 to MAU 1110. Thus, it is apparent that the bit processor 1108 can accommodate an extremely wide variation in data rates from a number of different facsimile machines having a variety of modulation characteristics and drum speeds. As aforedescribed, anywhere from 125 to 16,000 bits per second may be coupled to MAU 1110 on a random basis from bit processor 1108. The bit processor will detect the end of each scan line by virtue of its accumulated count.

The aforedescribed compression algorithm serves to reduce the requisite transmitted data thereby imparting compression thereto only for three or more like bits occurring sequentially since one or two like bits would result in a two bit count; hence, incoming data derived from data terminals other than facsimile equipment are not acted upon by the compression algorithm but rather are coupled to the MAU 1110 as complete characters for storage in locations in packet RAM 1112 corresponding to the particular channel from which the data is derived. The packet RAM 1112 is comprised of two 8 K-bit buffers per channel and has the load capability in a worse case situation of handling 64 K bytes per second typically for 1667 milliseconds before overflowing.

Bit processor 1108 also has a vertical compensation capability which enables communication between facsimile terminals with different vertical resolutions. Vertical compression or the merging of two scan lines together every predetermined number of lines occurs by way of example when a facsimile machine which operates at a rate of 96 scans per vertical inch must transmit to a facsimile machine which operates at a rate of 88 scans per vertical inch which requires that the 96 scans be compressed into 88 scans, a ratio of 11/12. This is accomplished by merging every 11th and 12th scan line together before outputting to the receiving facsimile line via the transmitting portion of the LAU involved. Conversely, expansion is accomplished by selectively duplicating certain lines, for example, to convert from 88 lines to 96 lines.

The Memory Access Unit 1110 not only interfaces packet RAM 1112 and bit processor 1108, but provides a bidirectional parallel interface over the multiplexer input/output bus 1170 to the microprocessor 1064 and the CIU 1018. MAU 1110, more fully described with reference to FIG. 13, includes a RAM with buffers for each of the thirty-two input channels which may be coupled thereto, thus bit processor data via line 1174 is coupled to an operation RAM 1300, bit processor commands are coupled via line 1302 to a command RAM 1304, packet buffer data from packet RAM 1112 is coupled via line 1180 to a packet buffer RAM 1306 and microprocessor data after buffering by a tri-state register 1308 is transferred from the microprocessor multiplexer I/O lines 1170 to command RAM 1304 and operation RAM 1300. Data buffer 1310 and address buffer 1312 registers 16-bits wide for data coupled thereto from operation RAM 1300 via the operation bus 1314 and from a tri-state buffer 1316 via line 1318, respectively, for accessing all 32 input channels and for scanning data into packet RAM 1112. The address buffer 1312 contains the addresses on a channel-by-channel basis for packet RAM 1112. The MAU RAMS are illustrated generally in FIG. 11 by RAM 1182.

The two to eight bit parallel compressed count as aforedescribed form facsimile terminals or data terminal characters of non-facsimile origin via line 1320 after receipt at the MAU via lines 1174 and 1320 for storage in data buffer 1310 which includes for each channel a 16 bit buffer register. All of the individual channel data buffers 1310 can concurrently accumulate data under overall MAU control when buffer 1310 is full or overflows with compressed counts or characters. The contents thereof are transmitted over data buses 1322 after appropriate addressing at a buffer data processing register 1324 through a packet buffer data register 1326 to the packet RAM 1112 wherein the counts are run together contiguously with no boundary demarcations.

Time slot counter 1344 is a modulo-12 counter, the outputs of which are used as the address input to a control ROM 1346. At the end of the count, device counter 1348 is triggered and advanced by one. The time slot counter 1344, by way of example, is triggered once every 250 nanoseconds while its complete cycle spans the microseconds. The device counter 1348 is a modulo-32 counter, the outputs of which are coupled as the most significant address input to a device RAM 1336. Device RAM control 1350 controls both the operation of device RAM 1336 and the address inputs thereto from device counter 1348. A control ROM 1346, consisting of four 32 by 8 PROMS, outputs data to control MAU operation such that a unique operation takes place during each time slot, i.e., address register file, bus management, etc. Timing and control 1342 provides memory control strobes, external device signals and packet buffer refresh pulses. The device RAM 1336 consists of four 256 by 4 high speed bipolar RAM's organized as a 256 by 16 memory for use as temporary storage. The entire 256 word content of device RAM 1336 is partitioned into 32 groups with each group containing eight words and is addressed by the device control 1350. Within each group, each word (memory location) is dedicated to a specific type of information. Input to RAM 1336 is provided either by an address processor 1332 or a data processor 1324. The output of RAM 1336 is coupled to the operation bus 1314 together with the outputs of operation RAM 1300, packet buffer receiving RAM 1306 and tri-state buffer 1316. This output may be loaded into address buffer 1312 or data buffer 1310. The operation RAM 1300, consisting of four 4 by 4 register files and having independent read and write operation with independent address and control lines enables the MAU to efficiently use the time slot and common bus techniques by eliminating the use of multiplexers. Operation RAM 1300 addressing and control is provided by control ROM 1346 while either the microprocessor 1064, bit processor 1108 or CIU 1068 can provide input data thereto. At a predetermined time slot, data from one of these devices is selected by the MAU. The output of RAM 1300 is coupled either to data buffer 1310 or address buffer 1312 via the operation bus 1314.

Packet buffer receiving RAM 1306 having packet buffer data coupled thereto via line 1180 includes four 4 by 4 register files. The address lines to RAM 1306 are controlled by control ROM 1346 with write strobe from the packet buffer. The output of RAM 1306 is coupled to data processor 1324 over operation bus 1314. The command RAM 1304 consists of two 4 by 4 register files and has address lines and control signals thereto provided from control ROM 1346. The command RAM 1304 input is selectable by the MAU from the bit processor, the microprocessor or the CIU at predetermined time slots. The command RAM output is coupled to the address processor 1332 and to the timing/control 1342 in a manner which eliminates excessive time delay. This is accomplished by "prereading" the MAU output and latching it in a register at each transition of the time slot count. Thus, the command to be executed during time slot $(n + 1)$ is read out during time slot $n$ and is latched at the end of time slot $n_o$. A tri-state register 1308 synchronizes the microprocessor I/O operation with the MAU and the common bus at the input of the operation RAM 1300 and command RAM 1304. Tri-state register 1308 may consist of two quad D-type registers with a 3-state output. Address and data buffers 1312 and 1310, respectively, are comprised of four 4 by 4 register files and have identical output controls and different input controls. The output of tri-state register is coupled either to RAM 1304 or RAM 1300 in accordance with the control field of the microprocessor address line. Tri-state buffer 1316 comprises three hex tri-state buffers and is enabled each time the CIU 1068 accesses the packet buffer. The output of tri-state buffer 1316 is stored in the address buffer 1312. The data processor 1324 consists of seven high speed 8-bit position scalers and is capable of shifting data from data buffer 1310 as required. The address processor 1332 comprises four binary adders and two 8-position scalers. Address processor 1332 increments the address count and combines the content of the address buffer 1312 and an index register to derive a 15-bit packet buffer address. The index register is an internal 8-bit register containing the MSB (most significant bits) of the packet buffer address. This address is coupled out on line 1360 to packet buffer address register 1346 and fed back to the device RAM 1336 as a reference for the next operation. A two-to-one multiplexer 1334 selects the inputs, either address or data, for storage in device RAM 1336. All addresses to be accessed in the packet buffer and the associated data to be written into the packet buffer are stored in packet buffer address register 1346 and packet buffer data register 1326, respectively. Registers 1346 and 1326 each consist of four 4 by 4 register files and I/O control thereof is provided by control ROM 1346. A microprocessor data register 1362, consisting of two 4-bit D-type registers, has an output on line 1330 which is enabled when the microprocessor 1064 polls the MAU, thereby rendering data available on the microprocessor input bus. The CIU data register 1338, consisting of four 4-bit D-type registers, serves to transfer packet buffer data to the CIU.

The Computer Interface Unit (CIU) 1068 provides an interface between the MAU 1110 and the CPU 1106. Control information from the CIU 1068 is coupled to CPU 1106 over an 8-bit wide multiplexer channel 1184 and data over a 16-bit wide Direct Memory Access channel (DMA) 1186. Data bytes are transferred across DMA channel 1186 under the control of the CPU's DMA channel and data bytes are transferred across DMA channel 1186 at the CPU memory cycle speed up to three microseconds per transfer. The DMA channel is conditioned to execute the transfer by the CPU over the aforementioned multiplexer channel. High level interrupt channel 1188 notifies CPU 1106 of a buffer ready condition to request transfer of the one K bit data packets between CIU 1068 and CPU 1106, while a low level interrupt channel 1190 notifies CPU 1106 of a multiplexer channel 1184 request to transfer control information to the CPU. Reset capability is provided by channel 1192. A backup capability is provided to another CPU described in greater detail with respect to FIG. 3, by providing that the multiplexer and DMA channels 1184 and 1186, respectively, are switchable between two CPU's. Operationally, the CPU does not interrupt the FEP while transferring commands to and from the CIU 1018 RAM 1194 and data packets to and from packet RAM 1112. CIU RAM 1194 includes thirty-two 8 bit wide locations for each of the thirty-two LAU's. This capability is provided for each channel by sixteen registers for responses to the CPU and sixteen registers for commands from the CPU which commands are an instructional chain from the CPU to the FEP as to the next task required of the FEP for each channel. Various command parameters associated with the transfer commands are supportive and includes such information as command time durations, telephone numbers, error procedures, facsimile machine type, facsimile drum speed, code, modulation (AM or FM), etc. Responses from the FEP to the CPU instruct the CPU as to that which has been done in response to each command per channel and which response parameters include information, such as numeric data, channel numbers, subscriber ID's, time-outs, etc. Microprocessor 1064 scans CIU 1068 for commands for each channel and after execution of the scanned command, couples a response for the appropriate channel to the CIU. Exemplary commands and responses are:

put is 256 K bytes per second for full-duplex traffic since when 64 K bits per second are transferred to the 32 LAU's, then 64 K bytes per second are also transmitted through the CIU into the CPU. It is important to note that the above exemplary data transfer rates are for facsimile data traffic only since for non-facsimile data terminals, an FEP would typically handle a 9600 FDX baud line when the microprocessor 1064 is required to process each character. Alternatively, characters generated by non-facsimile terminals may be processed in similar manner as is facsimile information, thus permitting the microprocessor to process such data in block form. The throughput (K bytes per second) of the FEP is typically over twenty-five times greater for facsimile data than for non-facsimile terminals, since the facsimile transmission microprocessor 1064 need not process each byte through the FEP since facsimile data is transmitted directly from the LAU's into the packet RAM via the bit processor and MAU. Such is not the case for non-facsimile data terminals, wherein each character from the data terminal must be separately processed by the microprocessor due to differences in protocol. Assuming the aforementioned microprocessor scanning duration of 500 microseconds per channel (each LAU port) and assuming 32 LAU's, then each port is scanned sixty times per second thereby enabling the microprocessor throughput to be 60 characters per second per port full-duplex (30 characters per second in plus 30 characters per second out) which is equivalent to an FDX 30 character per second 300 baud terminal.

Figure 12:
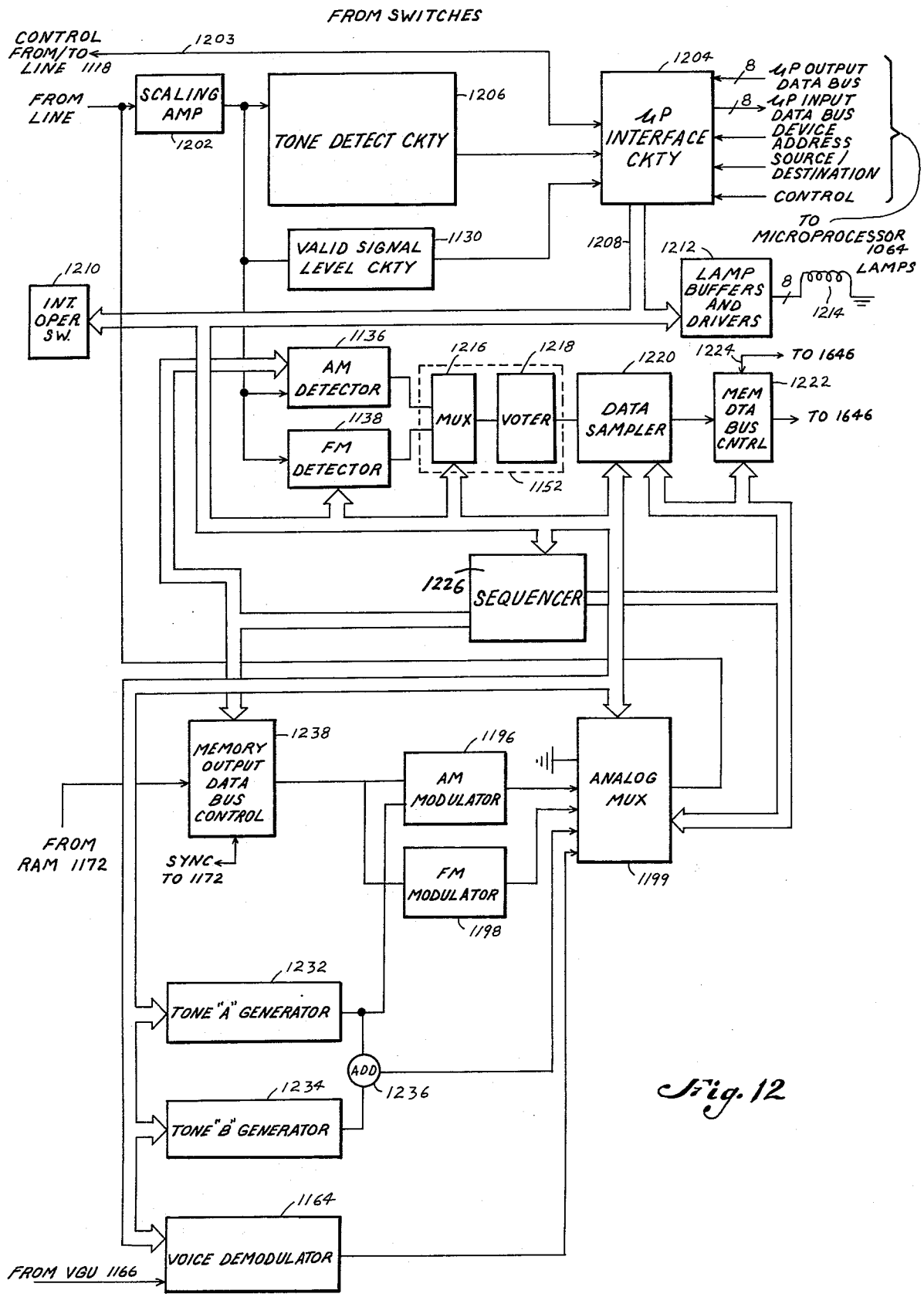
FIG. 12 is a simplified block diagram of a Line Adapter Unit portion of the Front End Processor of FIG. 10.

Referring now to FIG. 12, the LAU 1100 described with reference to FIG. 11 is shown in simplified functional block diagrammatic form to depict the data flow therein by the double lines. Data originating at an individual terminal from line 1126 is coupled into the LAU 1100 to a scaling amplifier 1202 and DAA control signals from line 1118 are coupled via line 1203 to microprocessor interface buffer 1204 which interfaces the illustrated data, address and control information to the microprocessor 1064. The requisite data is supplied to microprocessor interface 1204 via tone detection circuitry 1206, which includes Touch-Tone detector 1132, facsimile tone detectors, call progress tone, etc. and the signal level detector 1130. Data on line 1208 initiates the Intercept Operator switch 1210, is utilized with suitable drive amplifiers 1212 to illuminate LED indicator lamps 1214, and is coupled directly to FM detector 1138 (described with reference to FIG. 11); multiplexer 1216, the selection portion of voter 1218, which selects either the output of FM detector 1138 or AM detector 1136

| COMMAND | RESPONSE |
|---|---|
| (a) ANSWER CHANNEL 1 | CHANNEL 1 OFF-HOOK |
| (b) GET SUBSCRIBER ID | SUBSCRIBER'S ID DIGITS |
| (c) GET MACHINE TYPE | MACHINE TYPE ALPHA/NUMERIC |
| (d) GET MACHINE SPEED | MACHINE SPEED DIGITS |
| (e) GET DESTINATION ADDRESSES | DESTINATION ADDRESS DIGITS |
| (f) GO INTO DATA MODE | CHANNEL 1 PACKET BUFFER FULL |
| (g) DISCONNECT CHANNEL 1 | CHANNEL 1 ON-HOOK |

For example, response (f) will cause the CPU 1106 to request a packet buffer for the particular channel, the CIU 1068 is so instructed over MUX channel 1184 and the MAU 1110 controls the transfer of the requested packet from the packet RAM 1112 onto the DMA channel 1186 of the CIU for transfer into the CPU.

Under a worse case data load, 64 K bytes per second could be coupled from the CIU 1018 to the CPU 1110 in 16-bit parallel transfers. Therefore, the FEP throughfor coupling to a data sampler 1220; and finally, to an analog multiplexer 1222. Multiplexer 1216 and voter 1218 are described operationally with reference to selector voter 1152 and data sampler 1220 and analog multiplexer 1199 with respect to bit processor 1108. The output of data sampler 1220 is coupled to the bit processor 1073 via a data memory bus control 1222. Control of the data transfer to the bit processor is provided via line 1224.

The LAU sequencing is provided by a sequencer 1226 and RAM, which controls AM detector 1136, memory output data bus control 1238, data sampler 1220 associated with the bit processor, the memory data bus control 1222 and analog MUX 1199. Sequencer 1226 comprises sequencer 1154 and RAM 1160 illustrated in FIG. 11.

The transmission of data from CPU 1106 to the individual terminals via a FEP is operationally similar to the receipt of data from the terminals for transmission to CPU 1106 via the FEP.

When CPU 1106 contains data packets for delivery to a destination terminal, the identity code (phone number) of that terminal is coupled via multiplexer bus 1184 to the RAM buffer 1194 of CIU 1068 for the particular destination terminal. The microprocessor (described in greater detail with reference to FIG. 16) then, in sequence:

a. signals the DAA level converter 1120 to go Off-Hook;

b. detects the dial tone via control tone detector 1134;

c. dials the particular destination terminal telephone via DAA level converter 1120 control line 1118 (by pulsing an Off-Hook relay);

d. detects the Ringing Signal via tone detect circuit 1206;

e. detects the answering of the telephone at the destination terminal by the discontinuance of the ringing; and f. signals the DAA level converter 1120 to go On-Hook in the event that a busy signal is detected at (e) above, in which event the line 1024 is disconnected and CPU 1106 is notified via CIU 1018. When data transmission can begin, the CPU 1106 commands microprocessor 1064 to cause the voice generator unit 1166 (described in detail with reference to FIG. 14) to voice prompt the terminal operator that a message is ready for delivery to the terminal at a particular speed, i.e., three minutes, six minutes, etc. The terminal operator has a plurality of possible responses, i.e., entry of an ID code, etc., described hereinbefore, which responses are coupled to CPU 1106 via the Front End Processor. The placing of the telephone handset in the acoustic coupler at the terminal initiates the exchange of control, synch and handshake tones between the facsimile terminal and the FEP under the control of microprocessor 1064. All of the above-described exchange of commands, responses and terminal parameters (characteristics) between microprocessor 1064 and CPU 1106 are via the CIU 1068, RAM 1194 and multiplexer channel 1184. The occurrence of a terminal operator response is signalled to the CPU by the microprocessor via the low level interrupt line 1190.

The data is coupled from CPU 1106 over the DMA channel 1186 in 1024 byte packets (8129 bits) to CIU 1068, together with the FEP channel (destination terminal) address for the packet. The packet and address are coupled to the MAU 1110, also via the DMA channel, to two 1 K byte buffers per channel in the packet RAM 1112. The microprocessor requests more packets when the packet RAM associated with a particular channel is empty. By this process, a throughput of data from CPU 1106 to CIU 1068 of 16,000 bits/second/channel (64 K bytes/second) for the thirty-two channels is achieved. The actual transfer rate is at FEP memory cycle speed, about one megabyte/second.

From the CPU 1106, the 1 K byte packets are coupled to the CIU 1068 via the 16-bit parallel DMA channel, together with the channel (terminal) address. These packets are written into the two 1 K byte buffer registers corresponding to the particular channel to which the packet is addressed within packet RAM 1112. Upon the filling of one of these buffers (described with reference to FIG. 13), microprocessor 1064 requests another packet from the CPU to the other 1 K byte double buffer half for the channel, and commands MAU 1110 to send to the bit processor 1108 one compressed count zone at a time, or two vertically aligned compressed count zones at a time for consecutive facsimile scan lines to enable processing thereof by the bit processor for vertical compression.

The bit processor 1108 operates upon the above-mentioned compressed count zones from MAU 1110 with an exchange algorithm (sometimes referred to as a decompression algorithm) to recreate the original data before compression. The bit processor then transfers the recovered (expanded) data directly to LAU 1100.

For the case in which the original data is derived from a facsimile machine having more scan lines per vertical inch than the destination facsimile machine, i.e., 96 scan lines per inch versus 88 scan lines per inch, the bit processor will merge every 11th and 12th scan line together. The scan lines are derived from the ratio of 88 to 96, i.e., 11 to b 12. Of course, for other ratios of destination facsimile machine versus source facsimile machine scan lines per vertical inch, other ratios of scan lines may be merged together and the described incompatibility of a ratio of 11 to 12 is for exemplary purposes only.

After vertical alignment, the compressed count zones are merged, expanded and coupled to the correct LAU AM modulator 1196 and FM modulator 1198.

An exemplary exchange algorithm may operate as follows: Assuming that a compressed count of eight bits with a polarity indicative of "black" is received at the bit processor, the bit processor expands this count of eight into 256 "black" bits ($2^8 = 256$) which is coupled to the LAU modulators as aforementioned. As is apparent, the eight bits have been decompressed or expanded into 256 bits. The compression exchange ratio can range randomly from zero to 32 with an average of approximately 5:1 compression. Data received from the bit processor at the Line Adapter Unit for transmission to a terminal is buffered at the bit processor interface 1197 which is sequenced by sequencer 1154 as described hereinbefore with reference to FIG. 11 to couple data therethrough at a 10.4 K-bps rate from line 1156. The output of bit processor interface 1197 is coupled to an amplitude modulator 1196 and to an FM modulator 1198 and then to multiplexer 1199, an analog multiplexer which is conditioned by sequencer 1226 to select the appropiate AM or FM modulator in accordance with the modulation characteristics of the facsimile machine at the terminal for transmission via line 1200 to the individual facsimile terminal. The analog MUX 1199 allows connection of the phone line 1104 to the control tone generator 1194, the AM modulator 1196, the FM modulator 1198 and the voice demodulator unit 1164.

The control tone generator 1194 includes tone generators 1232 and 1234 for generating audible tones at differing frequencies, tones A and B, and is coupled to the telephone line 1104 via the multiplexer 1199 under microprocessor control for transmission of tones for predetermined durations and combined tones via an adder 1236. Bus control to the bit processor RAM 1172 is provided by a bus control circuit 1238. The control tones coupled to the destination facsimile terminal provide handshaking, synch, control, AM carrier tone and other signals in similar manner as are provided when data is transmitted from the terminal.

The interface unit 1197 receives black and white facsimile data bits from the bit processor which are strobed by sequencer 1154 into either FM modulator 1198 and AM modulator 1196 which are selected by multiplexer 1199 in accordance with the modulation utilized by the facsimile machine at the terminal. Sequencer 1154 synchronizes with the drum speed in revolutions per second of the receiving facsimile machine and strobes typically 1600 bits per scan line, which is equivalent to one drum revolution, from the interface unit 1197 into FM modulator 1198 and AM modulator 1196. The respective modulator converts the black and/or white bits into black and/or white tones for coupling to the telephone line.

The AM modulator 1196 receives the black and/or white bits strobed thereto by sequencer 1154 and utilizes these bits to control percent of modulation in the AM modulator. Specifically, black bits (for example, a logical 1) cause the full value of the AM carrier tone to be coupled to the telephone line to the receiving facsimile machine, while white bits (logical zero) cause the half value of the AM carrier tone to be coupled to the telephone line.

The FM modulator 1198 has black and/or white bits strobed thereto from the bit processor 1108 via the interface unit 1197 by sequencer 1154, also at the typical rate of 1600 bits per scan line, i.e., one drum revolution of the receiving facsimile machine. These bits are utilized in the FM modulator to control the VCO therein to couple a different, e.g., higher frequency to the telephone line for black bits and to couple a lower frequency to the telephone line for white bits. The facsimile machine at the receiving terminal then, via its telephone hookup to its acoustic coupler, utilizes the received signals to reproduce the received facsimile message.

The VGU 1166 will now be described with reference to FIGS. 11, 14, 15 (a) and 15(b). The VGU is interfaced to microprocessor 1064 over the multiplexer I/O bus 1070 and to the 32 LAU's via a voice data bus 1168. For each LAU, the VGU provides an 8 K-bit/sec. data transfer via line 1168 to the Voice Demodulator Unit 1164. The VGU includes an 8 K-bit PROM (programmable-read-only- memory) 1402 for each of the 64 words or vocabulary, each of which words is encoded into the 8 K-bit pattern. VGU 1166 also includes another PROM containing a decoding algorithm and a control RAM 1404 including buffers for each channel controlled thereby, illustrated by registers 1406, 1408, 1410 and 1412. The RAM 1404 word locations are preferably 8 bits wide.

Each RAM buffer includes registers corresponding to word locations as follows:

a. the address of the selected word PROM 1402 via address lines 1414 and 1416;

b. the address of the LAU to which the word selected is to be coupled via control logic 1418, to which the data output of control RAM 1404 is multiplexed for each channel by multiplexers 1420, 1422, 1424 and 1426;

c. an accumulator for stepping through a decoding algorithm for the word PROM; and d. a register to control execution of the algorithm. The above registers are included within buffers 1406 through 1412 and by control logic 1418 and are of conventional design, comprising 8-bit registers.

Microprocessor 1064 controls the operation of the VGU via lines 1428, 1430, 1432, 1434, 1436 and 1438 instructing the VGU to output a particular work to a particular channel. The VGU selects such particular work from PROM 1402 and reads out the 8 K-bits therefrom via line 1403 to control logic 1418, the operation of which is illustrated by FIGS. 15(a) and 15(b). The output of control logic 1418 is coupled via line 1168 to VDU 1164 as selected by voice address line 1440. The above-described selected specific word from PROM 1402 is decoded bit by bit prior to coupling, N bits at a time in parallel to the VDU. A typical time required for scanning each voice demodulating unit on each line adapter is four microseconds per VDU. Since there are 32 VDU's, it requires 128 microseconds to scan all of the VDU's. At this rate, the VGU is capable of making 8000 transfers per second to each VDU. The above scanning process is accomplished by means of control logic 1418 which multiplexes the VDU addresses into control RAM 1404 via a 3:1 multiplexer 1442 which is scanned by a scanning register 1444 which is interfaced to multiplexer 1442 by means of adder 1446. Timing and synchronization signals from the microprocessor in conventional manner are provided via the aforementioned lines 1430 through 1438. For example, the destination address of a particular VDU is coupled via line 1430 to the VGU wherein it is gated by gate 1448 to a 2:1 multiplexer 1450 controlled via line 1452 from control logic 1418 and the output of which 2:1 multiplexer is coupled together with the output of 3:1 multiplexer 1442 to the control RAM for providing the selected address thereto. Other interface AND gates 1454 and 1456, inverter 1458 and flip-flops 1460, 1462 and 1464 are coupled to control logic 1418 and provide for interfacing in conventional manner and are not described further herein.

The parallel transfers of bits coupled to each VDU are modulated therein into a spoken word of from one-half second to two-thirds seconds duration and as aforementioned, the VDU's match the frequencies and amplitude of the spoken word to the telephone line. Upon conclusion of the spoken word by the VDU, the VGU acknowledges same to the microprocessor through flip-flop 1460 and the address of the next word PROM to be sent to the specified VDU is then transferred from the microprocessor to the VGU. It is noted that the VGU is capable of sending decoded word bits from any or all word PROMS (only one of which is illustrated at 402) at once to any or all VDU's simultaneously. It is thus apparent that by voice multiplexing, any VDU can be generating any vocabulary word at the same time any other or all other VDU's are generating any vocabulary word.

FIG. 14 illustrates the aforedescribed registers corresponding to four 8-bit wide locations in the control RAM. The four locations for a single channel are illustrated in which the PROM addresses at 1502 and 1504, the count at 1506 and the state/control at 1508 bits are stored.

The control RAM sequence is illustrated by FIG. 15(b), wherein each four microseconds spent on each VDU is divided into eight 500 nanosecond time slots illustrated as time slots 0 through 7 for a single scan of a single VDU. The multiplex sequence for the time-in operation and the time-out operation is shown for each time slot with the particular operation for time-in shown by column 1510 during which data is coupled to the control RAM 1404 via line 1466 and for the time-out operation, shown by column 1512 during which time data is coupled out of control RAM 1404 via line 1468.

The control RAM sequence of FIG. 15(*b*) enables the data stored in PROM 1402 to be shared among 32 channels. The control RAM organization shown at FIG. 15(*a*) consists of two locations for the current PROM address (PAL and PAM), one location for use as a data accumulator (count) and one location specifying the state of each channel (state/control). The control RAM sequence of FIG. 15(*b*) of eight 500 nanosecond time slots is divided into a write RAM (Time-In) period and a read RAM (Time-Out) period. Slots 0-3 store information in registers for the present channel and read the corresponding locations for the next channel into the registers. Slots 4-6 are available for the processing of this information to form the voice data coupled out at slot 6 of the Time-Out period. Slot 7 is allocated for microprocessor access to the control RAM at the channel specified by a device address (DEVAD) signal and is independent of the channel number reference by the control RAM logic. Thus, the 128 by 8 control RAM containing PROM address and control information for each channel is accessed for the channel identified by a scan register and is processed together with the PROM output to form the voice data.

The microprocessor and its associated logic is illustrated at 1064 in simplified block diagrammatic form by FIG. 16 and as previously described, interfaces all of the Line Adapter Units and other subsystems of the FEP providing initialization control, synchronization, monitoring, stopping and reset for all of such units and also as aforementioned, may include an Intel 8080 processor at 1660. The bit processor 1108, the MAU 1110, the VGU 1166 and the CIU 1018 are all coupled via multiplexer I/O bus 1170 to a microprocessor I/O multiplexer 1602 via input and output data lines 1604 and 1606, respectively, control lines 1608, unit address lines 1610 and control field lines 1612 and device address lines 1628. The thirty-two Line Adapter Units are coupled to the microprocessor via selector I/O bus 1172 via selector I/O gating 1614 over a plurality of data input and output lines 1616 and 1618, respectively, control lines 1620 and other lines 1622 and 1626 identify the LAU connected to the selector I/O 1172 and lines 1624 specify the control to be exercised at the LAU. A system clock 1630 provides timing for multiplexer I/O gating 1602 via line 1632 for selector bus I/0 gating 1614 via line 1634 and also supplies the multiplexer I/O clock on line 1636 and the selector I/O clock on line 1638 for appropriate timing on the respective multiplexer and selector buses of the various data and system commands. The sequencer 1154 intercept operator relay 1162, Data Access Arrangement level converter 1120, signal level detector 1130, Touch-Tone detector 1132, control tone detector 1134 and control tone generator 1194 all interface the microprocessor via selector I/O bus 1172 on each of the thirty-two Line Adapter Units.

Timing provided by the system clock generator 1630 and an internal clock generator 1640 and interrupt timer 1648 is such that microprocessor 1064 sequentially scans each of the 32 LAU's for 500 microsecond intervals with a complete scan of all 32 LAU's requiring 16 milliseconds. Therefore, the microprocessor scans each LAU sixty times per second. It is thus apparent that the microprocessor will, sixty times per second per channel (a) monitor a change of status; (b) cause a change of status; and (c) perform input/output operations on a generated data terminal character. A six K byte PROM 1642 containing the firmware programs to control the channels and a 1 K byte RAM 1644 utilized by all channels has a read-write scratch pad buffer memory contained therein. The RAM 1645 which may be remote from the microprocessor is coupled thereto by a memory port 1646. A real time clock derived from clock generator 1640 is coupled to an interrupt timer 1648 which interrupts the microprocessor every 500 microseconds to sequence it to the next channel via a buffer illustrated generally at 1650. Upon sequencing, each channel is then monitored and stepped through its proper sequence by the microprocessor, while noting any error conditions. the RAM 1644 read-write memory contains information for enabling the microprocessor to implement system control. At any instant in time, this control includes, by way of example, the following:

a. Facsimile Message Speed, i.e., 2, 3, 4 or 6 minutes;
b. Code, i.e., ASCII, Baudot, and EBCDIC;
c. Facsimile Terminal Telephone Number;
d. Demodulation, i.e., AM, FM;
e. Facsimile Machine Protocol;
f. Synchronization Tones (sequence and duration);
g. DAA (Data Access Arrangement) control, i.e., ring indicator Off-Hook coupler cut-through;
h. Packet RAM buffer status, i.e., full or empty;
i. Buffer Address Per Channel;
j. Microprocessor commands, responses, terminal parameters, error conditions, T/O's (time-outs), etc;
k. State Register (located in RAM) to control the sequence of operations to be executed per channel);
l. The instantaneous state of the various FEP subunits for each port of the FEP;

The above control data stored within the microprocessor RAM 1645 is readily accomplished by the Intel 8080 based microprocessor; hence, the specific memory arrangement is not described in detail herein. It is sufficient for purposes of description that the aforementioned real time clock of the microprocessor interrupts the microprocessor every 500 microseconds at which time the microprocessor sequences to the next FEP port (channel). During each of said 500 microsecond intervals for each port, the microprocessor Executive routine stored in PROM 1642 selects the address of the next instruction to be executed out of RAM 1645 (in particular, out of the state register contained therein) and couples this selected address to an instruction address register in the microprocessor 1064. An index address control function illustrated at 1652 is accomplished by a device address line 1626, address 1654 by which the read-write memory 1644 can be accessed based upon the particular device identified by the address on line 1626. The various microprocessor address data and control lines 1654, 1656 and 1658, respectively, which are multiplexed by I/O multiplexer 1602 to the multiplexer I/O bus 1170, are coupled to RAM 1645 via the memory port 1646 as illustrated. Timing for the address data and control lines originating at the real time clock 1640 is provided via microprocessor 1660. For simplicity of description, single lines are indicated in FIG. 16 representative of data flow with slashes thereon. It is to be noted, however, that the number associated with each of said slashes signifies the number of lines; hence, there are sixteen address lines, eight data lines and so forth output from registers 1660. Requisite amplification for the address lines is provided by address driver amplifiers 1662. The microprocessor data bus controller 1664 insures synchronization between the data and interrupt controller and couples control signals to the multiplexer 1602, read-write memory 1644, PROM 1642 and RAM 1645 via memory port 1646. As is apparent from the above description, the Executive program and PROM 1642 selects the next instruction address from RAM 1645 and begins to execute the proper service routine. The microprocessor thus sequences through the selected programs for 500 microsecond increments before being interrupted by the real time clock and runs short 500 microsecond routines on each of the thirty-two FEP channels sixty times per second. These short programs which are readily formated to perform the various sequences described with reference to FIGS. 10 through 15 among which are monitoring and generating control synchronization and handshake tones and initiating VGU 1166 transfers to the VDU, such as VDU 1164.

The above 500 microsecond routines are exemplary only and it is to be understood that many additional functions are initiated, monitored, detected and switched by these programs. Microprocessor and associated logic 1064 also includes outputs to various indicators, such as LED's and various control switches at the FEP shown illustratively at 1670 to allow an operator to visually monitor the various microprocessor operations.

A more detailed description of the packet-switching transmission method utilized herein is described with reference to a data message comprised of a plurality of "facsimile packets" in accordance with the present invention. A typical full facsimile message contains between 800,000 and one million bits of data. After compression of approximately 5:1 in accordance with another aspect of the present system, between 150,000 to 250,000 bits still require transmission in packetized format.

Figure 18:
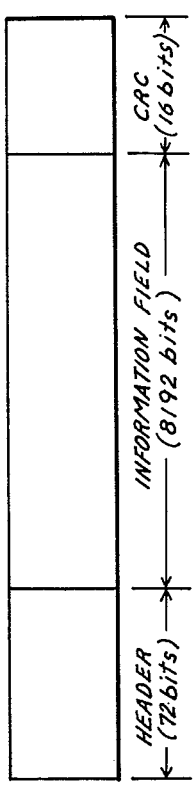
FIG. 18 is illustrative of the overall format of a typical data packet.

The packet size is flexible and may vary from between, for example, 1024 bits to 8192 bits per packet. Thus, a typical facsimile message will contain twenty or more packets, with each packet representing a subdivided short segment of the complete message. A typical packet containing 1024 bytes (8192 bits) of facsimile message is illustrated by FIG. 18. Each packet includes a header, an information field and an error checking portion for performing a cyclic redundancy check (CRC). The header consists of a code identifying the message source, the message destination and a packet sequence identifier. The packet sequence identifier is a code which both permits the packet to be reassembled at its destination in the proper sequence with the other packets constituting the entire facsimile message and enables the various processors to keep track of the packet for error checking purposes.

Figure 19:
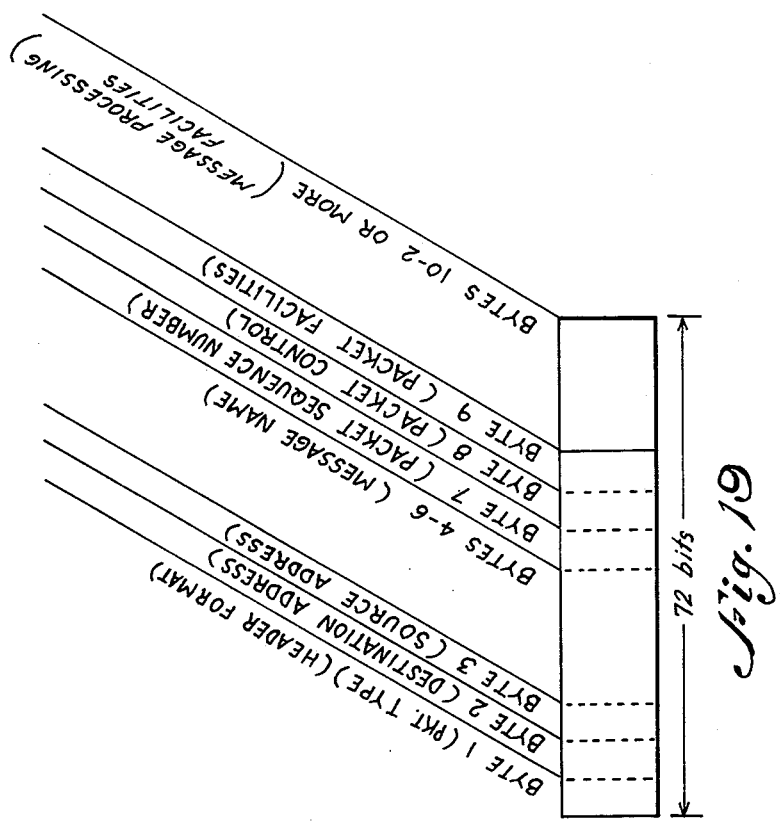
FIG. 19 is illustrative of the header portion of the data packet illustrated with reference to FIG. 18.
Figure 17:
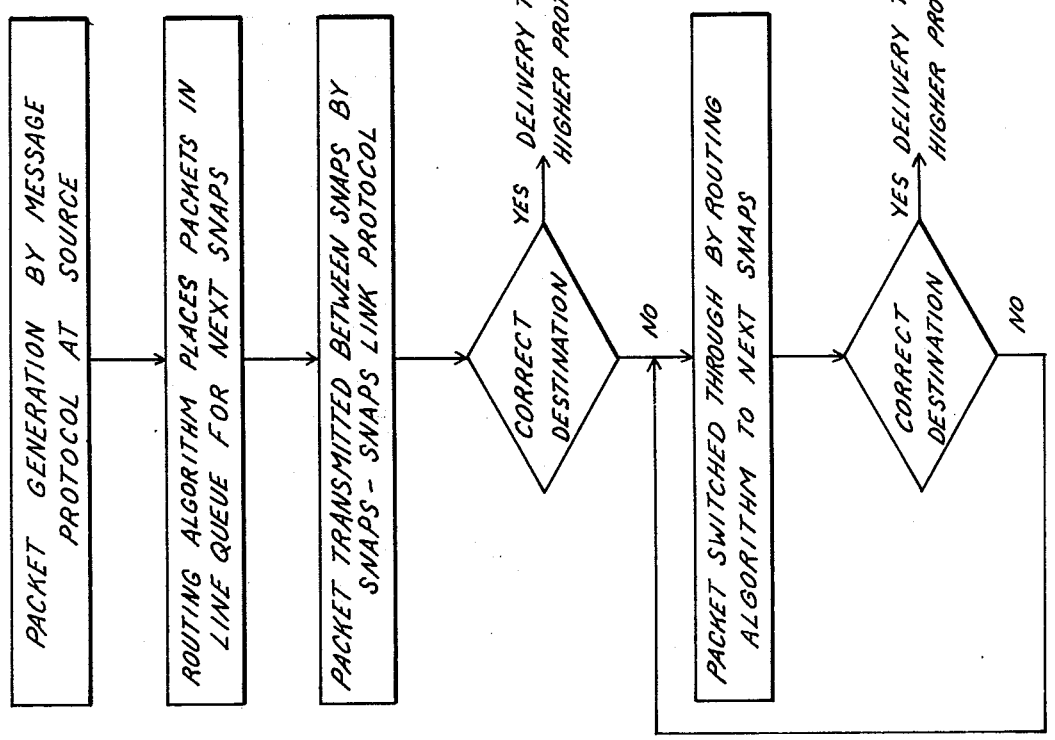
FIG. 17 is a simplified flow diagram of the routing of a data packet in the present invention.

Referring now to FIGS. 17 through 19, the packet protocol utilized by the present invention is described, which provides for the independent transmission of individual packets through the system. The subdividing and reassembly of packets from/to complete messages is described hereinafter with reference to the Message Protocol description. Packet Protocol is defined as the format, operation, routing and control of packets transmitted throughout the system, from source SNAPS through one or more intermediate SNAPS to a destination SNAPS. Packets may be defined as independent units of data which carry data from a source to a destination. While higher level protocol (message protocol) generates the packets, such higher level protocol utilizes the packet protocol as the transmission medium for the packets. Generally, packet transmission involves the steps illustrated by FIG. 17 wherein packets after generation by a higher level protocol at a source SNAPS or concentrator site are transmitted to a destination utilizing the packet protocol as the transmission media along the most efficient instantaneous communications path. After queuing of the packets by a resulting routing algorithm, the packet travels from SNAPS site to SNAPS site until arrival at the correct destination in accordance with a packet destination address for delivery to the higher level protocol (the message protocol whereby the packets are reassembled into the original message).

All of the packetized data transmission described hereinafter is transmitted over a network comprised of a plurality of switching nodes (SNAPS) which are computers having sufficient program capacity to interpret the contents of packets and sufficient core storage to store such received packets and to switch such packets for retransmission to a destination SNAPS or directly to an FEP for coupling to an individual data terminal. The transmission network is typically 9.6 K-bps to 56 K-bps digital transmission lines.

FIG. 18 is illustrative of a typical data packet including a header, an information field and a cyclic redundancy check (CRC) portion. Typically, the packet header consists of 72 bits, the information field is variable in size up to 8192 bits and the CRC is 16 bits.

Referring now to FIG. 19, a packet header protocol is illustrated. The first half byte of the packet header is the Packet Type Field which serves to allow recognition of a specific packet by the switching SNAPS when received at such switching SNAPS.

The next half byte (4 bits) of the packet header is the Format Field which allows recognition of the header format which is variable according to packet type, i.e., facsimile, non-facsimile, etc. For purposes of description, a single address format is illustrated which is indicative not only of the position of each field of the packet header, but of the header length.

The address fields, byte 2 the destination address and byte 3 the source address, specify the SNAPS site for which the packet is intended and the point or origin of the packet, respectively. In the event that a multi-address format (not shown) is utilized, then the destination address field, byte 2, would be repeated as many times as there are destinations indicated by the broadcast code of the original message. However, for purpose of simplicity of description, only a single destination byte is illustrated.

Bytes 4, 5 and 6 comprise the Message Name Field which serves to identify the message to which the packet belongs to and which in facsimile application is originated by the source SNAPS or concentrator. Packet sequence number, byte 7, serves to identify the packet corresponding to the message whose name is given by the message name field. Typically, a maximum of 256 packets are identifiable for each message and the combination of source address, message name and packet sequence number completely identifies the packet. The sequence numbers are utilized as described with respect to the message protocol description hereinafter for reassembly of the message as whole at the destination site.

The packet control field (bytes 8 and 9) serves to provide routing control of the packet through the network and internode diagnostics and information exchange, i.e., the last SNAPS visited in the propagation of the packet through the network, the elapsed lifetime of the packet in terms of number of SNAPS visited since the first SNAPS, etc., which enables monitoring of the packet location at all times throughout the network.

A message processing field (not shown) may be attached to the header and is utilized as a control field for message processing according to the message type. For facsimile application, such information as message processing, code message composition, message acknowledgment code, etc. may be contained therein.

The packet protocol operation will now be described. As previously discussed, packets are independently transmitted, switched and recognized by the higher level protocol, i.e., the message protocol which generates it, with such transmission being based solely on the destination site address contained in the packet itself and additional control information specific to the individual packet associated with its respective routing control. It is important to note that acknowledgment of receipt of individual packets occurs only on an internode (SNAPS to SNAPS) basis, i.e., there is no positive end-to-end acknowledgment scheme for each packet. However, provision for detection of a missing packet is provided for by the next level of protocol. Queuing delay is reduced at each switching node by means of a priority scheme to enable supervisory packets, such as line control and routing packets, and retransmitted packets to be transmitted before message data packets, and for message data packets to be further divided in terms of desired priority with message data packets having a fifteen minute delay time having a higher priority than message data packets having a four hour delay time which, in turn, would have a higher priority than message data packets having an overnight delay time.

At each SNAPS switching site, a different status is assigned to each packet once received at the site by checking the destination address, each such destination address is the last destination for the packet and if the packet is not destined to the sending or source SNAPS site itself, it is then delivered to the message protocol process for reassembly in accordance with its message name. Packets not having arrived at their final destination are switched and queued on the appropriate output link onto the next switching node down the line, either an intermediate (transit) SNAPS or a destination SNAPS. The status of such packets in transit are as follows:

| STATUS | DESCRIPTION |
|---|---|
| 1 | Re-receive (from line or higher level of protocol). |
| 2 | Queued for transmission or storage on the SNAPS disk. |
| 3 | Transmitted but not acknowledged. |
| 4 | Received correctly at the next site (acknowledged). |
| 5 | Not received at the next SNAPS after retransmission. |

It is important to note that once the packet has been received correctly at the next SNAPS and acknowledged, all record thereof is erased at the switching SNAPS from which it was last transmitted.

The CRC end-to-end check sum field illustrated by FIG. 18 insures the packet integrity during packet transmission. Such an end-to-end check, while not mandatory, is preferable since the packet header may change along the transmission path, i.e., a header may be stripped at a particular switching node and a new header added, thereby changing the destination address for the packet. Within the switching or receiving sites, packets are stored in core buffers and protected against system failure by a recovery mechanism whereby a standby system takes over when a fault occurs in the on-line system as described with reference to FIG. 3. While packets may belong to a variety of original messages, such as facsimile (multi-packet message) or datagram (mono-packet message), a negative acknowledgment (NAK) will cause the retransmission of the packet by the site of last transmission thereof.

Three primary types of errors are anticipated and provided for by the packet protocol. The first such error condition is erroneous packet condition which exists when bit errors occur in a packet. This condition is corrected by the use of the appended CRC check sum. The 16-bit CRC provides an error correction of not greater than one undetectable 8 K packet error per 500,000 packets transmitted at a line bit error rate of $10^{-6}$. Of course, the use of a larger CRC check sum, i.e. 24 bits would further reduce the packet error rate to $10^{-8}$ line bit error for 8 K packets.

The next error condition anticipated is the lost packet condition, whereby for whatever reason a packet might be lost in the network. Recovery of packets under such conditions is possible only by means of end-to-end acknowledgment (source to destination) for each packet, an impractical technique due to the amount of extra storage required since a copy of each transmitted packet would have to be retained at the source until reception and acknowledgment would occur. Such lost packet condition might occur due to noise on the transmission line, a fault on the transmission line or of the sending SNAPS, the routing method employed and congestion of packets on the line, i.e., elimination of a packet for decongestion purposes. The low error rate of transmission virtually eliminates the lost packet condition. However, a "wandering packet" condition might exist in which a packet is transmitted and retransmitted between two SNAPS sites and which is correctable by a protocol forbidding the wandering packet from going back to the previous node of origin.

The third possible error condition is the "duplicate packet" condition by which duplicate packets might be produced during intermediate retransmission of packets. Correction of such a condition is accomplished by the next level of protocol by provision for protection of the message name, source, address and packet number described with reference to FIG. 19 and discarding any duplicates received.

The message protocol described hereinbefore will now be expanded upon. This protocol controls the format, sequencing and segmentation of a facsimile message at the source SNAPS, the correct transmission of the message, and the reassembly of the message at the final destination. The message header is appended to certain packet headers, such as described hereinbefore with reference to FIG. 19. The message header includes a message processing code, data indicative of the total number of segments (packets) constituting the message, and the FEP port address of the destination terminal. Of course, multiple FEP port addresses could be required for multiple destinations; hence, the message header is of variable bit length.

Message segmentation at the source SNAPS is accomplished by the message table, wherein each segment's disk address is stored. Thus, the message is segmented, written onto the disks, and the disk address stored in the message table. Upon error-free receipt of the entire message, the segments are queued for transmission according to priority and each segment is retrieved from the disk and transmitted. Upon receipt of the message segments, the headers are stripped, the text stored on the disk and an entry made in the message table. Upon receipt of the first message segment, a timer is actuated which serves to initiate a message retransmission if more than a predetermined number of segments are missing after a predetermined time duration has elapsed. After receipt of the entire message, the message table is written on disk and the message queued according to priority. The message is retrieved from the disk segment-by-segment by accessing the message table and is coupled to its appropriate destination terminal. An exemplary time duration $t$ required for receipt of a facsimile message may be calculated in accordance with:

$$t = KnT, \text{ where}$$

$K$ is a security factor of, for example, (3)
$n$ = number of message segments
$T$ = line transmission time per segment (packet)

Referring now to FIGS. 20 and 21 the Executive supervisory routine and a system processing overview are illustrated in flow diagrammatic form. Before describing these routines, the following definitions are provided for certain of the terms utilized:

1. Subroutine, used interchangeably with Closed Subroutine, is a body of computer instructions designed to be used by all routines except interrupt routines to accomplish a portion of a task. A subroutine is located outside the main routine and control transfers from the main routine to the subroutine and back to the next instruction in the routine.

2. Interrupt Vector Routine — The suspension of all data processing and the retention of all critical information relating to current data processing status upon the occurrence of an external interrupt and the transfer of control by the data processor to an interrupt routine responsive to the condition and dependent upon the nature of the interrupt. The interrupt routine address is stored in memory and such address is interchangeably referred to as an Interrupt Vector.

3. Scan Vector Routine — A routine which accesses the Task Control Table (TCT) and is aware of the location and interpretation of information in the TCT.

4. Executive Routine — A Multi-task real time supervisory routine capable of controlling a number of tasks simultaneously.

5. Buffer Management — A routine dedicated to the specific task of maintaining empty buffer chains.

6. Core Image — A binary copy of a computer program constituting an on-line/stand-by system including the execution of the code for implementing the same.

7. In Service — A condition indicative of a particular channel port or line being available for use by either subscriber or the switching system itself. A characteristic state of a line, port or channel.

8. Local Memory — Memory dedicated to a particular computer, i.e., not shared with any other CPU.

9. Packet Buffers — 1,000 character buffers into which packets are received and out of which packets are transmitted under a common pool system resource management.

10. Scan — The process by which the executive sequentially allocates time to tasks that are linked into the line scan chain. After completion of a scan of all linked tasks, the executive would have allocated a fixed time for each task in the chain and serviced the demands for that task.

11. Scan Vector — The address of a scan vector routine.

12. SNAPS — An acronym for Switching Node And Processing System.

13. Standby — A state in which a subsystem is available for backup in the event of hardware/software failure in which case a switchover of such system occurs.

14. Task — The service and resulting processing and computation required to satisfy a particular demand internal or external to the system as a whole.

15. Sub-task — A portion of a task.

16. Task Control Table (TCT) — Tables used by the executive to control the execution of scan vector routine and monitor interrupts by means of flags, etc. Each such table linked into a scan contains the address of a scan vector performing the next sub-task constituting a component of the overall task to be performed.

17. Line Scan Chain Control Table — A three-word table used by the Executive routine containing the address of the first Task Control Table in the chain, the next Task Control Table in the chain, and the last Task Control Table in the chain.

18. Scan Vector Lists — are tables used by the executive to couple individual routines together.

19. Message Table — A table containing information relating to the specific message, message sequence number, source address, destination address, priority, sector address of every packet comprising a part of the overall message and other desired information.

20. Destination Table — A table containing destination telephone number, machine type information, pointer to customer table.

21. Message Queue Table — A table containing sector addresses on disk of message table belonging to messages associated with the local SNAPS. A similar table is comprised of messages for transmission to remote SNAPS.

22. Virtual Circuit — A logical association set up either temporarily or permanently between two end intelligent terminals connected to the network.

23. On-Hook — signifies on a direct current telephone line a loop open to direct current supplied from the other end, while Off-Hook signifies a closed loop allowing a relay at the other end to operate while signalling in the reverse direction constitutes a ring-down. For a more complete description of On-Hook, Off-Hook, ring-down and the various telephone tones utilized herein, reference is made to Reference Data For Radio Engineers, Sixth Edition, 1975, Howard W. Sams & Co., Pages 2–13 to 2–18.

The Executive subroutine, illustrated by FIG. 20, scans the various tables, i.e., the line scan chain control tables, the Task Control Tables and the scan vector lists. The Executive subroutine first checks a one hour timer to determine whether it has expired. If not, a one second timer is checked next, then a 100 millisecond timer, and finally, if none of the above have expired, a 10 millisecond timer is checked. If any of the above timers have expired, whatever scan is associated therewith is processed. Assuming that the 10 millisecond timer has expired, the subroutine associated therewith causes the executive to examine the line scan control table to obtain the next task to be performed, initializing any pointers and initializing registers needed to satisfy the table and date access requirements of the task concerned. The line scan chain control table provides the address of the first Task Control Table which is used by the Executive to load the accessed data into appropriate registers. The address of the next Task Control Table is obtained, the line scan chain control tabke is updated and control is transferred to the next task to be performed. The data base for each scan routine is contained in the Task Control Table enabling scan routines to operate independently of other tasks, thereby enabling each scan routine to be used repeatedly by any task without initialization of the routine. This is referred to as "semi-reentrancy," and serves to simplify the addition of new protocols which may be added, in most instances, by rearranging existing subroutines into a new vector list.

Upon completion of the execution of a scan vector, the Executive routine is again initiated by the illustrated "return from scan vector routine to executive" step, whereupon the priority of the scan being serviced, i.e., 10 ms, 100 ms, or 1 sec., is determined. From this step, the address of the next Task Control Table is determined as hereinbefore described, and the subroutine is repeated for the new task.

Referring now to FIG. 21, a simplified operational flow diagram illustrative of the message and packet processing interaction involved in transmitting facsimile messages from a facsimile terminal 2100 via an acoustical coupler 2102 to an individual channel of the Front End Processor 2104. As described hereinbefore, the data from acoustic coupler 2102 is switched through a local telephone exchange 2106, through a carrier supplied Data Access Arrangement circuit 2108 to the FEP 2104. The messages are collected as follows:

The CPU coupled to FEP 2104 is interrupted by FEP 2104, the FEP interrupt routine is entered therein and the interrupt routine reads the FEP status. The FEP status indicates that there is an "Off-Hook" condition on the aforementioned individual FEP channel. The interrupt causes a subroutine to scan the Task Control Table corresponding to the individual channel. A buffer register is initialized and the buffer address entered into the Task Control Table, thereby creating a message table 2110. The aforementioned exchange occurs via line 2112. The interrupt routine next compares the particular interrupt code, in this case, the Off-Hook code, with the table of interrupts to obtain the collection vector list address for the Task Control Table 2110 to enable collection of input messages via channel inputs 2114, 2116, etc. Instantaneously, the process is in different states, each state corresponding to an entry in the scan vector list which in turn corresponds to the execution of a scan vector routine, i.e. commanding the FEP 2104 to prompt a terminal operator with a voice output requesting entry of a subscriber ID code. After the scan routine is executed, the vector index of addresses is incremented to the next scan vector address. This scan vector address is then scanned whenever the Executive routine services the Task Control Table until the time, i.e. 10 milliseconds, expires. The Task Control Table will be scanned several times during that interval, during which, if the action required has occurred, i.e. entry of an ID code by a subscriber, the FEP 2104 interrupts the CPU, indicating that a response has occurred. A response flag is set and tested for response which, if successful, will increment the scan vector index to its next address. The received data (in this case, subscriber ID information) is used to read data from a table (such as a customer table containing data such as machine type information) from disk 2118 into core and updates the message table 2110. Upon conclusion of the aforedescribed sequence of events, the terminal 2100 may now load a sheet of paper on the facsimile machine and commence transmission. As packets arrive from the FEP via line 2122, data buffers are aligned for receiving and collecting the packets by a collecting routine. The packets on line 2124 are now ready to be written on disk 2118. A decision is made by the program at 2126 as to whether a virtual call for the packet will be made, in which case it is coupled to the routing matrix 2128 for further processing, or whether a store-and-forward call will be made, in which case the disk write program 2130 writes the packets onto disk 2118 after queuing routine 2132. After the packets are written into disk, the scan vector routine updates message table 2110 to include data therein indicative of the sector address of the packet on disk 2118, and awaits the next full packet buffer input. After receipt of all packets and disconnecting by the terminal operator, the message table 2110 is written onto disk 2118 and the message (comprised of all the packets on disk 2118) is linked into the appropriate priority message queue table for transmission, in which queue table the address of the message table on disk 2118 is also recorded. The last scan vector in the list unlinks the particular Task Table associated with the FEP channel just serviced and de-allocates the Message Table 2110, which message table is now available for other data as its contents have been written on disk. The message collection having been described, the message transmission will now be described, also with reference to FIG. 21.

The Executive 2134, in accordance with message priority and system load, periodically picks up messages waiting for transmission to their respective destinations from the message queues for messages requiring transmission (from the local SNAPS onto the network) and reads the message table corresponding to the first such message from disk 2118. The list of messages pending is illustrated at decision block 2136, wherein an affirmative decision (message pending) causes a disk read process operation 2138 to read the disk 2118 and a negative decision (no message pending) puts the Executive in a wait loop 2140, insofar as message transmission is concerned. The aforedescribed message table, table 2142, contains the addresses of packets requiring transmission, which addresses are obtained from table 2142 and read into memory. These packets are immediately routed to routing matrix 2128 wherein the headers are analyzed by the routing algorithm which then queues the individual packets to a specific output line at an output queue 2144. This output queuing process on the output line, illustrative shown at 2146 receives packets from queue 2144 and initiates transfers thereof to the transmission line 2148 via a line interface 2150. After completion of the aforedescribed transfer, duplicate packets of those just transferred are put in a "wait acknowledgment queue" 2152 to await acknowledgment of correct receipt by the receiving SNAPS location. When such acknowledgment is received, the packet buffer is de-allocated. If, however, such acknowledgment is not received within a specific time period, a retransmission decision and subroutine 2154 makes a "yes" decision (to retransmit the packets) and the packets are replaced in output queue 2144 via line 2156 and the process is repeated until the packets are successfully transmitted and properly acknowledged.

Packet reception from line interface 2150 of input packets via line 2158 will now be described, also with reference to FIG. 21. Upon arrival at their intended destination, an input process 2160 for each channel selects the packets and stacks them into an input queue at 2162, at which time process 2160 assigns a buffer to the input line for receiving the packets. Independently, a packet selection subroutine selects packets from the input queue 2162 and examines them to make a decision, indicated by decision block 2164, whether the packet received contains control data (a "yes" decision), in which case a control packet processing subroutine 2166 processes the packet immediately; or whether the packet is not a control packet (a "no" decision), in which case its header is examined by another decision subroutine 2168 to determine whether or not it is a packet in transit between source and destination locations. If the packet is a transit packet (intended for another location and a "yes" decision), it is immediately coupled via line 2170 to the routing matrix 2128 for routing as aforedescribed. If the packet is not a packet in transit (as indicated by its header, a "no" decision), it is regarded as a destination packet which has arrived at its destination. In this situation, the packet is coupled via line 2172 for queuing to the disk 2118 as described hereinbefore with respect to the transit packets and is similarly processed by disk write queuing subroutine 2130 for queuing at queue 2132 prior to being written on disk 2118. A journaling capability is provided at the final destination for received packets by transferring them to a journaling queue 2174 from whence they are transferred to a journaling tape 2176 via a disk to tape decision gate 2178 for long term storage. In the event of a tape failure, an alternate path is available to the disk 2118 via line 2180.

The delivery of data to facsimile terminals is accomplished in similar manner as is the hereinbefore described reception of such messages from the terminal. The Executive subroutine selects messages to be processed from a message queue, reads the corresponding message table and initiates the appropriate handshaking protocol and subscriber prompting. The processor associated with the FEP servicing the particular terminal transmits the packets to the FEP which couples the packets to the terminal as aforedescribed. Subsequent packets are read from disk, their addresses having been derived from an appropriate message table. After all packets of the message have been transmitted, the process is terminated.

APPENDIX I

EXEMPLARY TASK CONTROL TABLE

FORWARD LINE TO NEXT TASK CONTROL TABLE
BACKWARE LINE TO PREVIOUS TASK CONTROL TABLE
FEP INTERRUPT STATUS          CHANNEL TYPE SIGNALING ID
SCAN VECTOR
FLAGS                         SPARE
"ANSWER BUSY" ACK COUNTER
TIMER
MESSAGE TABLE ADDRESS
FAULT TIME
FAULT TYPE & ERROR INFORMATION
SPARE
SPARE
SPARE
SPARE
SPARE
SPARE
SPARE
JULIAN TIME OF TRANSMISSION OF MESSAGE
AT SOURCE SNAPS              JULIAN TIME OF
DELIVERY OF MESSAGE AT DESTINATION SNAPS
PRIORITY            DESTINATION/ABBREVIATED
STATUS FLAGS INDICATORS
ADDRESS DIGITS (BCD)
STATUS FLAGS         DESTINATION/ABBREVIATED ADDRESS
COUNTER
MESSAGE PACKET COUNTER
SUBSCRIBER ACCOUNT NUMBER (BCD)
SUBSCRIBER MESSAGE NUMBER
RETURN DESTINATION ADDRESS (BCD)
DISK SECTOR
ADDRESS OF MESSAGE TABLE FOR PREVIOUS TRANSMISSION
UNUSED                    "REPEAT" COUNTER
STATUS FLAGS
"CANCEL" COUNTER           "CONTROL PACKET" COUNTER
TIMER
RELATIVE DAT INDEX         CONTROL PACKET CODE
FEP INPUT BUFFER

APPENDIX II

EXEMPLARY MESSAGE TABLE

CUSTOMER TABLE CORE ADDRESS
DISK I/O STATUS                       DISK I/O
DISK SECTOR ADDRESS
RETURN SCAN VECTOR
FEP PACKET BUFFER ADDRESS
PACKET BUFFER CORE ADDRESS
"CURRENT" ENTRY POINTER          DISK SECTOR ADDRESS
OF "CURRENT" ENTRY'S MESSAGE TABLE LINK
DISK SECTOR ADDRESS OF MESSAGE TABLE

APPENDIX II-continued
EXEMPLARY MESSAGE TABLE

UNUSED
CORE ADDRESS FOR "CURRENT" ENTRY'S MESSAGE TABLE LINK
OPTION FLAGS    UNUSED    "SCRAMBLING" TYPE
"MACHINE SPEED" TYPE    "PAPER SIZE" TYPE
COUNTER FOR PRIORITY VIOLATIONS
EMERGENCY DISCONNECT CODE    UNUSED
DISK SECTOR ADDRESS OF PACKET #1
DISK SECTOR ADDRESS OF PACKET #2
DISK SECTOR ADDRESS OF PACKET #31
LINK DISK SECTOR ADDRESS

While the present invention has been described in connection with a preferred embodiment thereof, it is to be understood that additional embodiments, modifications and applications which will become obvious to those skilled in the art are included within the spirit and scope of the invention as set forth by the claims appended hereto.

We claim:

1. A packet-switched facsimile data communications system comprising:
   means for receiving message information from one or more facsimile terminals;
   means for subdividing said message information from each of said facsimile terminals into a plurality of data packets, each of said packets including at least a portion of said message information;
   means for independently transmitting said data packets over said communications system including a network of a plurality of switching nodes for selectively storing and forwarding said packets over said network in accordance with information contained by said packets; and
   processing means for storing said data packets for reassembly of said packets into said message information.

2. A packet-switched facsimile data communications system in accordance with claim 1, further comprising:
   means for coupling said reassembled message information to one or more message destinations.

3. A packet-switched facsimile data communications system in accordance with claim 1, wherein said data packets include at least a header portion and an information field portion, said header portion including data utilized in the storing and forwarding of said packets and said information field portion including data of variable bit length corresponding to a subdivided portion of said message.

4. A packet-switched facsimile data communications system in accordance with claim 3, wherein said header portion further includes data utilized by said processing means for reassembling said packets in such sequence that the original message information is recreated by said reassembled packets.

5. A pocket-switched facsimile data communications system in accordance with claim 4, further comprising:
   means for compressing said received message information into a reduced number of data bits and for coupling said compressed data to said subdividing means; and
   means for decompressing said reassembled packets into said original message.

6. A packet-switched facsimile data communications system operable in a store-and-forward mode for providing bidirectional communication between a plurality of source and destination facsimile data terminals at a plurality of locations over a communications network comprising:
   first data processing means having coupled thereto input data from one or more of said source facsimile data terminals for subdividing said input data from each of said terminals into a plurality of packets, and having means for coupling said packets onto said communications network, said first data processing means including a first store-and-forward packet-switching means associated with said communications network for storing and independently routing said packets on said network;
   second data processing means coupled to said network for reassembling said packets into said input data, said second data processing means including a second store-and-forward packet-switching means associated with said communications network for coupling said reassembled input data to one or more of said destination facsimile terminals.

7. A packet-switched facsimile data communications system in accordance with claim 6, wherein said store-and-forward packet-switching means includes means for time division multiplexing said packets for retransmission on said communications network.

8. A packet-switched facsimile data communications system in accordance with claim 7, wherein said first and second data processing means each further include:
   means for digitizing said input data from said source facsimile terminals into a protocol compatible with the operating characteristics of said destination facsimile terminals.

9. A packet-switched facsimile data communications system in accordance with claim 7, wherein said first and second data processing means each further include:
   data compression means for reducing the quantity of said input data prior to the subdivision thereof into said packets; and
   data expansion means for reproducing said input data after said compressed data packets are reassembled and prior to the coupling of said reassembled data to said destination facsimile terminals.

10. A packet-switched facsimile data communications system in accordance with claim 7, wherein said first and second data processing means each further include:
    means for providing within each packet at least a header and an information field of a predetermined number of bytes, such that said packets are routed on said communications network in accordance with data included within said header and wherein the aggregate of said information fields of said packets, upon reassembly, corresponds to said input data.

11. A packet-switched facsimile data communications system in accordance with claim 10, wherein each of said packets further includes an error code portion appended to said information field portion of said packet.

12. A packet-switched facsimile data communications system in accordance with claim 10, wherein said store-and-forward packet switching means includes means for altering the header portion of said packet, such that the path of said packets along said network is variable by said store-and-forward switching means.

13. A packet-switched facsimile data communications system in accordance with claim 12, further including means for sequentially routing one or more of said packets to a plurality of destinations.

14. A packet-switched facsimile data communications system in accordance with claim 8, wherein said first and second data processing means each further include means for generating a voice signal at selected facsimile terminals.

15. A packet-switched communication system for transmitting facsimile messages between a plurality of facsimile machines having differing operating characteristics, comprising:
  first processing means for receiving facsimile messages from one or more source facsimile machines, each of said source facsimile machines having a particular set of operating characteristics, said first processing means including:
    means for converting each of said facsimile messages into a digital data bit stream;
    means for subdividing said digital data bit stream into a plurality of data packets, each of said packets including a portion of the message from which said packets were subdivided;
    means for temporarily storing said packets; and
    means for transmitting said stored packets onto a communications network;
  second processing means including:
    means for receiving said packets from said communications network;
    means for reassembling said packets into said digital data bit stream; and
    means for coupling the bit stream derived from the packets associated with each of said messages from said source facsimile machines to one or more destination facsimile machines such that said facsimile messages are reproduced by said destination facsimile machines.

16. A packet-switched communications system in accordance with claim 15, further comprising:
  at least one intermediate switching node, said switching node including:
  means for receiving packets originating from one or more of said processing means;
    means for temporarily storing said received packets on a priority basis; and
    means for retransmitting said stored packets onto said communications network.

17. A packet-switched communications system in accordance with claim 16, further comprising:
  concentrator means having a plurality of parallel inputs and at least one serial output comprising:
    means for coupling the packets derived from a plurality of said first processing means to said plurality of inputs;
    storage means coupled to said plurality of inputs for temporarily storing said packets;
    means coupled to said storage means for serially coupling selected ones of said stored packets to said output; and
    means for coupling said packets from said output onto said communications network for transmission.

18. A packet-switched communications system in accordance with claim 17, wherein said concentrator means further includes:
  means for serially receiving data packets from at least one of said switching nodes;
  means for coupling said packets to said storage means;
  means for retrieving said stored packets from said storage means; and
  means coupled to said packet retrieving means for forwarding said packets to a plurality of said second processing means.

19. A packet-switched communications system in accordance with claim 16, wherein said means for subdividing said digital data bit stream into said data packets includes protocol generation means for providing within each of said data packets a header portion and an information field portion, said header portion including at least data identifying the destination for which said packet is intended and the order of reassembly of said packet in the message from which said packet was subdivided.

20. A packet-switched communications system in accordance with claim 19, wherein each of said switching nodes further includes adaptive routing means for changing the network path over which at least some of said packets are transmitted to their intended destination and including:
  means for changing at least some of the data contained in said header portion of said packets.

21. A packet-switched communications system in accordance with claim 19, wherein each of said switching nodes further includes means for routing at least some of said packets sequentially to a plurality of destinations such that at least one of said facsimile messages are transmitted to said plurality of destinations.

22. A packet-switched communications system in accordance with claim 19, wherein said means for subdividing said digital data bit stream into a plurality of data packets further includes means for appending to the information field portion of each of said packets a plurality of code bits for error correction.

23. A packet-switched communications system in accordance with claim 15, wherein said first processing means further includes:
  data compression means for reducing the number of data bits in said data bit stream prior to the subdivision thereof by said subdividing means into said packets; and
  wherein said second processing means further includes:
  data expansion means for decompressing said compressed data contained by said packets after reassembly thereof into said data bit stream and before coupling of said data bit stream to said destination facsimile machine.

24. A packet-switched communications system in accordance with claim 15, wherein said first processing means further includes:
  modulation compatibility conversion means for converting both amplitude modulated facsimile messages and frequency modulated facsimile messages into said digital data bit stream; and
  wherein said second processing means further includes:
  modulation compatibility conversion means for converting said digital data bit stream into either amplitude or frequency modulated data for coupling to said destination facsimile machines in accordance with the modulation characteristics of said facsimile machines.

25. A packet-switched communications system in accordance with claim 15, wherein said first and second processing means further include:
   facsimile scan speed compatibility conversion means responsive to the speed of said facsimile scan for matching the rate at which data is received from said facsimile machine with said digital data bit stream such that facsimile messages may be exchanged between source and destination facsimile machines having different scan speeds.

26. A packet-switched communications system in accordance with claim 25, wherein said facsimile scan speed compatibility conversion means is responsive to the speed of the facsimile machine drums of said source and destination facsimile machines.

27. A packet-switched communications system in accordance with claim 19, wherein said protocol generation means includes:
   means for imparting a system-wide compatible link, message and packet protocol to said packets such that destination facsimile machines having a different protocol than said source facsimile machine are adapted to reproduce said bit stream coupled thereto from said second processing means.

28. A packet-switched communications system in accordance with claim 16, further comprising:
   means controlled by said first and second processing means for generating audible voice prompting at selected facsimile machine locations in response to stored data; and
   means for accessing said stored data.

29. A full-duplex facsimile communications system comprising processing means at a first location and processing means at a second location, each of said processing means comprising:
   means for receiving facsimile messages from a plurality of source facsimile machines;
   means for receiving facsimile messages from a plurality of destination facsimile machines;
   means for converting said facsimile messages from said source and destination facsimile machines into digital data;
   means for packetizing said digital data;
   means for storing said packetized data;
   means for reassembling said stored packets received from said source and destination terminals into digital bit streams;
   means for coupling said digital bit stream derived from said destination terminals onto a communications network for transmission to said source terminals; and
   means for coupling said digital bit stream derived from said source terminals onto a communications network for transmission to said destination terminals.

30. A full-duplex facsimile communications system according to claim 19, further comprising at least one intermediate switching node in said communications network between said source terminals and said destination terminals, said switching node including:
   means for receiving packetized data from said source and destination terminals;
   means for temporarily storing said received packets;
   means for routing said stored packets for retransmission onto said network in accordance with communications network availability and priority; and
   means for retransmitting said routed packets onto said communications network.

31. A full-duplex facsimile communications system in accordance with claim 30, wherein each of said processing means further includes:
   data compression means for reducing the amount of digital data received from said source terminals before said data is packetized; and
   data expansion means for decompressing compressed data contained by received packets after reassembly of said packets into facsimile messages and prior to the coupling thereof to said facsimile machines.

32. A method for the transmission of facsimile message information from a first facsimile terminal to a second facsimile terminal over a communications network, comprising the steps of:
   A. coupling data representative of said facsimile message information from said first facsimile terminal to a first processor;
   B. converting said coupled data at said first processor into digital data having a predetermined protocol;
   C. packetizing said digital data into a plurality of packets, each of which packets includes at least a portion of said facsimile message information, a header indicative of the destination of said packet, and information for use in later reassembly of said packets into said message information;
   D. temporarily storing said packets; and
   E. dynamically routing said packets onto said communications network for transmission to a second processor associated with said second facsimile terminal.

33. A method in accordance with the method of claim 32, wherein said temporarily stored packets are stored on a priority basis.

34. A method in accordance with the method of claim 32, wherein said temporarily stored packets are stored for predetermined time durations.

35. A method in accordance with claim 32, including the further steps of:
   F. reassembling said packets at said second processing means in proper sequence into said digital data representative of said facsimile message information in accordance with said predetermined protocol; and
   G. coupling said facsimile message information to said second facsimile terminal for reproduction thereby in accordance with the operating characteristics of said second facsimile terminal.

36. A method in accordance with claim 35, including the further step of:
   H. receiving said dynamically routed packets on said communications network at one or more intermediate switching nodes whereat said packets are temporarily stored and forwarded in accordance with line availability and system priority either to said second processing means or to another intermediate switching node for storing and forwarding to said second processing means.

37. A method in accordance with claim 36, including the further step of:
   I. compressing said digital data at said first processor prior to said packetizing step; and
   J. decompressing said reassembled packets at said second processor prior to said converting of said digital data representative of said facsimile message information.

* * * * *